(12) United States Patent
Vuong et al.

(10) Patent No.: US 11,961,414 B2
(45) Date of Patent: Apr. 16, 2024

(54) ENTERTAINMENT/EDUCATIONAL SYSTEM AND ASSOCIATED APPARATUS, METHODS AND USES

(71) Applicants: Theresa D. Vuong, Irvine, CA (US); Jennifer K. Li, Anaheim Hills, CA (US); Il Kwon Jung, Seoul (KR)

(72) Inventors: Theresa D. Vuong, Irvine, CA (US); Jennifer K. Li, Anaheim Hills, CA (US); Il Kwon Jung, Seoul (KR)

(*) Notice: Subject to any disclaimer, the term of this patent is extended or adjusted under 35 U.S.C. 154(b) by 592 days.

(21) Appl. No.: 17/164,730

(22) Filed: Feb. 1, 2021

(65) Prior Publication Data

US 2022/0246061 A1    Aug. 4, 2022

Related U.S. Application Data

(63) Continuation of application No. 16/779,238, filed on Jan. 31, 2020.

(60) Provisional application No. 62/885,172, filed on Aug. 9, 2019, provisional application No. 62/799,523, filed on Jan. 31, 2019, provisional application No. 62/799,544, filed on Jan. 31, 2019, provisional application No. 62/799,555, filed on Jan. 31, 2019.

(51) Int. Cl.
*G09B 23/12* (2006.01)
*A63H 33/28* (2006.01)

(52) U.S. Cl.
CPC ............. *G09B 23/12* (2013.01); *A63H 33/28* (2013.01)

(58) Field of Classification Search
CPC ........... G09B 23/12; A63H 33/28; A63J 5/025
See application file for complete search history.

(56) References Cited

U.S. PATENT DOCUMENTS

| | | | | |
|---|---|---|---|---|
| 2,412,732 | A * | 12/1946 | Holman | A63H 33/28 D21/402 |
| 2,452,794 | A * | 11/1948 | Saachy | A63H 33/28 446/16 |
| 4,044,496 | A * | 8/1977 | Jernstrom | A63H 33/28 446/16 |
| 4,103,369 | A | 8/1978 | Riordan | |
| 4,164,829 | A | 8/1979 | Sadler | |
| 6,062,935 | A * | 5/2000 | Gross | A63H 33/28 446/15 |
| 10,363,492 | B1 * | 7/2019 | Thai | A63H 33/28 |
| 11,173,415 | B1 * | 11/2021 | Yang | A63H 33/28 |

(Continued)

*Primary Examiner* — Kurt Fernstrom
(74) *Attorney, Agent, or Firm* — UltimatEdge IP Law Group, P.C.; Dean G. Stathakis

(57) ABSTRACT

The present specification discloses an entertainment/educational system having one or more interactive stations having associated systems comprising apparatus and activities that demonstrate various physical phenomenon. Each interactive station comprises a different system featuring differing apparatus that provides users the ability to form various types and numbers of bubbles that the users can experience and interact with. User progression and interaction with a particular set of/order of interactive stations is correlated with lessons about physical phenomena exemplified by the bubbles made at a particular station of the total stations visited. The lessons may be further enhanced by information provided to users via a poster, handout, booklet or other informative media or information provided by a guide/attendant escorting user(s) through the set of stations.

19 Claims, 20 Drawing Sheets

(56) References Cited

U.S. PATENT DOCUMENTS

| | | | |
|---|---|---|---|
| 2002/0115372 A1* | 8/2002 | Thai | A63H 33/28 446/16 |
| 2010/0173558 A1* | 7/2010 | Huey | A63H 33/28 446/15 |
| 2015/0133021 A1* | 5/2015 | Huey | A63H 33/28 446/15 |
| 2020/0155957 A1* | 5/2020 | Clayton | A63H 29/22 |
| 2020/0251016 A1 | 8/2020 | Vuong et al. | |

* cited by examiner

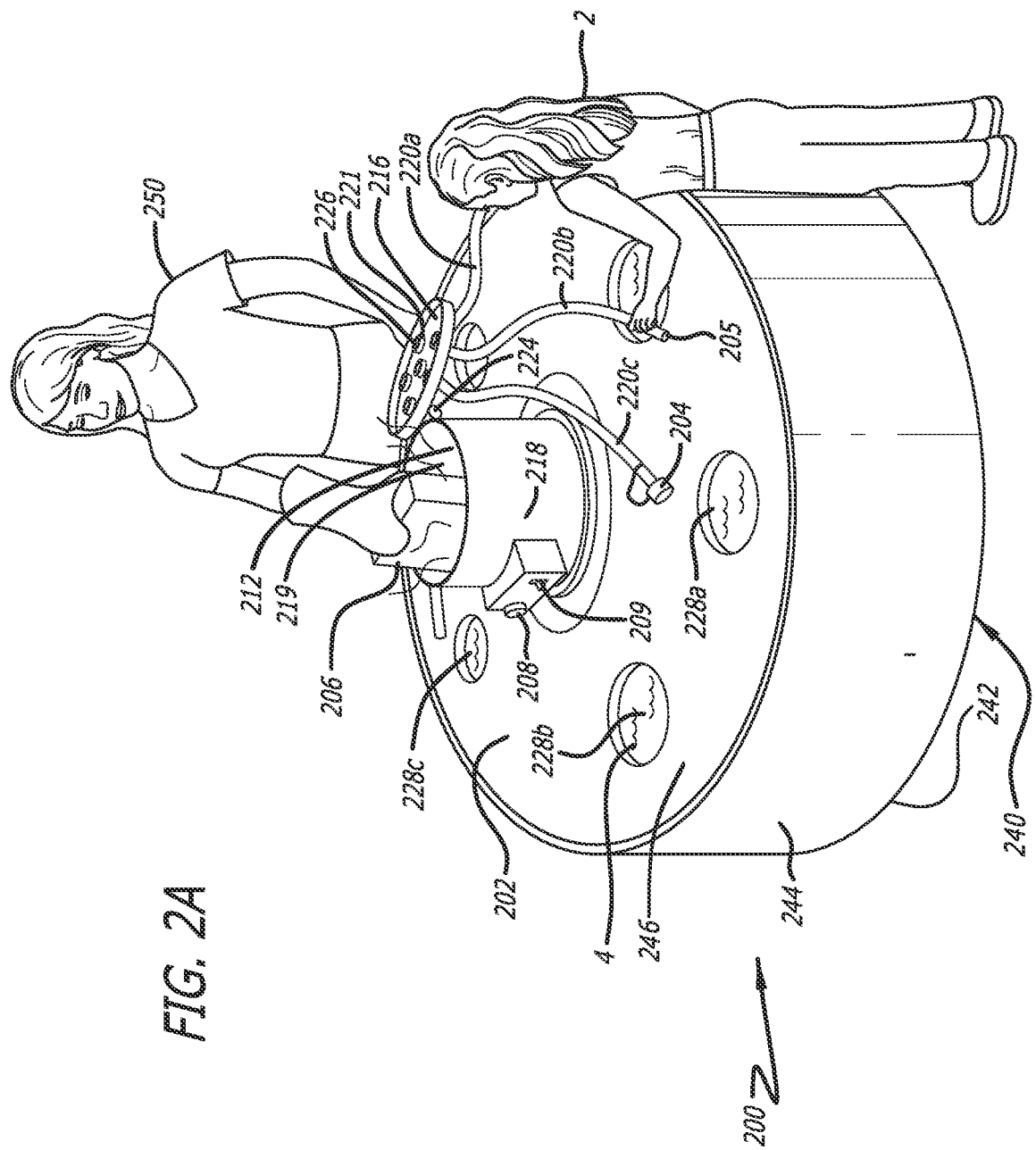

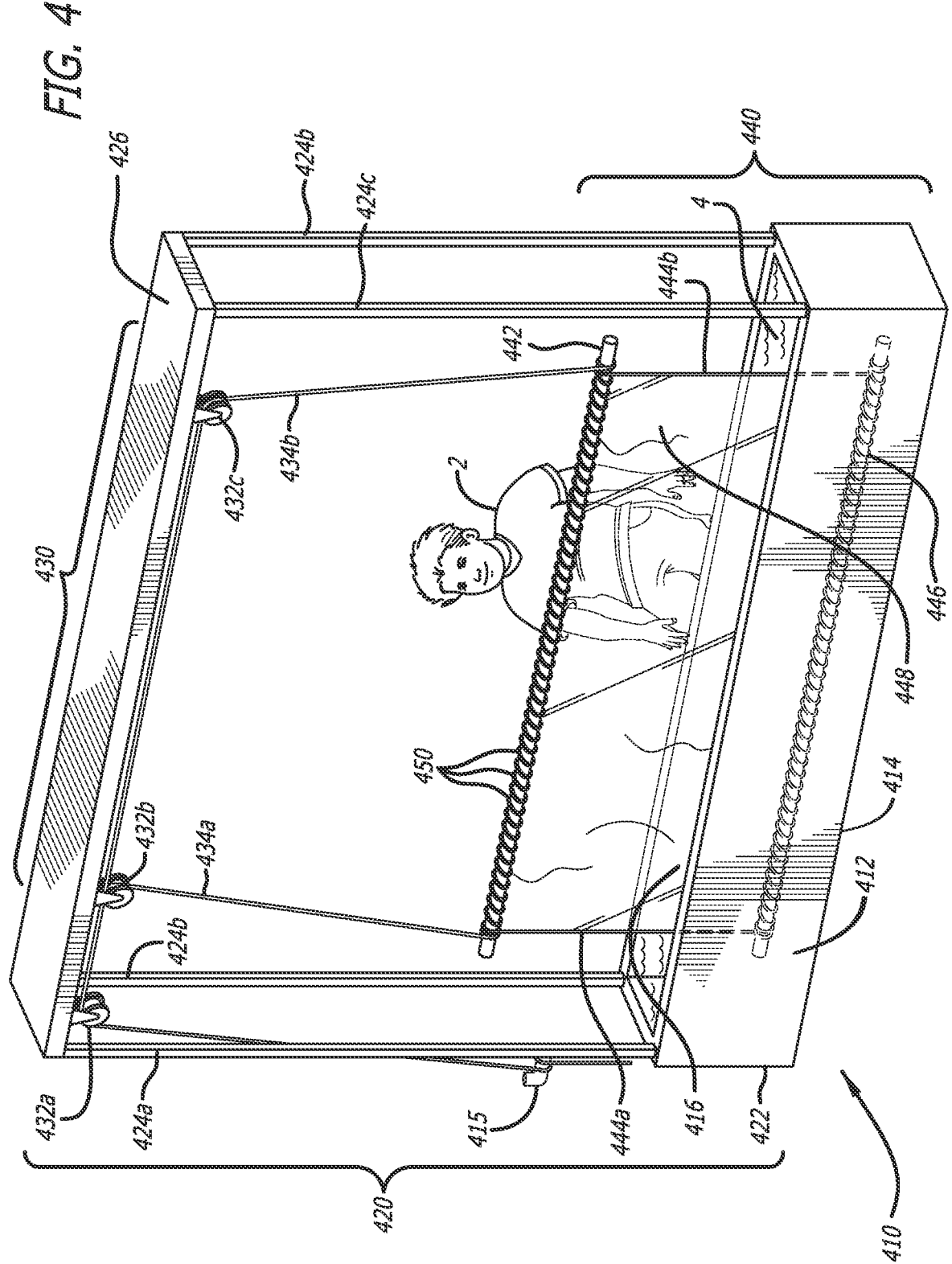

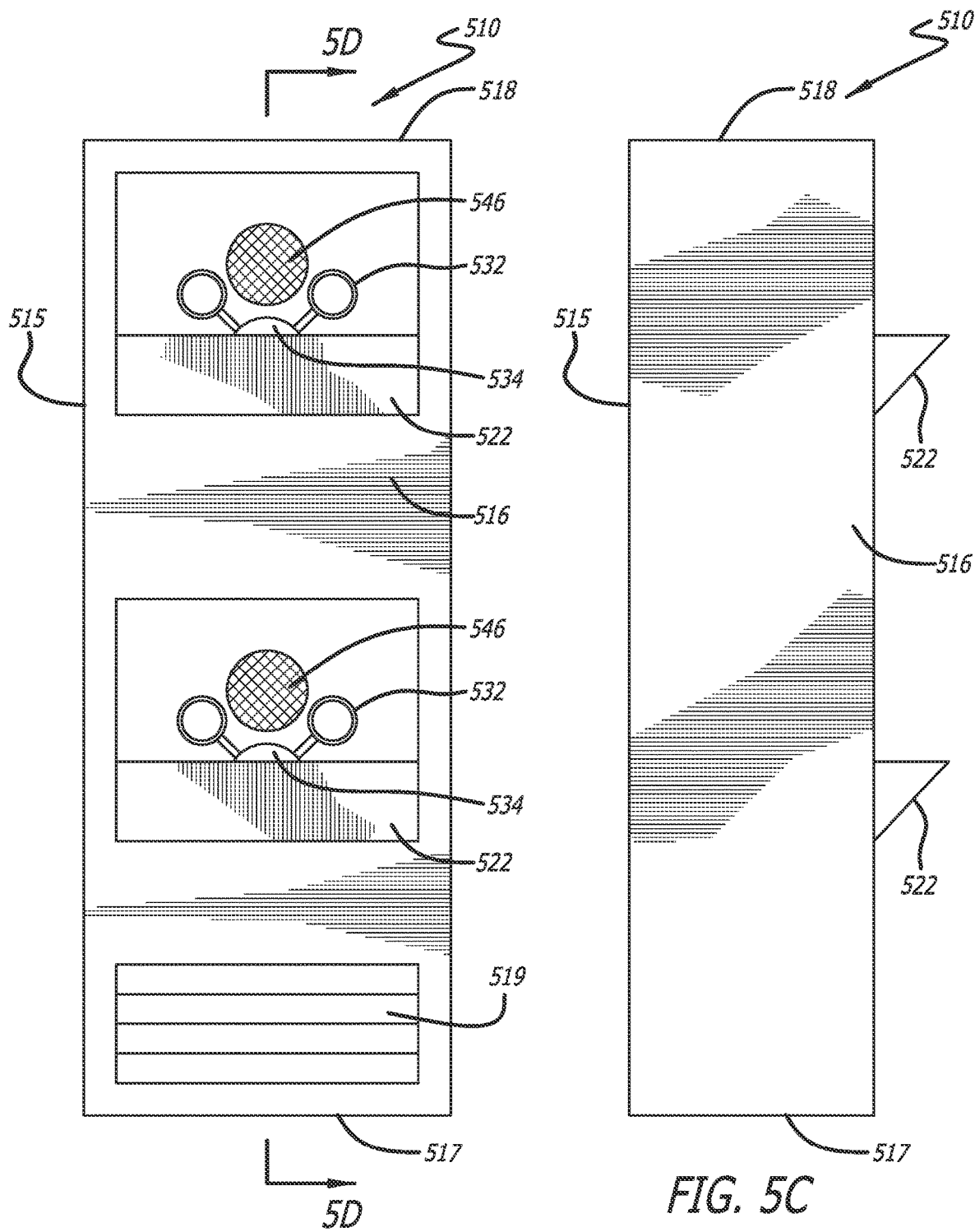

ENTERTAINMENT/EDUCATIONAL SYSTEM AND ASSOCIATED APPARATUS, METHODS AND USES

CROSS-REFERENCE TO RELATED APPLICATION

This continuation claims the benefit of priority and the filing date pursuant to 35 U.S.C. § 120 to U.S. Non-Provisional application Ser. No. 16/779,238, filed Jan. 31, 2020, an application that claims the benefit of priority and the filing date pursuant to 35 U.S.C. § 119(e) to U.S. Provisional Application 62/885,172, filed Aug. 9, 2019, U.S. Provisional Application No. 62/799,523, filed Jan. 31, 2019, U.S. Provisional Application No. 62/799,544, filed January 31, and U.S. Provisional Application No. 62/799,555, filed Jan. 31, 2019, the content of each of which is herein incorporated by reference in its entirety.

FIELD

The present disclosure relates in general to an entertainment/educational facility, and is more specifically directed to associated stations, systems, apparatus and methods of use that incorporate use of bubbles for entertainment and educational purposes. More particularly and in accordance with aspects of the present disclosure, an entertainment/educational facility is provided that features multiple bubble-making stations at which a user or users are able to engage in various interactive activities utilizing bubbles.

BACKGROUND

For many years, bubble play has been used as an entertainment activity for children. Specifically, bottles of bubble solution (in its simplest form, detergent and water), along with a tool for helping form bubbles, have been sold at toy stores and other retail shops for decades. Users create bubbles by immersing the tool, typically referred to as a wand or hoop, in a bubble solution and then blowing air through the wand or hoop. This air is typically supplied from their lungs onto a designated bubble-making portion of the tool which serves to form a thin sheet of the bubble solution to create one or more bubbles. These bubbles can be chased or observed by the children participating in the play. More recently, larger tools have been available, such as battery powered bubble-guns and large wands for making various sizes and numbers of bubbles, sometimes simultaneously. These tools are generally hand-held. Such tools typically create large bubbles by moving the tool so that the tool will capture air and create the bubble or bubbles.

Thus, these typical play experiences limit a user to the bubbles provided by just one type of tool. It would be advantageous to a user or multiple users to visit and utilize an entertainment/educational facility and engage with various systems at a plurality of bubble-making stations where each station has an associated apparatus for making a particular type of bubble, plurality of bubbles or a substantially planar bubble solution sheet/film or a wall. Further, such a facility can provide users with additional educational and behavioral development aspects, in addition to the entertainment value associated with bubble play.

SUMMARY

The present specification discloses an entertainment/educational facility comprising one or more stations. Each of the one or more stations comprising a system, the system comprising an apparatus, methods of using and/or interacting with the apparatus and station-specific media demonstrating basic educational science and mathematical principles using, e.g., a STEM curriculum. The system present in each of the one or more stations is different than the system present in any of the other of the one or more stations. The apparatus included in each system present in the one or more stations typically form a particular type of bubble element made of bubble solution, such as a bubble and/or a plurality of bubbles and/or a substantially planar bubble sheet/film or a bubble tube (substantially planar or not) that is associated with a particular bubble-making station. Activities provided by and at the various bubble-making stations, enable the user or users to enjoy, observe, make and learn about bubbles and other structures made with bubble solution and the associated underlying scientific concepts by participating in various bubble(s) and bubble sheet/film or wall making activities. Station-specific media can be in the form of live instruction and/or demonstration or in the form of a poster or posters, a handout, a monitor (such as an interactive monitor/touch-screen monitor) and a water-proof monitor or tablet (interactive or not), for example.

In aspects of the present disclosure, the one or more stations may comprise a first system comprising a bubble making apparatus and educational information regarding the scientific principles of bubbles. In aspects, the bubble making apparatus may comprise a support structure and a pumping system. In aspects, the support structure includes one or more sides, a bottom, a top opening, one or more basins, a trough and a reservoir. Each of the one or more basins may have one or more sides, a bottom and a port, the port being positioned at the bottom of each of the one or more basins. Each of the one or more basins is configured to contain a bubble solution. The trough can comprise a trough bottom biased toward the reservoir in a manner that directs the bubble solution falling onto the trough bottom is directed toward the reservoir, and the reservoir is configured to contain a bubble solution. In aspects, the pumping system including one or more pumps and one or more conduits, the one or more conduits connecting at least one pump to the port of each of the one or more basins. In operation the at least one pump continuously transports the bubble solution contained in the reservoir through the one or more conduits to the port of each of the one or more basins, thereby filling each of the one or more basins with the bubble solution.

In aspects of the present disclosure, the one or more stations may comprise a second system comprising a gas producing apparatus and educational information regarding the scientific principles of bubbles. In aspects, the gas producing apparatus may comprise a base and a smoke-like fog generating apparatus. In aspects, the base comprises one or more sides, a bottom and a top surface, the top surface having one or more basins. Each of the one or more basins may comprise one or more sides and a bottom and be configured to contain a bubble solution. In aspects, the smoke-like fog generating apparatus comprises a body, a heating element and a lid. The body may include one or more sides, a bottom, a top opening opposite the bottom, with the resulting interior space defining an internal reservoir. The heating element may abut the bottom or the one or more sides of the body. The lid may include one or more ports and one or more hoses, the one or more hoses each comprising a first end and a second end. The first end of each of the one or more hoses is attached to each of the one or more ports. In use, when the lid is closed over the top opening of the body, the internal reservoir, one or more ports and one or more hoses form a continuous fluid paths until reaching the second end of each of the one or more hoses. In addition, each of the one or more basins may be configured to receive the second end of each of the one or more hoses. In operation dry ice and water placed inside internal reservoir sublimates to produce gas that flows from the internal reservoir through the each one or more ports and each of the one or more hoses, thereby expelling the gas from the second end of each of the one or more hoses.

In aspects of the present disclosure, the one or more stations may comprise a third system comprising a mobile gas producing apparatus and educational information regarding the scientific principles of bubbles. In aspects. the mobile gas producing apparatus may comprise a carrier and a mobile smoke-like fog generating apparatus. In aspects, the mobile smoke-like fog generating apparatus may comprise a body, a heating element, and a lid. The body may include one or more sides, a bottom, a top opening opposite the bottom, with the resulting interior space defining an internal reservoir. The heating element may abut the bottom or the one or more sides of the body. The lid may include one or more ports and one or more hoses, the one or more hoses each comprising a first end and a second end. The first end of each of the one or more hoses is attached to each of the one or more ports. In use, when the lid is closed over the top opening of the body, the internal reservoir, one or more ports and one or more hoses form a continuous fluid paths until reaching the second end of each of the one or more hoses. In addition, each of the one or more basins may be configured to receive the second end of each of the one or more hoses. In operation dry ice and water placed inside the internal reservoir sublimates to produce gas that flows from the internal reservoir through the each one or more ports and each of the one or more hoses, thereby expelling the gas from the second end of each of the one or more hoses.

In aspects of the present disclosure, the one or more stations may comprise a fourth system comprising an inflatable apparatus and educational information regarding the scientific principles of bubbles. In aspects, the inflatable apparatus may comprise a first inflated chamber, a second inflated chamber, and an inflation system. The first inflated chamber has a contiguous portion with the second inflated chamber, and typically an opening is present in the contiguous portion to create a pathway between the first inflated chamber and the second inflated chamber. In aspects, the first inflated chamber may be substantially spherical and curved in shape with a flat bottom. In aspects, the second inflated chamber being substantially cuboidal in shape. The second inflated chamber typically comprises an entrance enabling a user to access the second inflated chamber from outside the apparatus. The inflation system may comprise an inflation device and one or more air conduits, with the one or more air conduits connecting the inflation device to at least the first inflated chamber. In operation the inflation device expels air through the one or more conduits and into at least the first inflated chamber, thereby inflating the first inflated chamber.

In aspects of the present disclosure, the one or more stations may comprise a fifth system comprising a bubble sheet making apparatus and educational information regarding the scientific principles of bubbles. In aspects, the bubble sheet making apparatus may comprise a frame system, a lift system and a bar system. In aspects, the frame system can comprise a bottom trough, one or more vertical support members and a top support structure. The bottom trough can include one or more sides, a bottom and a top opening opposite the bottom, with the resulting interior space defining a reservoir. The bottom trough is configured to contain a bubble solution in the reservoir. The one or more vertical support members span the space between the bottom trough and the top support structure. In aspects, the lift system can include one or more pulleys and one or more lifting cords, each comprising a first end and a second end. The one or more pulleys are secured to the top support structure of the frame system. In aspects, the bar system comprising a top bar, one or more depending cords, and a bottom bar. The top bar comprises a first end, a second end and an absorbent material. Each of the one or more depending cords comprising at least a free end and composited of a collapsible material. The one or more depending cords is secured to the top bar and the at least a free end of the one or more depending cords is secured to the bottom bar. In aspects, the first end of each of the one or more lifting cords of the lift system is secured to the top bar, the one or more lifting cords then passed through the one or more pulleys, thereby having the second end of each of the one or more lifting cords on the side of the one or more pulleys opposite the side of the first end of each of the one or more lifting cords. In operation, the bar system submerged in the bubble solution contained in the bottom trough is lifted vertically upward out of the bottom trough using the lift system, thereby forming a bubble sheet using the bubble solution contained within a framework created by the top bar, one or more depending cords and the bottom bar.

In aspects of the present disclosure, the one or more stations may comprise a sixth system comprising a bubble making apparatus, an activity area, and educational information regarding the scientific principles of bubbles. In aspects, the bubble making apparatus can comprise a support structure one or more bubble producing systems. In aspects, the support structure can include one or more sides, a bottom and a top, and can comprise a power system and a ventilation system. The power system can include a power supply to generate electricity and one or more electrical wires. In aspects, each of the one or more bubble producing systems can comprise a motorized bubble producing tool system and an air stream producing system. In aspects, the motorized bubble producing tool system can include a reservoir, one or more bubble producing tools attached to a central hub and a motor, with the central hub is operably linked to the motor, and the reservoir being configured to contain a bubble solution. In aspects, the air stream producing system comprising a motorized blower and a vent. The one or more electrical wires connect the power supply to the motor of the motorized bubble producing tool system and the motorized blower the air stream producing system. In operation the motorized blower continuously expels air in a generally horizontal direction through vent and outward from the front of the bubble making apparatus and the motor of the motorized bubble producing tool system continuously spins the central hub causing each of the one or more bubble producing tools to undergo a rotational cycle through the bubble solution contained in the reservoir and past air stream being expelled through the vent, thereby causing formation of a stream of bubbles. In aspects, the activity area can comprise at least one receptacle including projectiles.

In aspects of the present disclosure, the one or more stations may comprise a seventh system comprising a bubble tower making apparatus and educational information regarding the scientific principles of bubbles. In aspects, the bubble tower making apparatus can comprise a base, a support frame system, and a lift system. In aspects, the base system can include a platform, a fluid trough and a base surround.

Typically, the base surround is located along the outside perimeter of the fluid trough and the fluid trough is located along the outside perimeter of the platform. The fluid trough configured to contain a bubble solution. In aspects, the support frame system can include one or more vertical support members and a top frame, with the one or more vertical support members span the space between the base system and the top frame. In aspects, the lift system can include one or more lifting pulleys, one or more control pulleys, one or more cables, and a bubble forming device, with each of the one or more cables comprising a first end and a second end. The one or more lifting pulleys and one or more control pulleys are secured to the top frame of the support frame system. The bubble forming device conforms to the shape of the fluid trough and the one or more cables are each secured to the bubble forming device. In aspects, the first end of each of the one or more cables of the lift system is secured to the bubble forming device, the one or more cables then passed through the one or more lifting pulleys and one or more controlling pulleys, thereby having the second end of each of the one or more cables on the side of the one or more lifting pulleys and one or more controlling pulleys opposite the side of the first end of each of the one or more cables. In operation, the bubble forming device submerged in the bubble solution contained in the fluid trough is lifted vertically upward out of the fluid trough using the lift system, thereby forming a bubble tower using the bubble solution contained between the bubble forming device and the bubble solution contained in the fluid trough.

In aspects of the present disclosure, the one or more stations may comprise an eighth system comprising a bubble light apparatus and educational information regarding the scientific principles of bubbles. In aspects, the bubble light apparatus can comprise a support structure and a lighting system. In aspects, the support structure can include one or more sides, a bottom and a top surface, the top surface having one or more basins, the one or more basins including one or more sides and a bottom and configured to contain a bubble solution. In aspects, the bottom being partially or fully transparent and/or partially or fully translucent, thereby enabling light to transmit therethrough. In aspects, the lighting system including one or more light sources, at least one power supply to generate electricity, and one or more electrical wires. The one or more electrical wires connect the at least one power supply to each of the one or more light sources. In aspects, the one or more light sources are located underneath the bottom of each of one or more basins. In operation, one or more users create one or more bubbles using the bubble solution contained in the one or more basins and light being emitted from the one or more light sources shine through the one or more bubbles.

In aspects of the present disclosure, the one or more stations may comprise a ninth system comprising a bubble jet apparatus and educational information regarding the scientific principles of bubbles. In aspects, the bubble jet apparatus can comprise a support structure and an air stream system. In aspects, the support structure can include one or more sides, a bottom and a top surface, the top surface having one or more basins and one or more vents, the one or more basins including one or more sides and a bottom and configured to contain a bubble solution. In aspects, the air stream system can include at least one motorized blower, one or more ducts, at least one power supply to generate electricity, and one or more electrical wires, with the one or more electrical wires connect the at least one power supply to the at least one motorized blower. The bubble jet apparatus further comprises one or more bubble making tools. In operation, one or more bubbles are formed when a user positions a bubble making tool containing the bubble solution over one of the one or more vents, thereby causing air being expelled through the one of the one or more vents to pass through the bubble making tool thereby creating the one or more bubbles from the bubble solution contained in the bubble making tool.

In aspects of the present disclosure, the one or more stations may comprise a tenth system comprising a bubble pedestal apparatus and educational information regarding the scientific principles of bubbles. In aspects, the bubble pedestal apparatus can comprise a support structure and one or more casters. In aspects, the support structure can include one or more sides and a top surface, the top surface having one or more lips positioned around the perimeter of the top surface thereby defining a basin, the basin being configured to contain a bubble solution. The bubble pedestal apparatus further comprises one or more bubble making tools.

The present specification also discloses systems comprising an apparatus, methods of using and/or interacting with the apparatus and station-specific media demonstrating basic educational science and mathematical principles using, e.g., a STEM curriculum. The disclosed systems can operate inside an entertainment/educational facility as disclosed herein, or separately. When operating as a separate system, the disclosed systems can be mobile systems that are transported to a location, such as, e.g., a park, a government sponsored fair, a privately sponsored fair or event, a commercial setting, or any other location desiring employment of the systems disclosed herein. In aspects, the system disclosed herein include the first through tenth systems described herein.

The present specification also discloses apparatus and associated methods of using and/or interacting with the apparatus. In aspects, the apparatus disclosed herein include the first through tenth apparatus described herein.

BRIEF DESCRIPTION OF DRAWINGS

The above and further advantages of this disclosure may be better understood by referring to the following description in conjunction with the accompanying drawings, in which like numerals indicate like structural elements and features in various figures. The drawings are not necessarily to scale, emphasis instead being placed upon illustrating the principles herein described and provided by exemplary embodiments and aspects of the invention.

FIG. 1B showing a front perspective view of the apparatus; FIG. 1C showing a top view of the apparatus; FIG. 1D showing a cross-sectional view of the apparatus; and FIG. 1E showing a side perspective view of the apparatus;

FIGS. 2A-2C illustrate an exemplary smoke-like fog generating system 200 comprising gas producing apparatus 210 disclosed herein providing bubbles filled with smoke-like fog with FIG. 2A showing a front perspective view of the gas producing apparatus being loaded with dry ice; FIG. 2B showing a front perspective view of the apparatus in use by a plurality of users; and FIG. 2C showing a cross-sectional view of the gas producing apparatus;

FIG. 3B showing a side view of the apparatus;

FIG. 4 illustrates a front perspective view an exemplary system 400 comprising bubble sheet making apparatus 410 disclosed herein to provide a bubble sheet;

FIGS. 5A-5D illustrate an exemplary system 500 comprising bubble-making apparatus 510 disclosed herein to provide a stream of bubbles with FIG. 5A showing a front perspective view of an exemplary bubble-making station in use by a user; FIG. 5B showing a front view of the apparatus; FIG. 5C showing a side view of the apparatus; and FIG. 5D showing a cross-sectional view of the apparatus;

FIG. 6B showing a side perspective view of a top portion having an exemplary pulley system of the apparatus; FIG. 6C showing a top view of a second exemplary embodiment of a base of FIG. 6A; FIG. 6D showing a side view of a second exemplary embodiment of a base of FIG. 6A; FIG. 6E showing a top view of a third embodiment of a base of FIG. 6A, FIG. 6F showing a cross-sectional view of the base of FIG. 6E; FIG. 6G showing a top view of a fourth exemplary embodiment of the base of FIG. 6A; and FIG. 6H showing a side view of a fourth exemplary embodiment of the base of FIG. 6A;

FIG. 7B showing a top view of the apparatus; and FIG. 7C showing a cross-sectional view of the apparatus;

FIG. 8B showing a top view of the apparatus; FIG. 8C showing a cross-sectional view of a first embodiment of the bubble jet apparatus of FIG. 8A; and FIG. 8D showing a cross-sectional view of a second embodiment of the bubble jet apparatus of FIG. 8A;

FIG. 9B showing a front perspective view of a plurality of bubble pedestal apparatus having differing geometries from one another; FIG. 10B showing a cross-sectional view of the mobile gas producing apparatus.

DETAILED DESCRIPTION

Figure 1A:
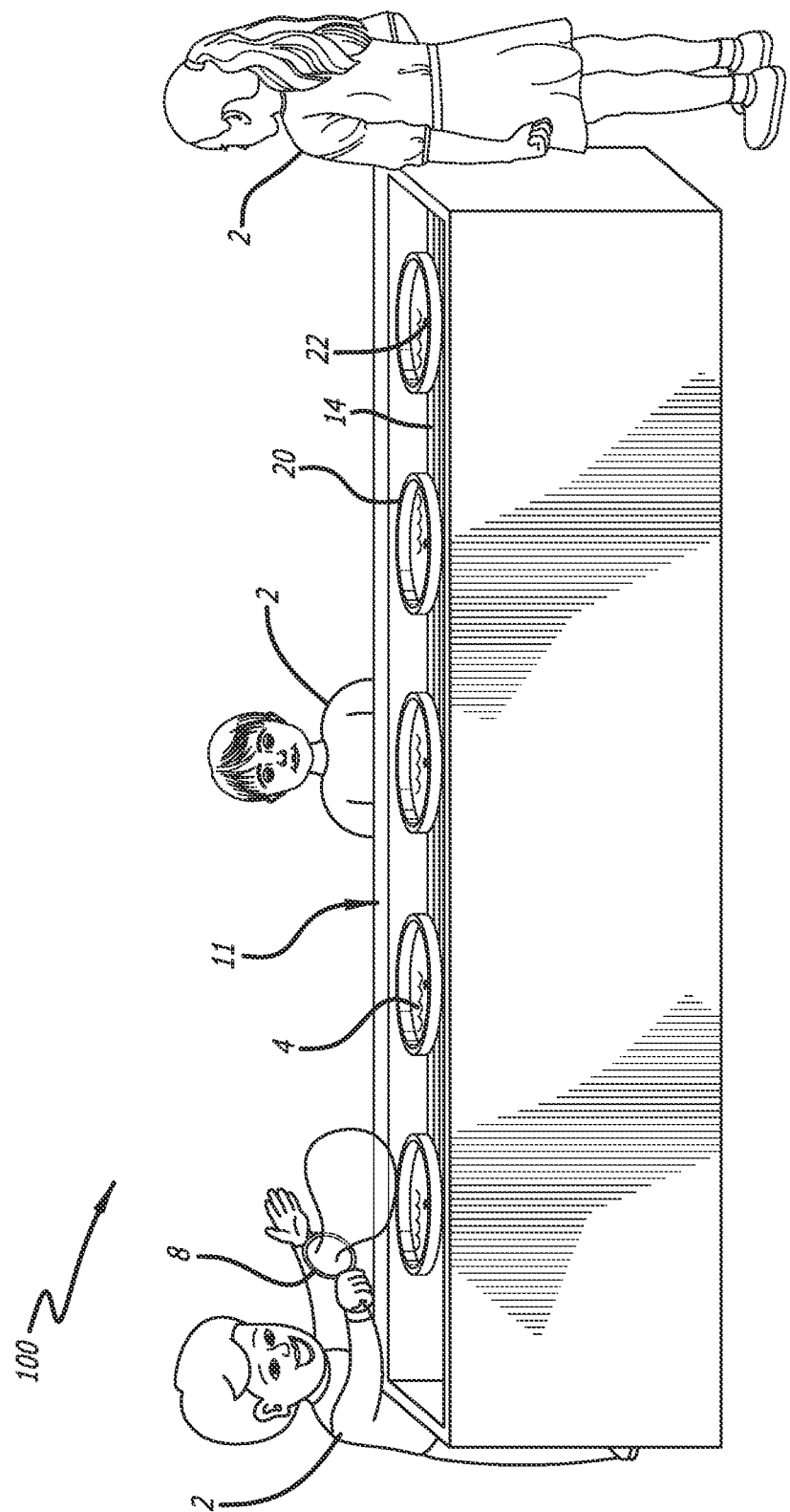
FIGS. 1A-1E illustrate an exemplary system 100 comprising bubble-making apparatus 11 disclosed herein utilizing bubble solution with FIG. 1A showing a front perspective view of the apparatus in use by a plurality of users.

The present specification discloses an entertainment/educational facility comprising a plurality of bubble-making stations disclosed herein. Each of the plurality of bubble-making stations has an associated system including methods for interacting with a bubble element and an apparatus for making a particular type of bubble element, such, as, e.g., single bubbles, a plurality of bubbles, a substantially planar bubble sheet/film or wall, and/or bubbles filled with a substance differing from the surrounding ambient air. The facility, its stations and associated systems and apparatus provided in accordance with the teachings of the present disclosure serves as a way for users to have an interactive, entertaining and enjoyable learning experience based upon particular type of bubble elements, bubble-making.

Besides the entertainment value associated with bubble play, each station can provide a user or users with educational and/or behavioral development features associated with the particular bubble element produced by the apparatus at that station. In accordance with the teachings of the present disclosure, an entertainment facility having multiple unique bubble-making stations can provide an environment where users can be brought and participate in a curriculum that is outlined and tailored to individual users or sets of users. For example, a science, technology, engineering and mathematics (STEM) Curriculum, where bubble-making stations and lessons are tailored to include and cover age-appropriate material, can be provided. Such a curriculum can include a booklet or handout that describes the use of each particular set of selected bubble-making stations, along with appropriate reading materials containing particular bubble-making station specific suggested activities and questions to be explored, according to the age of the particular users. An exemplary curriculum is described below.

While each station has an independent system comprising at least one apparatus for making a particular type of bubble element and associated uses and methods of entertainment, education and behavioral development, in combination, a plurality of such stations form a greater system and an entertainment/educational facility providing entertainment, educational and behavioral development value.

The following is a description of an entertainment/educational facility and its various exemplary bubble-making stations, systems and associated apparatus for making a bubble element and methods of using the apparatus or interacting with the bubble element. Associated scientific or other educational principles as basin as skills that improve or advance behavioral development can be undertaken and discussed at various bubble-making stations. It is to be understood that two or more bubble-making stations, systems and apparatus serve as and function as an entertainment/educational facility. It is to be also understood that any number of bubble-making stations (e.g., stations that utilized bubble solution) may be provided and visited, and such engagement can be in any desired order. In particular embodiments, the entertainment/educational facility has a least one bubble-making station that utilizes carbon dioxide that is sublimated off of dry ice in order to provide for and create a bubble or bubbles filled with smoke-like fog, in addition to having at least one or more bubble-making station that does not utilize dry ice in water to provide a bubble or bubbles filled with smoke-like fog, but rather provides bubbles and/or a substantially planar bubble solution sheet/film or a wall that are clear and transparent.

The detailed description set forth below in connection with the appended drawings is intended as a description of the concepts and teachings of the instant disclosure and is not meant to be limiting. Thus the disclosed invention is not limited to only the exemplary teachings and/or configurations of the bubble-making stations, systems, apparatus, and methods of use disclosed herein. It is further understood that the use of relational terms such as first, second, distal, proximal, and the like are used solely to distinguish one from another entity without necessarily requiring or implying any actual such relationship or order between such entities.

A first exemplary bubble-making station includes a system 100 that comprises an bubble making apparatus, methods of using and/or interacting with the bubble making apparatus and station-specific media demonstrating basic educational science and mathematical principles using, e.g., a STEM curriculum. The bubble making apparatus comprises one or more basins with a bubble solution therein and a pumping system (which may or may not include a filter) that continuously supplies basin(s) with running bubble solution. One or more bubble producing tools, such as bubble wands, which may have multiple shapes with one or more hoops may be provided.

Figure 1B:
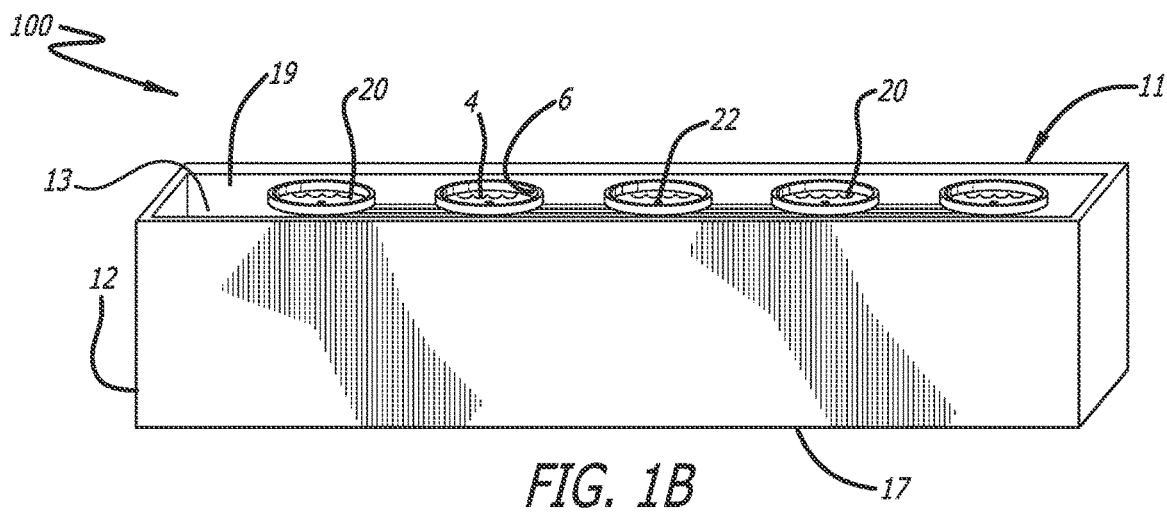
Figure 1C:
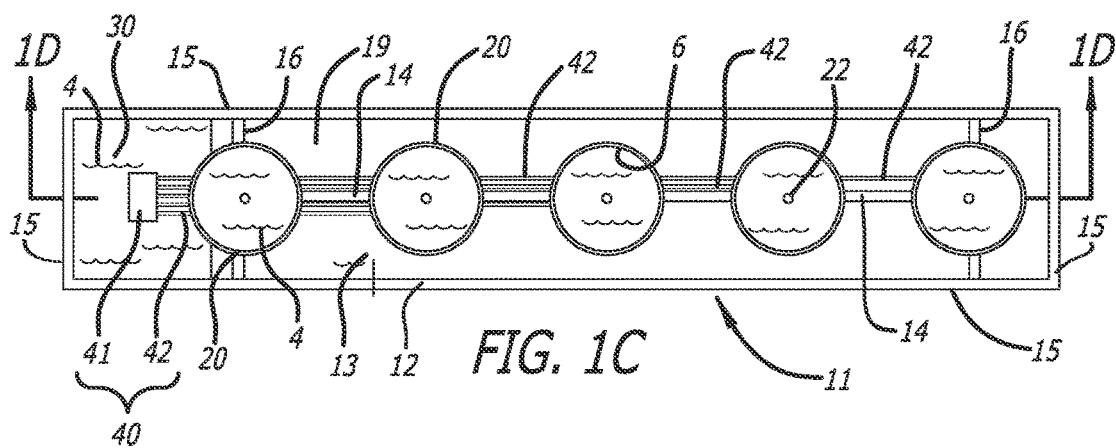

Referring to FIGS. 1A-1E, an exemplary bubble making apparatus 11 comprises a support structure 12 and a pumping system 40. As shown in FIGS. 1A-1C, support structure 12 of bubble making apparatus 11 generally comprises one or more sides 15, a bottom 17, and a top opening 19 opposite bottom 17, the resulting top opening 19, top opening 19 being defined by the perimeter formed by one or more sides 15. As discussed below, support structure 12 is used to stably support one or more basins 20 for proper use by a user. Support structure 12 may be curved, defining a circle or an oval, or any cuboidal shape with square and rectangular shapes being preferred, the cuboidal shape having sharp (right-angled) or curved corners. In some embodiments, support structure 12 is circular or oval and can have a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance. In one embodiment, support structure 12 is generally cuboidal in shape. In some embodiments, support structure 12 is cuboidal and can have a width of 1 to 4 feet, 2 to 4 feet, 3 to 4 feet, 1 to 3 feet, 2 to 3 feet, or 1 to 2 feet and a length of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet. The height of support structure 12 can be 1 to 5 feet, 1 to 4 feet, 1 to 3 feet, 2 to 3 feet or 1 to 2 feet.

In addition, a perimeter formed by one or more sides 15 and top opening 19 may be curved, defining a circle or an oval, or any closed polygonal shape with triangle, square, rectangular, and pentagonal shapes. In some embodiments, the perimeter formed by one or more sides 15 and top opening 19 is circular or oval and can have a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance. In one embodiment, the perimeter formed by one or more sides 15 and top opening 19 is generally polygonal in shape. In some embodiments, the perimeter formed by one or more sides 15 and top opening 19 is polygonal in shape and each length of the polygon can be 1 to 4 feet, 2 to 4 feet, 3 to 4 feet, 1 to 3 feet, 2 to 3 feet, 1 to 2 feet, 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet.

Figure 1D:
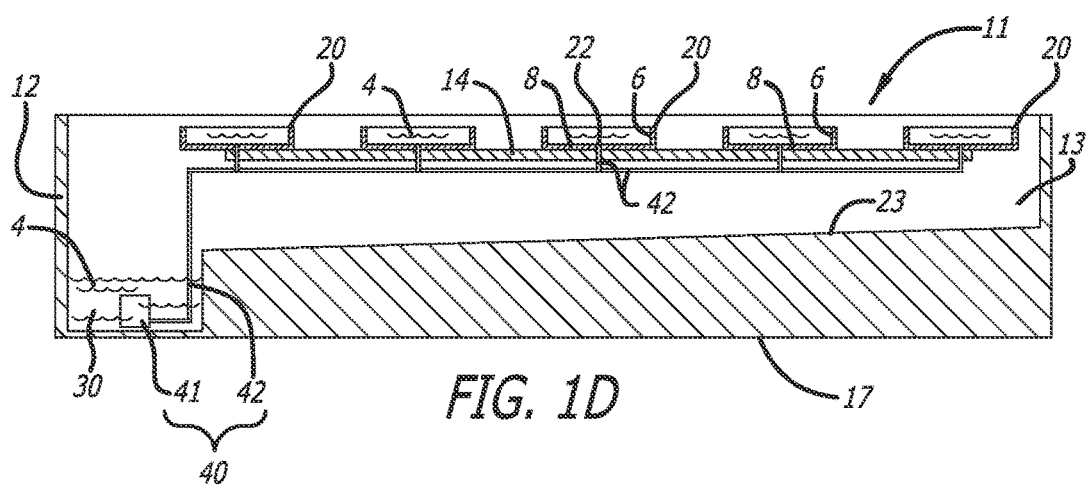

As best shown in FIG. 1D, a first internal space of support structure 12 is located below the plain of top opening 19 and defines a trough 13. The shape of trough 13 is defined by the internal surface of each of the one or more sides 15 of support structure 12 and a trough bottom 23. Still referring to FIG. 1D, a second internal space of support structure 12 defines a reservoir 30. Reservoir 30 is typically located on one end of trough 13.

As best shown in FIG. 1D, one or more basins 20 comprise one or more sides 6 and a bottom 8 and a top edge of each of the one or more sides 6 may be rounded off or be provided having a substantially right angle. In particular configurations, support structure 12 can comprise at least one basin, for example, one or more basins, 2 to 10 basins, 3 to 9 basins, 4 to 8 basins, 3 to 7 basins, 4 to 7 basins, 5 to 7 basins, 4 to 6 basins, or 5 or 6 basins. Each of the one or more basins 20 can serve as a container for bubble solution 4. Each of the one or more basins 20 are filled to a sufficient depth that may be manually delivered into basins 20. Each of the one or more basins 20 can be of any suitable geometry, perimeter, and/or shape and any depth that provides for a sufficient area and volume to hold bubble solution 4. In a preferred embodiment, each of the one or more basins are circular and have a flat bottom 8 and a surrounding side 6 that rises from, for example, about 0.25 inches to 0.5 inches, about 1 inch to 5 inches, about 2 to 4 inches to about 3 inches from the bottom of the basins. Each of the one or more basins 20 can have a depth of bubble solution 4 of, for example, about 0.25 inches to 0.5 inches, about 0.25 inches to about 0.75 inches, about 0.5 inch to about 1 inch, about 1 inch to about 2 inches or about 0.5 inch to about 3 inches contained therein. As shown in FIG. 1B, each basin 20 includes a port 22, where fresh bubble solution is provided from reservoir 30 using a pump 40 and one or more conduits 42 that lead up to or through port 22. Each of the one or more basins 20 may be made of any material which may retain a bubble solution, with materials that withstand corrosion from a bubble solution being preferred, such as, e.g., plastic, fiberglass, treated wood, glass, metal or any suitable material that can hold a bubble solution.

Referring to the top view provided by FIG. 1C, one or more basins 20 may be located over top opening 19 overlooking or within trough 13 being positioned on support arms. Support arms provide for positioning of the one or more basins 20 such that overflow of bubble solution 4 contained therein falls to trough bottom 23. In one embodiment, support arms span the open trough portion. As an example and as best seen in FIGS. 1C & 1D, each basin 20 is positioned at the open portion trough 13 using a support arm 14 (running parallel with the long side of the rectangular (cuboid) bubble making apparatus 11) and a pair of cross support arms 16 located at either end of support arm 14, the pair of cross support arms 16 being attached to the long side of trough 13. In an alternative embodiment, one or more basins 20 may be supported by posts, or posts and crossbeams, the posts arising from the bottom of trough 13. In addition to supporting the one or more basins 20, support arms disclosed herein also provide a surface to which conduits/tubing from one or more pumps can run along or in and be secured thereto on their way to each basin. Conduits may be secured to the posts and/or support arms utilizing zip ties, hook and loop fasteners, adhesives, waterproof tape and any other suitable means.

Referring to FIG. 1D, trough bottom 23 is slanted/titled such that bubble solution 4 spilling or falling onto trough bottom 23 from one or more basins 20 is biased and feeds or directs bubble solution 4 toward reservoir 30 (there can be more than one reservoir provided). There may be provided a raised lip portion spanning perpendicular to support arm 14 on bottom portion 23 of trough 13 and having a height of about 0.5 inch to 1 inch. Conduits 42 can be flexible tubing made out of plastic, silicone or vinyl or can be relatively inflexible tubing made out of, for example, PVC or a metal.

As best shown in FIG. 1C &1D, bubble making apparatus 11 further comprises pumping system 40. Pumping system 40 comprises one or more pumps 41 and one or more conduits 42, typically located at or in reservoir 30. A pump 41 disclosed herein recirculates bubble solution 4 from reservoir 30 to the one or more basins 20 of bubble making apparatus 11 via one or more conduits 42. An exemplary pump 41 can be a submersible pump. Referring to FIGS. 1C & 1D, one or more conduits 42 are connected to pump 41 and provide a pathway by which bubble solution 4 located at reservoir 30 is then delivered into each basin 20. In one embodiment, the end of each conduit 42 is attached to port 22 at the bottom of each basin 20. Conduit 42 runs from pump 41 in reservoir 30 to each basin 20. It is further contemplated that one or more conduits 42 may provide bubble solution 4 to one or more basins 20 by simply being positioned over a lip 6 of each basin 20 or into and through a side of lip 6 of basin 20, or any combination thereof. It is further contemplated that in alternative embodiments, pump 40 may be positioned outside reservoir 30 and is provided with intake conduit in bubble solution 4 and outtake tubing eventually leading to basins 20, as long as a circulating flow of bubble solution 4 is maintained at a relatively fixed volume throughout the system, i.e. between reservoir 30 and one or more basins 20. It is contemplated that in alternative embodiments each basin can be provided with its own pump or, as in a preferred embodiment, the pump may have attached a main tube/conduit from which additional sections of tubing/conduit branch and run to each individual basin 20.

Figure 1E:
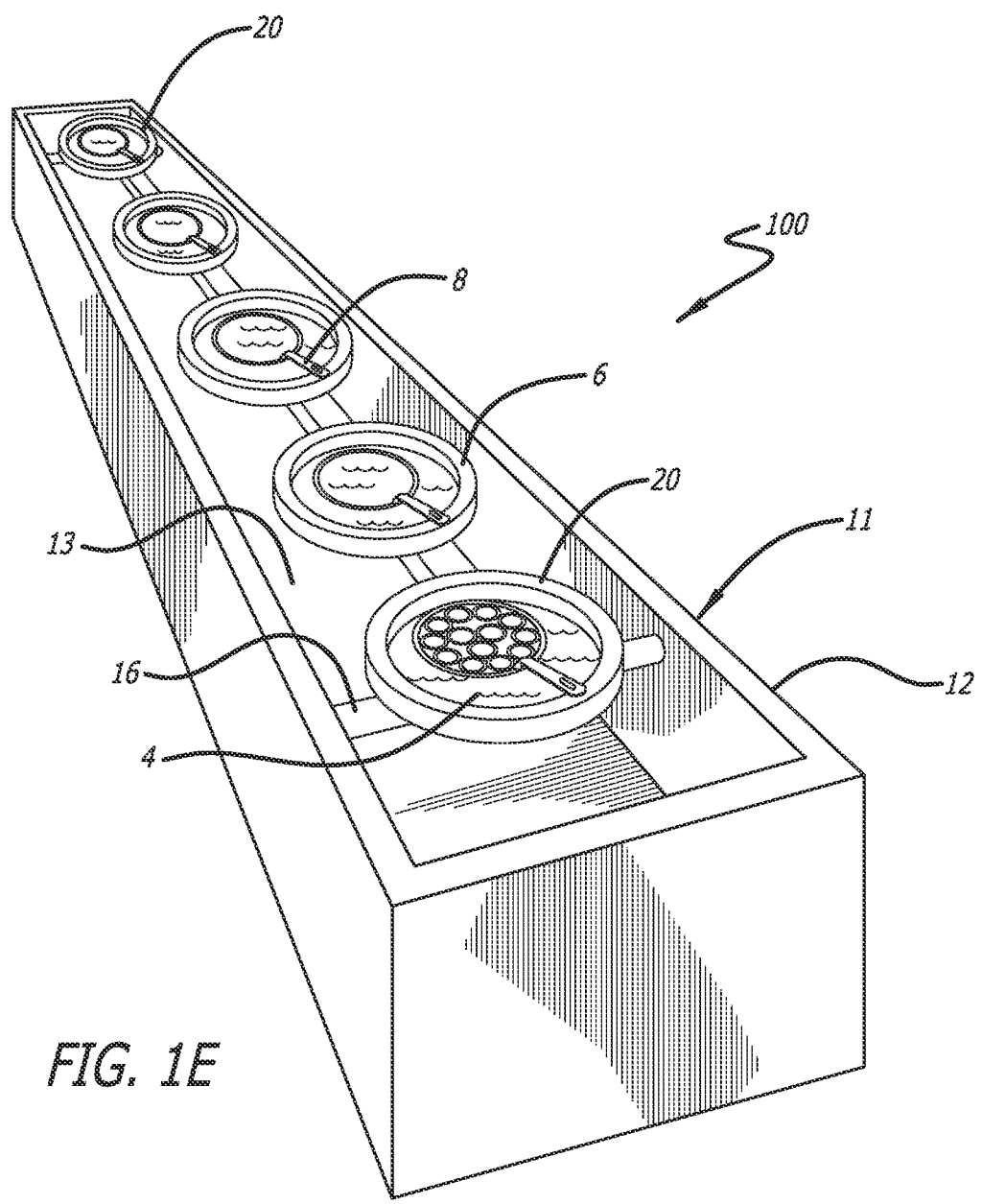

FIG. 1E shows an alternative embodiment of bubble making apparatus 11, having a plurality of basins 20 but no pump 41 or reservoir 30. In this embodiment, bubble making apparatus 11 is supplied with bubble solution 4 by simply filling each basin 20 with bubble solution 4 via manual pouring of bubble solution 4 into each basin. Such pouring can be accomplished by any number of traditional methods, such are pouring bubble solution 4 from a pitcher, bottle, bag or ladling bubble solution 4 from a vessel to reach a desired depth/amount of bubble solution 4 in each basin 20. Accordingly, and since there is no pump 41 or reservoir 30 in this system, bottom portion 23 here can be substantially horizontal as there is no need to feed spilled bubble solution 4 to a reservoir 30 of bubble making apparatus 11. Also shown in FIG. 1E are exemplary bubble producing tools 8 that can vary and include wands, hoops, other instruments capable of generating bubbles from a bubble solution 4. Such exemplary bubble producing tools 8 can have a handle and a single hoop disposed within a frame or a handle and a plurality of hoops disposed within a frame.

In operation, a user manipulates bubble solution 4 contained in one or more basins 20 with a bubble producing tool 8. When using larger bubble produce tool 8, a user is able to create large bubbles to catch with the tool and then may be able to proceed to blow bubbles within bubbles. A bubble producing tool 8 can be further used to manipulate bubbles into various tricks and challenges. In addition, a user can also wet their hands with bubble solution 4 from a basin and catch the bubbles in the user's palms without having the bubbles pop. Further, a user can also wet the user's hands with bubble solution 4 in a basin and use the hands themselves as a "bubble producing tool" where the user blow bubbles from "frames" created by the user's fingers by passing air from the user's lungs therethrough.

This first exemplary bubble-making station includes a system 100 providing station-specific media in a setting to facilitate basic educational science and mathematical principles using, e.g., a STEM curriculum. An attendant/guide can conduct a demonstration or lead a user(s) in an activity designed to exemplified various physical phenomena. After the demonstration the attendant/guide can lead a discussion, optionally referring to bubble-making station specific media for visuals to help explain the various scientific phenomena. Non-limiting examples of station specific media include, e.g., a poster, a handout, a monitor, an interactive monitor, a touch-screen monitor, a water-proof monitor or tablet. Alternatively such information may be provided solely in the form bubble-making station specific media, without the aid of an attendant/guide.

For example, an attendant/guide can themselves make or lead a user(s) in making bubbles that stretches out really long. In the course of this process, some of these stretched out bubbles will pop while others will not and become a spherical bubble. an attendant/guide can then ask the users if they notice that the bubble(s) eventually becomes round even if it started out really long? Ask them "why do they think that happens?". The attendant/guide can provide the following explanation, noting that bubbles can stretch and become all kinds of odd-looking shapes, but it one seals a bubble by flipping it off a wand, the tension in the bubble membrane shrinks to the smallest possible shape for the volume of air it contains. That's why even if it had an odd shape before you sealed it, once sealed shut, the bubble will shrink into a spherical shape. This is because compared to any other shape, a sphere has the smallest surface area for the amount of volume contained therein. This principle can be tested by utilizing a triangle wand. Hold it up, the attendant/guide can ask the user(s) "Do you think that if I make a bubble with it, the bubble will be triangular? Why or why not?". Of course, shapes other than a triangle can be utilized as wand to start a bubble off having a non-spherical shape, then once released, forming a sphere. Reference to various bubble-making station specific posters can be made.

Further exercises at this station can include blowing several bubbles and fanning them up to keep them from landing on the floor and popping. The attendant/guide can point to how the air temporarily transforms the bubble into a non-spherical shape, but it always goes back into a sphere. The attendant/guide can blow a bubble inside a bubble and as the question "Why do bubbles pop?" and them point out that other than being poked or landing on something sharp, bubbles pop when the water between the soap film surfaces evaporates. Accordingly, when it's cold, those water molecules take longer to leave, so that if you blow a bubble on a calm winter day, a bubble can even freeze and last for several minutes before it pops away. The colder the outside temperature is, the higher a bubble might fly. That's because the warm air from your breath is lighter than the surrounding cold air.

An attendant/guide or poster can ask additional question at this station including: 1) What is a bubble? An attendant/guide or poster can then explain that a bubble is just air wrapped in soap film. Soap film is made from soap and water (or other liquid). The outside and inside surfaces of a bubble consist of soap molecules. A thin layer of water lies between the two layers of soap molecules, sort of like a water sandwich with soap molecules for bread. They work together to hold air inside. Water molecules really like other water molecules (aka cohesion) and try to stick together as much as they can. Water molecules like each other so much that they will work really hard to stay together (aka surface tension). 2) Why a bubble is spherical in shape? An attendant/guide or poster can then explain that by using wands of various shapes (triangle, square, etc.), we can show that no matter the apparatus being used, the resulting bubble will be spherical in shape. The user can make a very long stretched out bubble, but once it's sealed, the tension in the bubble membrane shrinks to the smallest possible shape for the volume of air it contains. Compared to any other shape, a sphere has the smallest surface area for the amount of volume. 3) What is a good way to measure how big this bubble is? And who can make the biggest bubble? An attendant/guide or poster can then lead a discussion of circumference versus diameter can follow or be provided, for example. Such a bubble-making station as described above provides for significant educational as basin as physical development. Physical development realized and facilitated at such a bubble-making station includes, but is not limited to, motor/neurological precision development and practice, improved hand-eye coordination, oral-facial muscle development through via forcing air in a user's lungs through various bubble-making tools/wands, for example. In addition, such a station can also provide pulmonary exercises for a user via interactive engagement with bubble-making apparatus that requires a user to blow their own pulmonary air through a bubble making tool, such as a bubble wand, in order to form bubbles; 4) Do you think bubbles pop from the top or from the bottom? An attendant/guide or poster can then explain how gravity pushes the liquid and bubble molecules down so that the top becomes very thin. Since bubbles usually pop when the soap film evaporates, they tend to pop from the top rather than from the bottom; and 5) What happens to a bubble when it pops? An attendant/guide or poster can then explain since there only needs to be one weak point in the circle of a bubble for it to pop, even if the rest of the bubble is strong and the molecules still stick together. After it pops, there are bits of solution and water that are still stuck together that fly off and drop to the ground because of gravity.

A second exemplary bubble-making station includes a smoke-like fog generating system 200 that comprises a gas producing apparatus, methods of using and/or interacting with the gas producing apparatus and station-specific media demonstrating basic educational science and mathematical principles using, e.g., a STEM curriculum. In one embodiment, a gas producing apparatus disclosed herein uses carbon dioxide ($CO_2$) sublimated from dry ice to form bubbles filled with smoke-like fog (the cold carbon dioxide sublimating from the dry ice causing water vapor to condense and form smoke-like fog). A gas producing apparatus disclosed herein provides holdable and moldable bubbles that allows a user to easily manipulate the bubble(s) containing the smoke-like fog for recreational purposes. The user can hold the smoke-like filled bubble, create smoke-like fog filled bubble art, create bubbles inside bubbles, and various other entertaining recreational activities for enjoyment.

Figure 2B:
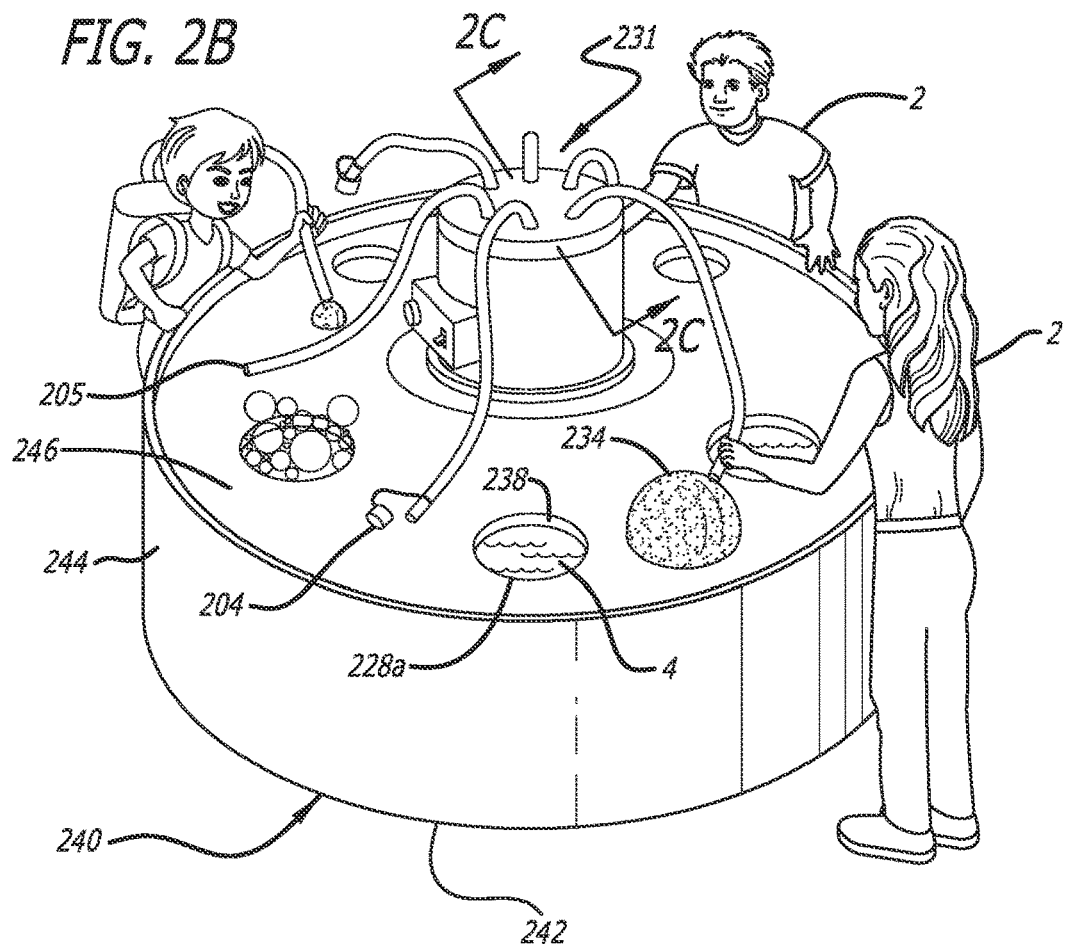
Figure 2C:
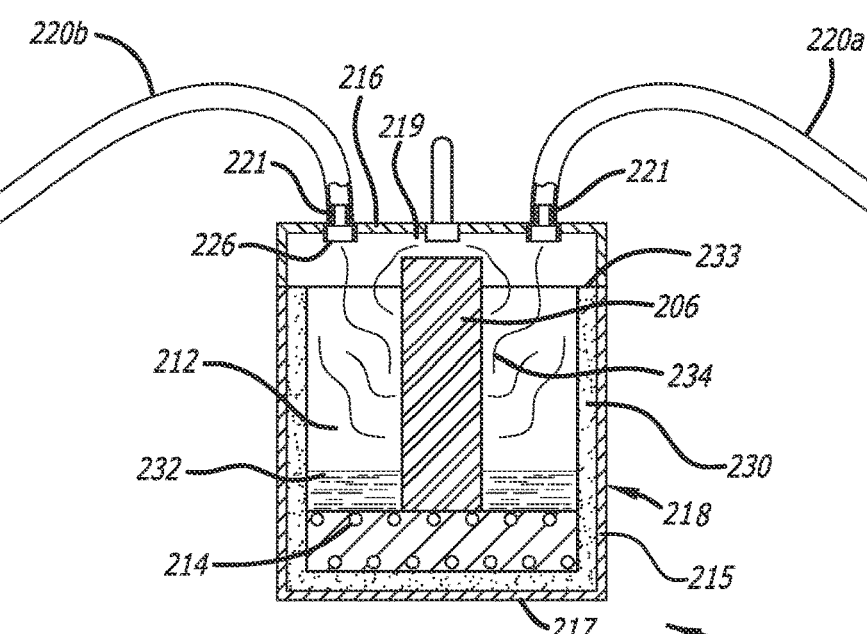

Referring now to FIGS. 2A-2C, which show an exemplary smoke-like fog generating system 200 and gas producing apparatus 210 herein described at this second bubble-making station. Gas producing apparatus 210 includes a smoke-like fog generating apparatus 231 for generating bubbles filled with smoke-like fog and base 240. The smoke-like fog generating apparatus 231 includes a body 218 and a lid 216. Body 218 includes one or more sides 215, a bottom 217, a top opening 219 opposite bottom 217, top opening 219 being defined by the perimeter formed by one or more sides 215, and the resulting interior space defining an internal reservoir 212. Internal reservoir 212 is configured so that an attendant/guide 250 can place a piece of dry ice 206 into water 232 located within internal reservoir 212, whereby smoke-like fog 234 is generated. Internal reservoir 212 may abut a heating element 214. Heating element 214 may be an integral part of body 218, for example an integral part of one or more sides of body 218. Smoke-like fog generating apparatus 231 can be configured to have an on/off switch 209 for the resistive element 214 and a dial 208 to control the amount of current applied to the heating element, to control/change the rate of carbon dioxide sublimation off of dry ice 206 in internal reservoir 212.

Referring to FIG. 2A, lid 216 is designed to the dimensions of top opening 219 of body 218 in a manner that closed or seals internal reservoir 212. A seal, for example a rubber grommet can be placed in between lid 216 and edge of body 218 defining top opening 219 in order to create a hermetic seal to confine smoke-like fog to within the smoke-like fog generating apparatus 231. Lid 216 may be unconnected to body 218 so that lid 216 may be completed removed and separated from body 218 in order to access internal reservoir 212. Alternatively lid 216 may be connected to body 218 with a hinge 224 or other device known in the art so that lid 216 may be moved and internal reservoir 212 accessed. Alternatively, or in addition to hinge 224, lid 216 may include one or more clasps, clamps or other device known in the art which may secure lid 216 to body 218. In any embodiment, lid 216 is moved to access internal reservoir 212. In operation, a mixture of dry ice 206 and water 232 may then be placed in internal reservoir 212, and lid 216 may be closed top opening 219 of body 218 to reseal or reclose internal reservoir 212.

Referring to FIGS. 2A & 2B, lid 216 may further include one or more ports 226, which fluidly connect to the interior of internal reservoir 212. As few as one port, and as many as 60 ports are contemplated, depending on reservoir capacity, e.g., 1 to 60 ports, 1 to 10 ports, 2 to 10 ports, 2 to 8 ports, 4 to 8 ports, 3 to 7 ports, 4 to 7 ports, 4 to 6 ports, 5 ports or 6 ports. Ports 226 primary function is to act as a coupling point for a corresponding hose 220. In the exemplary embodiment shown in FIGS. 2A & 2B, lid 216 includes six ports 226 (226a-f) and their corresponding hoses 220 (220a-f). Hoses 220 are fluidly connected each to its own port 226. The combination of internal reservoir 212, ports 226, and hoses 220 form a number of continuous fluid paths from internal reservoir 212 corresponding to the number of ports 226 and hoses 220 present. The fluid path is enclosed until the fluid path reaches the second end portion of hose 220, for example hose end portion 205 of hose 220.

Ports 226 may be evenly spaced around lid 216. For example, if there are four ports 226, each port 226 may be placed every 90 degrees in a circular pattern around lid 216. If there are five ports 226, each port 226 may be placed every 72 degrees around lid 216. If there are three ports 226, each port 226 may be placed every 120 degrees around lid 216, and so on. Ports 226 may be placed anywhere on lid 216 from the center to the perimeter along the lines defined from the center to the perimeter demarcating the arcs. In an alternative configuration, when ports 226 are placed nearer the center of lid 216, each port 226 may be connected to a central hub structure. The hub structure may be a central raised portion of the lid, with openings that create each of ports 226.

Port 226 or plurality thereof, may include a bib 221 or boss to which a corresponding hose 220 may be connected. Only one exemplary connection will be further discussed, but it is understood that each connection may share the attributes discussed. Referring to FIG. 2C, on a first end, the hose 220b may be connected to the port 226 using a mechanical fastener, for example, a hose clamp (not shown) that is positioned around hose 220b and at that portion where hose 220b fits over bib 221, for example. Alternatively, hose 220 may be sized to provide a friction fit to the bib 221 or other connecting structure on port 226, twist and lock connections, or may use male and female threaded fittings. Hose 220 may have a circular transverse cross section. Alternatively, hose 220 may any other cross section which will contain the fluid being transported therethrough. The second end portion of hose 220 may have a fitting. The fitting may have a standard configuration basin known in the art to be adapted to connection with a corresponding fitting. For example, hose 220 may include a standard garden hose configuration or an industrial vacuum fitting. Hose 220 may have a length that allows the second end to be placed in at least one basin 228, such as basins 228a, b, c, etc., as exemplarily shown in FIGS. 2A & 2B.

As shown in FIGS. 2A & 2B, at least one or each hose 220 may have a cap 204 which seals the second end portion of hose 220. Cap 204 may slide over the second end portion of hose 220 and be held in place by a friction fit. Alternatively, cap 204 may be configured to connect to a fitting present on the second end portion of hose 220. For example, cap 204 may include female threads which connect to male threads present on a fitting. As another alternative, cap 204 may friction fit on the set of male threads of a fitting located on the second end portion of hose 220. The attachment of cap 204 prevents any smoke like fog 234 from leaving through hose 220 to which cap 204 is attached, while not affecting the flow of smoke-like fog 234 through other hoses, if there are any. Hose 220 may be made of a flexible material, for example a polymer or a plastic. Because of the flexibility, second end portion 205 of hose 220 may be pointed in almost any direction by a user.

Still referring to FIGS. 2A & 2B, smoke-like fog generating apparatus 231 may be placed on a base 240. Base 240 comprises one or more sides 242, a bottom 244 and a top surface 246. One or more sides 242 of base 240 may be curved, defining a circle or an oval, or any cuboidal shape with square and rectangular shapes being preferred, the cuboidal shape having sharp (right-angled) or curved corners. In some embodiments, base 240 is circular or oval and can have a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance. In one embodiment, base 240 is generally cuboidal in shape. In some embodiments, base 240 is cuboidal and can have a width of 1 to 4 feet, 2 to 4 feet, 3 to 4 feet, 1 to 3 feet, 2 to 3 feet, or 1 to 2 feet and a length of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet. The height of base 240 can be 1 to 5 feet, 1 to 4 feet, 1 to 3 feet, 2 to 3 feet or 1 to 2 feet.

Top surface 246 of base 240 can further, and optionally, include a lip around a perimeter of top surface 246, thereby forming a reservoir designed to contain bubble solution 4. In a preferred embodiment, the lip of top surface 246 has a height of, for example, about 0.25 inches to 0.5 inches, about 1 inch to 5 inches, about 2 to 4 inches to about 3 inches. When top surface reservoir of top surface 246 is present, one or more basins 228 become part of top surface reservoir of top surface 246 can be considered deeper areas of top surface reservoir of top surface 246 The shape defining top surface reservoir of top surface 246 may be curved, defining a circle or an oval, or any closed polygonal shape with triangle, square, rectangular, and pentagonal shapes, the polygonal shape having sharp or curved corners. In some embodiments, top surface reservoir of top surface 246 is circular or oval and can have a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance. In one embodiment, top surface reservoir of top surface 246 is generally polygonal in shape. In some embodiments, top surface reservoir of top surface 246 is polygonal in shape and each length of the polygon can be 1 to 4 feet, 2 to 4 feet, 3 to 4 feet, 1 to 3 feet, 2 to 3 feet, 1 to 2 feet, 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet.

Top surface 246 may have one or more basins 228 formed in it. The number of one or more basins 228 present typically corresponding to the number of ports 226 and hoses 220 provided by smoke-like fog generating apparatus 231. Each of the one or more basins 228 may have a basin side wall 238 and a top edge of basin side wall 238 may be rounded off or be provided having a substantially right angle. In particular configurations, base 240 can comprise one or more basins, 2 to 10 basins, 3 to 9 basins, 4 to 8 basins, 3 to 7 basins, 4 to 7 basins, 5 to 7 basins, 4 to 6 basins, or 5 or 6 basins. Each of the one or more basins 228 can serve as a reservoir for bubble solution 4. Each of the one or more basins 228 are filled to a sufficient depth that may be manually delivered into basins 228. Each of the one or more basins 228 can be of any suitable geometry, perimeter, and/or shape and any depth that provides for a sufficient area and volume to hold bubble solution 4. In a preferred embodiment, each of the one or more basins are circular and have a flat bottom and a surrounding side that rises from, for example, about 0.25 inches to 0.5 inches, about 1 inch to 5 inches, about 2 to 4 inches to about 3 inches from the bottom of the basins. Each of the one or more basins 228 can have a depth of bubble solution 4 of, for example, about 0.25 inches to 0.5 inches, about 0.25 inches to about 0.75 inches, about 0.5 inch to about 1 inch, about 1 inch to about 2 inches or about 0.5 inch to about 3 inches contained therein. The basin may be made of any material which may retain fluid, with materials that withstand corrosion from bubble-making fluid being preferred, such as, e.g., plastic, fiberglass, treated wood, glass, or metal.

FIG. 2C shows a cross-sectional view of smoke-like fog generating apparatus 231 comprising body 218 includes internal reservoir 212 and lid 216. Body 218 and lid 216 are made from a hard material that can tolerate extreme cold temperatures of −20° C. or lower, e.g., ceramic or a metal such as steel or aluminum, or a carbon fiber composite. Body 218 and/or lid 216 may further include a layer of insulating material 230. Insulating material 230 may be an integral part of body 218 and/or lid 216 or a separate component to smoke-like fog generating apparatus 231. Such layer of insulating material 230 provides protection to apparatus 231 as basin as a user from the intense cold temperatures generated from dry ice 206. When an integral part of body 218 and/or lid 216, in some embodiments insulating material 230 is encased in the hard material comprising body 218 or lid 216 and thus is inside body 218 or lid 216. This encasement prevents the insulating material from becoming damaged, and the system losing insulation, thereby operating less efficiently. In some embodiment, incorporation of layer of insulating material 230 may be on the inside surface of into body 218 and thus may form a shelf 233 on an upper end portion of the inside surface of body 218. In some embodiment, when an separate component of body 218 and/or lid 216, insulating material 230 may be located abutting the outside surface of body 218 and/or lid 216. A seal, for example a rubber grommet or flange can be placed on shelf 233 of body 218 to create a hermetic seal along the line of contact between lid 216 and body 218. Lid 216 may include insulating material, in order to retain heat in internal reservoir 212.

Still referring to FIG. 2C, body 218 and resulting internal reservoir 212 may be any shape, e.g. with preferred shapes of body 218 and/or internal reservoir 212 being a cylindrical shape and having a circular or oval transverse cross section, a cuboidal shape having a square transverse cross section, or a cuboidal shape having a rectangular transverse cross section. Internal reservoir 212 may have any depth, with depths in a range of 2 inches to 24 inches being preferred. In some embodiments, body 218 and/or internal reservoir 212 may have bottom 217 that is flat while in other embodiments bottom 217 may be concave or convex in shape. Bottom 217 may be connected around an exterior edge to a first end portion of one or more walls 215. One or more walls 215 may be straight or tapered. In one embodiment, one or more walls 215 may taper from a first defined perimeter at the first end portion to a second defined perimeter at an opposite, second end portion. The second defined perimeter may have a greater total length than the first. In this configuration, the reservoir wall forms an open-ended cone or pyramid shape, with the smaller opening of the cone or pyramid being closed by the flat circular bottom.

Still referring to FIG. 2C, body 218 includes a heating element 214 which may abut internal reservoir 212. Heating element 214 may abut internal reservoir 212 on bottom 217 and/or on one or more sides 215. Heating element 214 may be made of an electrically resistive element, such as a wire, such that when a current is applied to the electrically resistive element, much of the energy of the current is transferred to heat. Such a wire may be made from an alloy or pure metal which provides the heating sufficient to accelerate sublimation of dry ice 206 when the dry ice 206 is placed, along with water 232, in internal reservoir 212. Heating element 214 may be in the shape of the wire and the amount of contact with the reservoir may be adjusted during assembly by adjusting the length of the wire. Alternatively, internal reservoir 212 itself may be made of an alloy which is electrically resistive and provides heat when a standard 110 volt/60 hz or 220 volt/50 hz electrical current is applied to it. Again, the heat generated by the electrical current would be sufficient to accelerate the sublimation of dry ice 206 in internal reservoir 212 if such heat was greater than ambient temperature. Insulated body 230 will help retain the heat added to internal reservoir 212 in order to continue the acceleration of the sublimation of the dry ice, and creation of smoke-like fog 234 from the mixture of the carbon dioxide gas and water, as will be discussed in further detail below.

Heating element 214 may be electrically connected to a standard wall outlet or other source of power using an electrical cord to provide current to the heating element or reservoir, as described above. The flow of current heats the heating element 214 or internal reservoir 212, and this heating further accelerates the sublimation of the dry ice 206, and the formation of the smoke-like fog 234. One end of heating element 214 may be connected to a first lead, and a second end of heating element 214 connected to a second lead wire. The lead wires may be attached to a plug configured to be inserted in a standardized wall socket. The lead wires, heating element 214, and plug may be attached by soldering or any other method known in the art. The insulated body may include a sensor which is electrically connected to a switch in the path of the current coming to heating element 214 from, for example, a plug and cord placed in a standard wall outlet. For example, the switch may be placed in line on one of the lead wires. Once a first predetermined temperature is reached, the sensor, which is electrically connected to the switch via lead wires, or other methods known in the art, may cause the switch to open by sending an electrical signal over the connection. The sensor may then send another electrical signal over the connection, which causes the switch to close again once the sensor senses a second predetermined temperature. The second predetermined temperature is lower than the first predetermined temperature.

In operation, smoke-like fog generating system 200 creates a smoke-like fog 234 that may be used to fill a bubble with the smoke-like fog 234. Lid 216 may be opened to allow access to internal reservoir 212. A mixture of dry ice 206 and water 232 may be placed in internal reservoir 212. When dry ice 206 is placed in water 232, sublimation is accelerated, and low-sinking, dense clouds of smoke-like fog 234 are created. As smoke-like fog 234 continues to build in the space defined by internal reservoir 212 and lid 216, it begins to move through ports 226 fluidly connecting the space defined by internal reservoir 212 and lid 216 to the one or more hoses 220. The smoke-like fog 234 originates from water 232 into which the dry ice 206 is placed, and not from atmospheric water vapor.

Simultaneously and as shown in FIG. 2B, user 2 (here, user 2 at far-right) may grasp one of the one or more hoses 220 near the second end portion 205 and place the second end portion 205, including any attachments if attached thereto, to a base 240 portion having bubble solution 4 thereon or into basin 228 with bubble solution 4. Bubble solution 4 forms across the second end portion 205 of the hose 220, or across a connected attachment. As pressure builds, some portion of the smoke-like fog 234 arrives at the second end portion 205 of each of the one or more hoses 220 and the smoke-like fog 234 may form a bubble by contacting and stretching the bubble fluid, which then closes around some portion of the smoke-like fog 234, and a bubble is created with the portion of the smoke-like fog 234 in an interior of the bubble, as shown in FIG. 2B. The attachments may allow for more than one bubble to be created by having a plurality of subdivisions on the attachments. Alternatively, or in addition, the shapes of the subdivisions of the attachments may be changed to change the shape of the bubbles. In addition to bubbles filled with smoke-like fog 234, as shown being made by user 2 at the far right of FIG. 2B, bubble filled with smoke-like fog 234 may be made with a mobile apparatus for creating bubbles 1010, particular configurations being wearable, as illustrated by user 2 at the far-left of FIG. 2B. Furthermore, bubbles that are clear (that is, not filled with smoke-like fog 234) can also be made at this second exemplary station, where bubble solution 4 (either in a basin 228 or on another top portion of base 240) is utilized with a handheld bubble making tool 8 such as those shown in FIGS. 1A & 1E. A plurality of clear bubbles is shown in a basin in FIG. 2B, here, a plurality of bubbles stacked atop one another in basin 228.

This second exemplary bubble-making station includes a system 200 providing station-specific media in a setting to facilitate basic educational science and mathematical principles using, e.g., a STEM curriculum. An attendant/guide can conduct a demonstration or lead a user(s) in an activity designed to exemplified various physical phenomena. After the demonstration the attendant/guide can lead a discussion, optionally referring to bubble-making station specific media for visuals to help explain the various scientific phenomena.

Non-limiting examples of station specific media include, e.g., a poster, a handout, a monitor, an interactive monitor, a touch-screen monitor, a water-proof monitor or tablet. Alternatively such information may be provided solely in the form bubble-making station specific media, without the aid of an attendant/guide.

For example, an attendant/guide can encourage users to engage in such activities as utilizing the provided the hose and just hold onto the smoke-like fog blowing out or to create a white bubble by placing the hose end into a bubble solution and then after creating the white bubble, playing with it. While this is occurring, the attendant/guide can then proceed to explain that bubbles usually form because air becomes trapped between the soap and water molecules and that's why bubbles are transparent and we can usually see through them. In this case, the smoke-like fog provided by sublimating dry ice is trapped inside the bubble so we can see the fog. Exemplary questions can be "What happens when we pop the bubble?" An attendant/guide can then explain that all the trapped smoke-like fog from inside the bubble is no longer contained and can freely flow outside.

As another example, an guide/attendant can instruct the users to wet their hand or hands and have them touch the bubble with a finger and see if the bubble pops. The guide/attendant then asks the user(s) repeat touching the bubble but this time using a dry finger. The guide/attendant can then as "Does the bubble pop? Why didn't it pop? Was it magic or science? The attendant/guide can then explain why bubbles pop and then discuss hydrophobic and hydrophilic molecules and how they like to stick together so when the water from a user(s) finger touches the surface of the sphere, it doesn't pop the bubble. However, touching the bubble with a dry finger will pop the bubble.

In another example, an attendant/guide can have the users at the station wet their hands and then create a bubble inside their palm and then create a bubble on both of their palms. Then the attendant/guide can have them try to merge the bubbles in each palm together. The guide/attendant can ask "Can bubbles merge together? And What do they think is happening here?".

As a further example, an attendant/guide can themselves make or lead a user(s) in making a very large bubble by putting it on the table to the side of the bubble solution. The guide/attendant can ask—"How does the bubble get so big? What will make it grow bigger and what will make it pop earlier than usual?". The attendant/guide can go one to explain the various factors at play that give bubbles their particular observed characteristics, such as: a) the speed at which the smoke-like fog is coming out of the hose. The carbon dioxide gas entering the forming bubble needs to be at the appropriate speed for the bubble to grab enough molecules (soap and water) to steadily grow; b) How much bubble solution or water is available for the bubble to grow: A bubble growing is like building anything (i.e., Legos), the bubble needs materials to make it grow bigger. The bubble requires more than just a gas/air to go inside, it also needs sufficient bubble solution. The guide/attendant can ask—"If you make it here on the table versus inside the basin, how would it affect it?".

As another example, an attendant/guide can them move on to create a large white bubble (smoke-like fog filled) and then create another smaller white bubble (smoke-like fog filled) at this station and bounce the smaller bubble onto top of the bigger bubble causing it to merge with the bigger bubble. The guide/attendant can ask "Why do you think this happens?". The attendant/guide goes on to explain surface tension for this specific scenario.

An attendant or guide can point out that when dry ice was put into the apparatus it was a solid, and now it's a liquid. Ask them to touch the gas—it's not hot and it's not cold. The guide or attendant may go on to explain the different phases of a substance and what is carbon dioxide and its properties of carbon dioxide.

During these demonstrations, an attendant/guide or poster can ask additional questions at this station including: 1) What are the different phases of matter? An attendant/guide or poster can then explain that the three major transitional phases of a substance are solid phase, liquid phase, and gas phase; 2) What is sublimation? An attendant/guide or poster can then explain that sublimation is the transition of a substance form the solid phase to the gas phase without passing through the intermediate liquid phase; 3) What's the big difference between regular ice and dry ice? An attendant/guide or poster can then explain that temperature of regular ice is 32° F. and dry ice is −100° F. The attendant/guide or poster can then explain how to safely handle dry ice and how it can cause severe frostbite with contact of skin over 3 seconds; 4) What is dry ice? What is the smoke that we see inside the bubble? An attendant/guide or poster can then explain that while carbon dioxide gas is invisible, the very cold gas causes water vapor in the air to condense into water droplets, thus creating fog; 5) How do they make dry ice? An attendant/guide or poster can then explain that carbon dioxide gas is pressurized in a special production machine and cooled to first form liquid carbon dioxide. The liquid is moved into chambers that convert it to blocks or other desirable forms. The attendant/guide or poster can then explain that dry ice is not available naturally and is man-made; 6) What do you think dry ice is used for usually? Have you seen dry ice anywhere? An attendant/guide or poster can then explain that dry ice is used to keep things cold. It's much colder than regular ice and is used to keep mobile items cold, like in ice cream trucks and the shipment of sensitive cold items. More recently dry ice is used for recreational purpose and to add a sensational factor, for example in restaurants for drinks or plate presentations; 7) Has anyone heard of Liquid Nitrogen? How is that different than dry ice? An attendant/guide or poster can then explain that liquid nitrogen gives off gas just like dry ice does but that liquid nitrogen is made of nitrogen and dry ice is made of carbon dioxide; and 8) Liquid nitrogen does NOT sublimate. What does that mean? An attendant/guide or poster can then explain that when liquid nitrogen warms, the liquid turns into a gas where when dry ice warms it turns straight from a solid into a gas, skipping the liquid phase. Liquid nitrogen is much colder and is commonly used to freeze and remove warts. Liquid nitrogen does not occur naturally, it is made in the lab. Nitrogen from the air is forced to become a liquid (through and according to the IDEAL GAS LAW $PV=nRT$ processes).

A third exemplary bubble-making station includes a mobile smoke-like fog generating system 1000, which is similar to smoke-like fog generating system 200. A user would walk around with mobile smoke-like fog generating system 1000 and make bubbles containing smoke-like fog 234 on a surface (or in mid-air). Alternatively, or in addition, a user may be provided mobile smoke-like fog generating system 1000 and allowed to make bubbles filled with smoke-like fog 234, as shown as one example in FIG. 2B and FIG. 10A. A mobile version of smoke-like fog generating system 200, this mobile version provides the same scientific and educational value as the stationary version. Aspects of the mobile smoke-like fog generating system 1000 are described in U.S. Provisional Patent Application Ser. No. 62/799,555, the entire content of which is hereby incorporated by reference in its entirety.

Figure 10A:
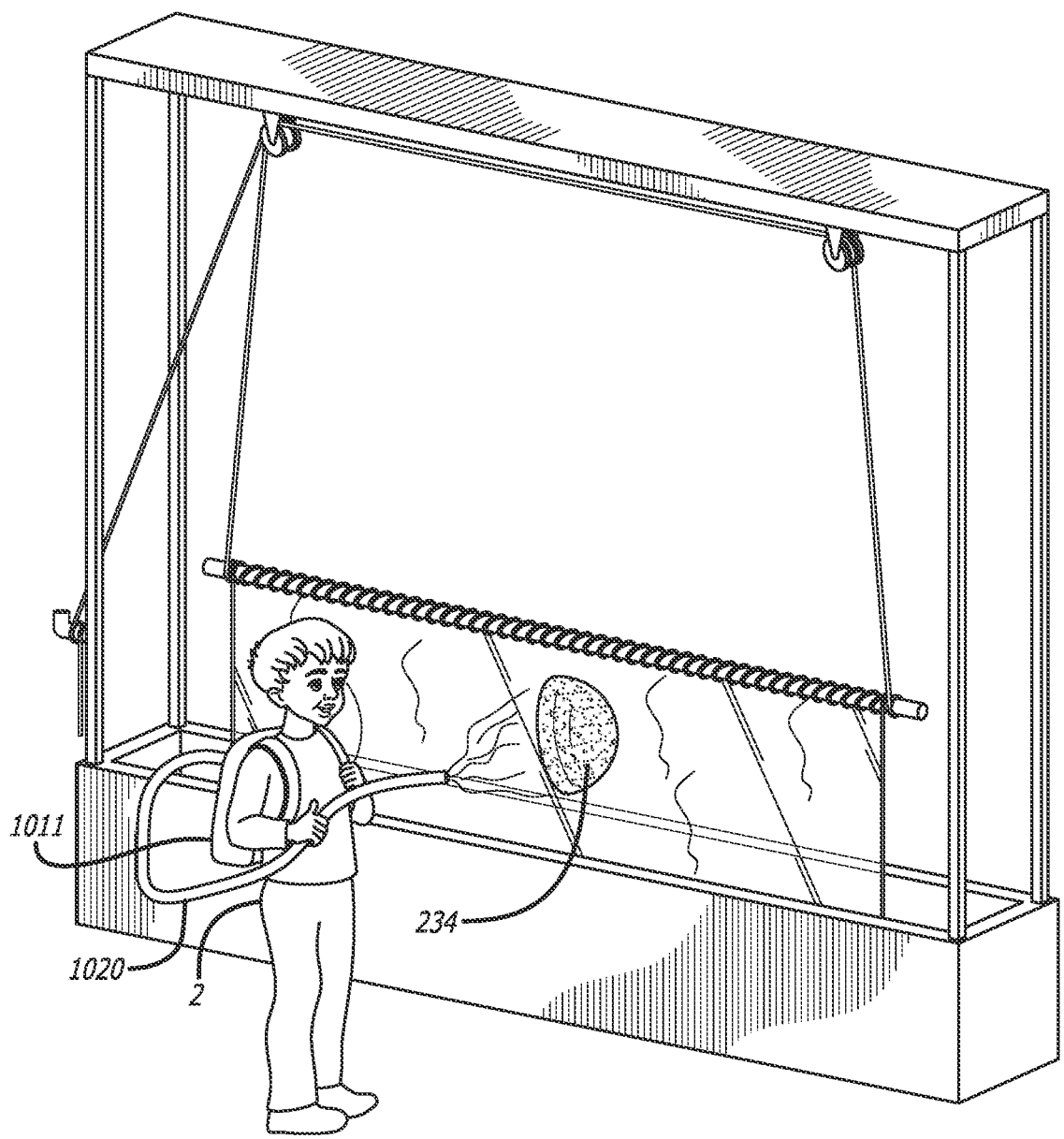
FIGS. 10A-10B illustrate an exemplary system 1000 comprising mobile gas producing apparatus 1010 for creating bubbles filled with smoke-like fog as disclosed herein with FIG. 10A showing a user wearing a mobile gas producing apparatus for creating bubbles filled with smoke-like fog, the user utilizing a bubble sheet provided by the exemplary bubble making apparatus illustrated in FIG. 4A.
Figure 10B:
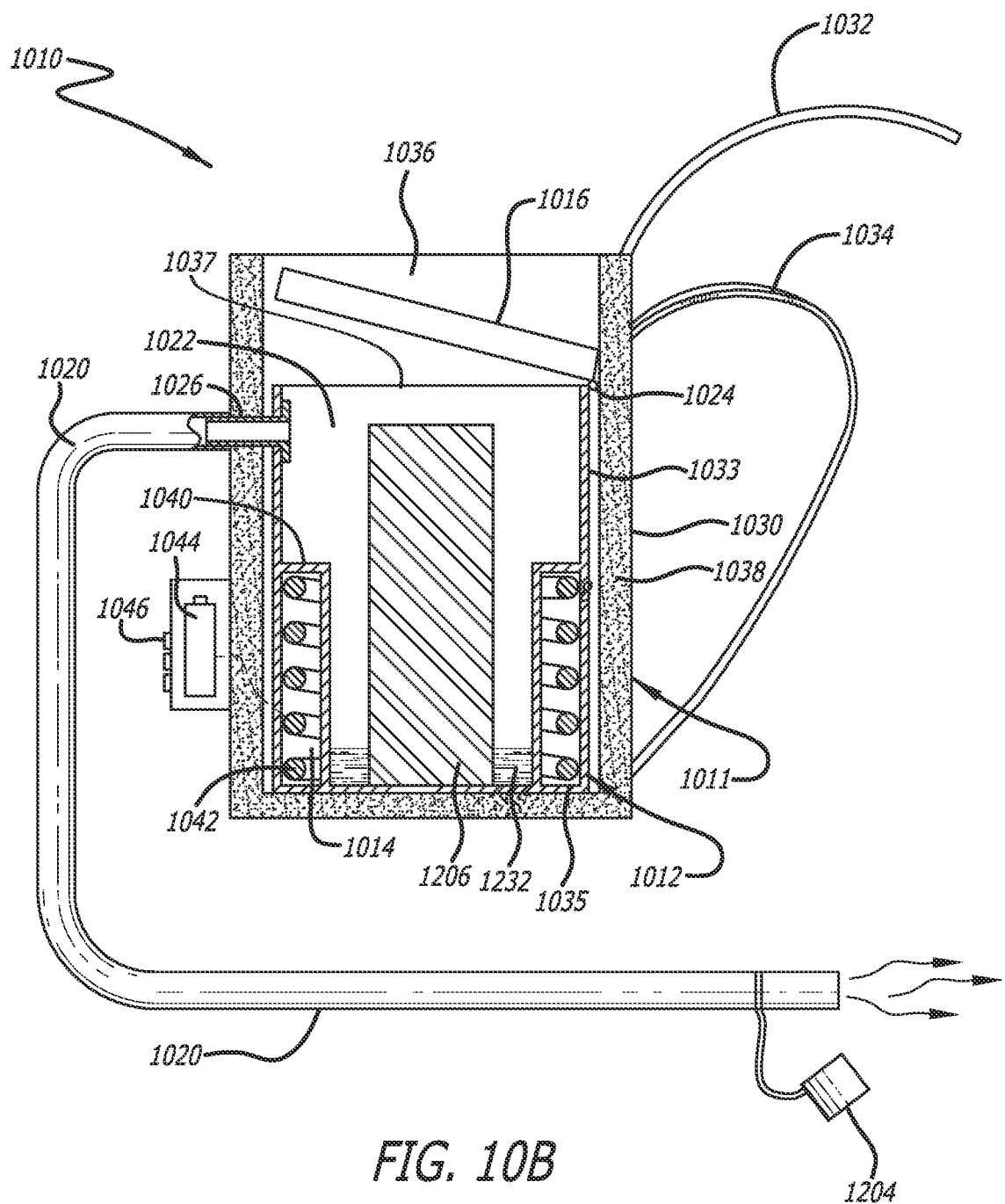

Turning to FIGS. 10A & 10B, mobile smoke-like fog generating system 1000 comprising a mobile apparatus 1010 is used to create a bubble or a series of bubbles. In one aspect, the instant disclosure concerns a mobile smoke-like fog generating system 1000 comprising a mobile apparatus 1010 is used to create one or more carbon dioxide filled bubbles. Such a viable, reliable and effective mobile smoke-like fog generating system 1000 as basin as the method of use of such a device is provided herein.

Referring to FIG. 10B, mobile apparatus 1010 comprises a carrier 1011 and a mobile smoke-like fog generating apparatus 1012. Carrier 1011 may include at least one carrying compartment 1030 defining an interior portion 1036, a flap 1032 for covering interior portion 1036 of at least one carrying compartment 1030 and one or more straps 1034 for securing mobile apparatus 1010 to or on a user, e.g., by placing one or more straps 1034 over a user's shoulders. Mobile smoke-like fog generating apparatus 1012 may be placed in interior portion 1036 of at least one carrying compartment 1030 of carrier 1011. Carrier 1011 may be a backpack design to contain mobile smoke-like fog generating apparatus 1012 and used to support smoke-like fog generating system 1000 on a person's shoulders. Alternatively, the carrier 1011 may be any bag or apparatus that a user can wear on their person, while still retaining movement of their hands and arms.

In general and similar in various aspects to smoke-like fog generating apparatus 231 above, mobile smoke-like fog generating apparatus 1012 comprises a body 1018 and a lid 1016 (FIG. 10B). Body 1018 may include a bottom 1035, one or more walls 1033 extending from bottom 1035, and an open end 1037 opposite bottom 1035, open end 1037 being defined by the perimeter formed by one or more walls 1033, and the resulting interior space defining an internal reservoir 1022. Lid 1016 is designed to the dimensions of open end 1037 in a manner that closed or seals internal reservoir 1022. A seal, for example a rubber grommet can be placed in between lid 1016 and edge of body 1018 defining open end 1037 in order to create a hermetic seal to confine smoke-like fog to within the apparatus. Lid 1016 may be connected to body 1018 with a hinge 1024, clasps, clamps, or other device known in the art so that lid 1016 may be moved and internal reservoir 1022 accessed, and then lid 1016 resealed over open end 1037. In operation, a mixture of dry ice 1206 and water 1232 may be placed in internal reservoir 1022, and lid 1016 may be closed to seal open end 1037 of body 1018.

Body 1018 and resulting internal reservoir 1022 may be any shape, e.g. with preferred shapes of body 1018 and/or internal reservoir 1022 being a cylindrical shape and having a circular or oval transverse cross section, a cuboidal shape having a square transverse cross section, or a cuboidal shape having a rectangular transverse cross section. Internal reservoir 1022 may have any depth, with depths in a range of 2 inches to 18 inches being preferred. In some embodiments, body 1018 and/or internal reservoir 1022 may have bottom 1035 that is flat while in others bottom 1035 may be concave or convex in shape. Bottom 1035 may be connected around an exterior edge to a first end portion of one or more walls 1033. One or more walls 1033 may be straight or tapered. In one embodiment, one or more walls 1033 may taper from a first defined perimeter at the first end portion to a second defined perimeter at an opposite, second end portion. The second defined perimeter may have a greater total length than the first. In this configuration, the reservoir wall forms an open-ended cone or pyramid shape, with the smaller opening of the cone or pyramid being closed by the flat circular bottom. In a particular embodiment, body 1018 may further include a flange 1040 connected to the second end portion and extending outward from the second end portion. Flange 1040 may abut a shelf (not shown) on an upper end portion of the heating element 1014 or, if so configured, abut a shelf (not shown) on an upper end portion of insulated body 1038 to position body 1018 within carrier 1011. Body 1018 and lid 1016 of mobile apparatus 1010 may be made of a metal, for example aluminum.

As shown in FIG. 10B, one or more ports 1026 may be fluidly connected to internal reservoir 1022. In one embodiment, one or more ports 1026 are located on one or more walls 1033 of body 1018. Alternatively, or in addition to, lid 1016 may include one or more ports 1026. One or more ports 1026 may also be placed near bottom 1035 of body 1018 (however not so close to bottom 1035 that water 1232 contained in internal reservoir 1022 enters hose 1020). One or more ports 1026 may include a bib or boss to which a corresponding hose 1020 may be connected. The primary function of one or more ports 1026 is to act as a coupling point for a corresponding number of hoses 1020.

Placement of one or more ports 1026 should be in locations that will not interfere with a user placement of carrier 1011 or operation of mobile smoke-like fog generating system 1000. In particular embodiments, four ports 1026 on lid 1016 may be placed every 90 degrees in a circular pattern around lid 1016 having a circular shape or at each of the corners of a square or rectangular lid 1016. If there are five ports 1026, each port 1026 may be placed every 72 degrees around circular lid 1016, or at each of the corners and between the distalmost two ports on square or rectangle lid 1016. If there are three ports 1026, each port 1026 may be placed every 120 degrees around a circular lid 1016, or in a line along the distal side of a square or rectangular lid 1016.

Hose 1020, including a first end portion and a second end portion, may be attached to each of the one or more ports 1026. On a first end, hose 1020 may be connected to port 1026 using a mechanical fastener, for example a hose clamp (not shown). Alternatively, and as shown in FIG. 10B, hose 1020 may be sized to provide a friction fit to the bib or other connecting structure on port 1026, or may use male and female threaded fittings. Hose 1020 may have a circular transverse cross section. Alternatively, hose 1020 may have any other cross section which will contain the fluid being transported therethrough. The second end of hose 1020 may have a fitting. The fitting may have a standard configuration basin known the art to be adapted to connection with a corresponding fitting. For example, hose 1020 may include a standard garden hose configuration or an industrial vacuum fitting. Such fittings allow attachment of nozzles or other devices that change the flow of fog-like smoke from hose 1020 or enable attachment of second end portion of hose 1020 to another apparatus or device, such as, e.g., a basin or basin containing bubble solution 4. Hose 1020 may have a length that allows the grasping of hose 1020 by a user when wearing mobile apparatus 1010 using carrier 1011. Hose 1020 or a plurality thereof, may be made of a flexible material, such as, e.g., a polymer or a plastic. Because of the flexibility of hose 1020, the second end portion of hose 1020 may be pointed in almost any direction by a user 2 or guide/attendant 250.

The combination of internal reservoir 1022, one or more ports 1026, and one or more hoses 1020 form a number of fluid paths from internal reservoir 1022 corresponding to the number of ports 1026 and hoses 1020. The fluid path is enclosed until the fluid path reaches the Mobile smoke-like fog generating system 1000 may further include a heating element 1014. In particular embodiments, heating element 1014 may be a separate component of mobile apparatus 1010 or, as shown in FIG. 10B, an integral part of mobile apparatus 1010. Heating element 1014 placed between insulated body 1038 and body 1018 in a manner that places body 1018 against heating element 1014. In preferred embodiments, heating element 1014 abuts body 1018 so that heating element 1014 can heat the contents of internal reservoir 1022. Heating element 1014 can include an electrically resistive element such that when a current is applied to the electrically resistive element, much of the energy of the current is transferred to heat. In some embodiments, an electrically resistive element is an electrically resistive wire 1042. Wire 1042 may be made from an alloy or pure metal which provides the heating sufficient to accelerate sublimation of dry ice 1206 when dry ice 1026 is placed along with water 1232 in internal reservoir 1022. The shape of wire 1042 and the amount of contact with mobile apparatus 1010 may likewise be adjusted when the system is assembled. Alternatively, mobile apparatus 1010 itself may be made of an alloy which is electrically resistive and provides heat when a current is applied to it. Again, the heat generated by the electrical current would be sufficient to accelerate the sublimation of the dry ice 1026. The current may be provided by a battery 1044, which may have the battery terminals attached to leads extending from opposite ends of the electrically resistive wire 1042 or the reservoir, if so configured. Battery 1044 may have any voltage which provides acceleration of the sublimation and which is less than 40 pounds weight. A switch 1046 may also be provided that breaks the circuit to the battery by disconnecting one of the leads to the corresponding battery terminal. Battery 1044 may be stored in a separate compartment on the carrier, or in the same compartment as the reservoir.

Mobile smoke-like fog generating system 1000 may further include an insulated body 1038. In some embodiments, and as shown in FIG. 10B, insulated body 1038 can be an integral portion of carrier 1011, being located on an interior surface of interior portion 1036 and/or interior surface of flap 1032 of carrier 1011. Insulated body 1038 can completely cover the interior surface of interior portion 1036 and/or flap 1032 of carrier 1011 or can partially cover these exterior surfaces. In some embodiments, insulated body 1038 can be an integral portion of mobile apparatus 1010, being located on an exterior surface of body 1018 and/or an exterior surface of lid 1016 of mobile apparatus 1010. Insulated body 1038 can completely cover the exterior surface of body 1018 and/or lid 1016 of mobile apparatus 1010 or can partially cover these exterior surfaces. When placed inside carrier 1011, insulated body 1038 abut and surround mobile apparatus 1010 and heating element 1014 (FIG. 10B). In other embodiments, insulated body 1038 may include an outer layer made of a material different than insulating material. This outer material can be harder than the insulating material. For example, the outer material may be a metal such as steel or aluminum, or a carbon fiber composite. This outer layer prevents the insulating material from becoming damaged, and the system losing insulation, thereby operating less efficiently. Insulated body 1038 will help retain the heat generated by heating element 1014 and thus facilitates acceleration of the sublimation of the dry ice 1206, and creation of smoke-like fog 234.

Mobile smoke-like fog generating system 1000 may further include a basin or basin configured to receive the second end portion of hose 1020 and the basin being filled with bubble solution 4.

In operation, mobile smoke-like fog generating system 1000 generates smoke-like fog 234 that may be used to create a bubble by exposing bubble solution 4 with the smoke-like fog 234 to create one or more smoke-like fog filled bubbles. Generally, lid 1016 of mobile smoke-like fog generating apparatus 1012 may be opened to allow access to internal reservoir 1022. A mixture of dry ice 1206 and water 1232 may be placed in internal reservoir 1022. Water 1232 may be pre-heated when placed in internal reservoir 1022. Blocks of dry ice 1206 of up to 18 inches×18 inches×18 inches are contemplated. When dry ice 1206 is placed in water 1232, sublimation is accelerated, and low-sinking, dense clouds of smoke-like fog 234 are created. As the smoke-like fog 234 continues to build in the space defined by internal reservoir 1022 and lid 1016, it begins to move through one or more ports 1026 fluidly connecting to internal reservoir 1022 and lid 1016 to the corresponding one or more hoses 1020. The smoke-like fog 234 originates from the bulk water 1232 into which the dry ice is placed, and not from atmospheric water vapor. Thus, water 1232 serves two purposes, it both accelerates the sublimation of dry ice 1206 and provides a source of water 1232 for the creation of the smoke-like fog 234.

In embodiments containing heating element 1014, switch 1046 may then be engaged to complete the circuit between battery 1044 and heating element 1014, providing current to heating element 1014. The flow of current heats heating element 1014 which in turn heats water 1232 contained in internal reservoir 1022, and this heating further accelerates the sublimation of dry ice 1206, and the formation of smoke-like fog 234. Switch 1046 may be engaged or disengaged, at the discretion of the user 2 or guide/attendant 250.

Simultaneously, user 2 or guide/attendant 250 may grasp one of one or more hoses 1020 near the second end portion and place the second end portion, including any attachments attached thereto into the basin or basin, which is filled with bubble solution 4. Bubble solution 4 forms across the second end portion of hose 1020, or across a connected attachment. As pressure builds, some portion of the smoke-like fog 234 arrives at the second end portion of each of one or more hoses 1020 and smoke-like fog 234 may form a bubble by contacting and stretching bubble solution 4, which then closes around some portion of smoke-like fog 234, and a bubble is created with the portion of smoke-like fog 234 in an interior of the bubble, as shown in FIG. 2B, for example. The attachments may allow for more than one bubble to be created by having a plurality of subdivisions on the attachments. Alternatively, or in addition, the shapes of the subdivisions of the attachments may be changed to change the shape of the bubbles formed therefrom. As another example, bubbles created and containing smoke-like fog 234 from mobile smoke-like fog generating system 1000 can additionally be made from a bubble sheet/film or wall made at one of the of bubble-making stations that comprise the entertainment facility herein disclosed, as exemplarily depicted in FIG. 10A.

This third exemplary bubble-making station includes a system 100 providing station-specific media in a setting to facilitate basic educational science and mathematical principles using, e.g., a STEM curriculum. An attendant/guide can conduct a demonstration or lead a user(s) in an activity designed to exemplified various physical phenomena. After the demonstration the attendant/guide can lead a discussion, optionally referring to bubble-making station specific media for visuals to help explain the various scientific phenomena. Non-limiting examples of station specific media include, e.g., a poster, a handout, a monitor, an interactive monitor, a touch-screen monitor, a water-proof monitor or tablet. Alternatively such information may be provided solely in the form bubble-making station specific media, without the aid of an attendant/guide. Examples of specific basic educational science and mathematical principles are discussed above for system 200.

A fourth exemplary station includes system 300 that comprises an inflatable apparatus, methods of using and/or interacting with the inflatable apparatus and station-specific media demonstrating basic educational science and mathematical principles using, e.g., a STEM curriculum. System 300 is generally used for photographic or video opportunities. An inflatable apparatus includes one or more inflatable chambers. In use, one or more users enter the and optionally play within one or more inflatable chambers of the inflatable apparatus while, optionally, another user can take photographs or videos of the one or more users inside inflated apparatus.

Figure 3A:
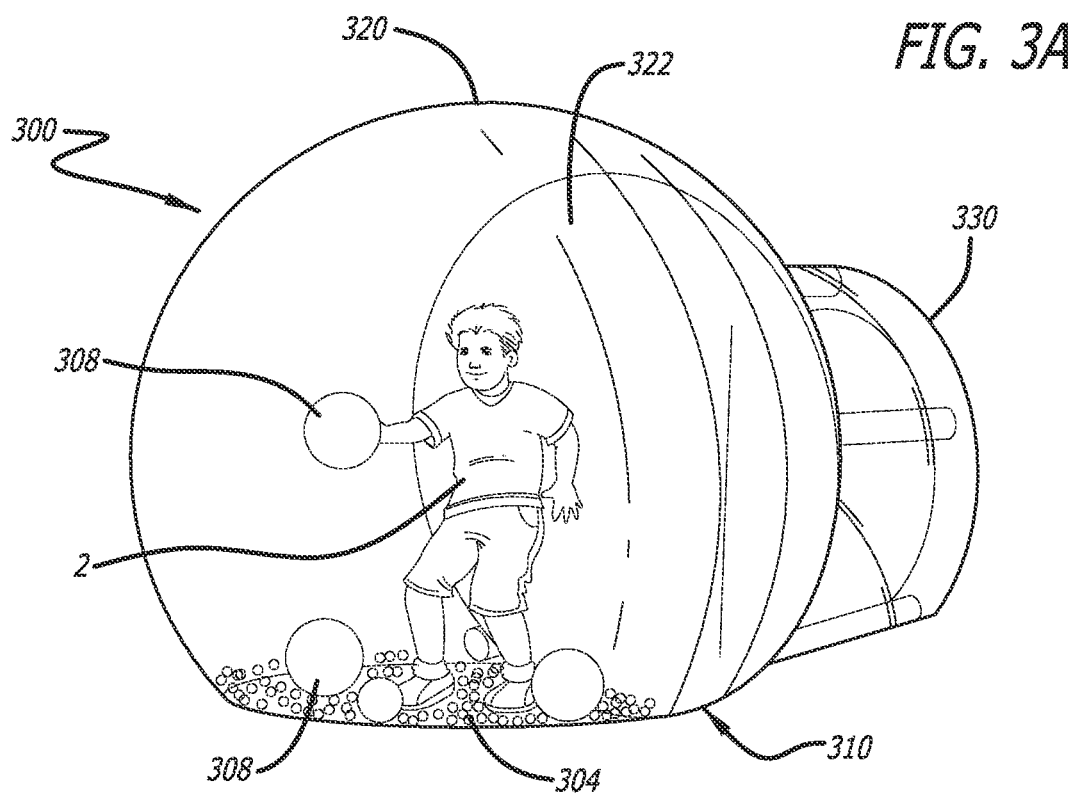
FIGS. 3A-3B illustrate an exemplary system 300 comprising an inflatable apparatus 310 for photo opportunities with FIG. 3A showing a front perspective view of the apparatus in use by a user.
Figure 3B:
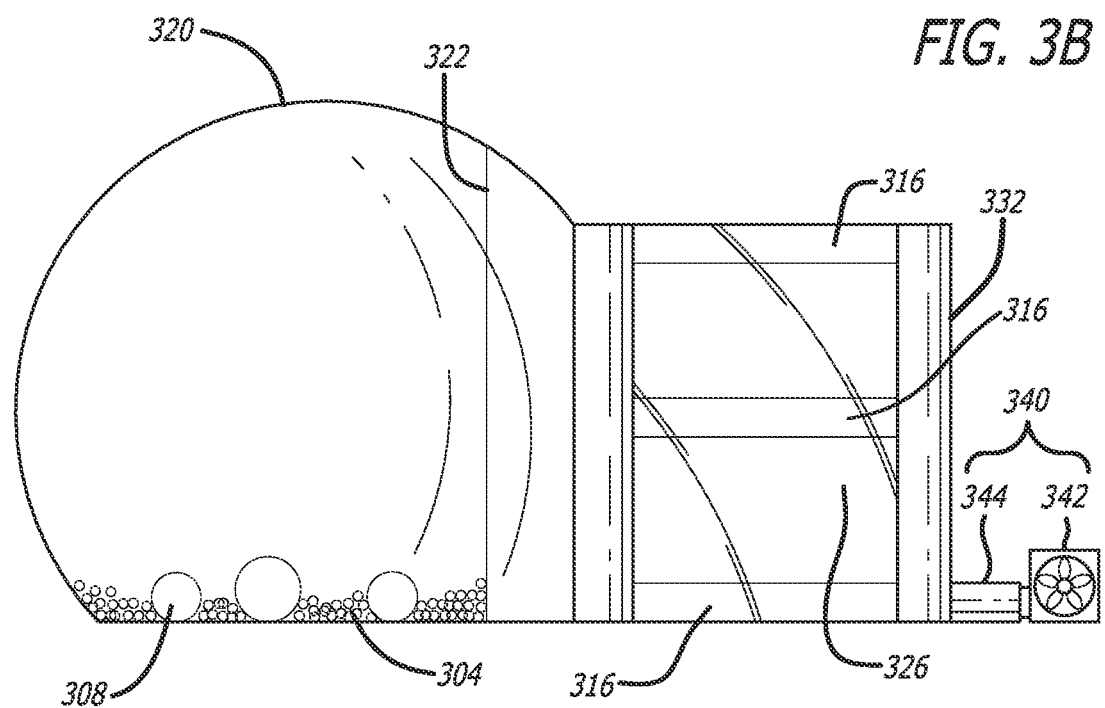

FIGS. 3A & 3B show an exemplary inflatable apparatus 310 that comprises a first inflated chamber 320, a second inflated chamber 330, and an inflation system 340. First inflated chamber 320 is contiguous with a second inflated chamber 330. Inflation system 340 comprises an inflation device 342, such as a blower, fan or inflatable air pump, and one or more air conduits 344, one or more conduits 344 connecting inflation device 342 to inflatable apparatus 310. In some embodiments, one or more conduits 344 connecting inflation device 342 to at least first inflation chamber 320. In some embodiments, one or more conduits 344 connecting inflation device 342 to at least second inflation chamber 330. In some embodiments, one or more conduits 344 connecting inflation device 342 to both first inflation chamber 320 and second inflation chamber 330. Inflation system 340 continuously keeps first inflated chamber 320 and, optionally, second inflated chamber 330 inflated with air. Inflatable apparatus 310 can be made of any durable material including plastic such as poly-vinyl of poly-vinyl blends. Preferably large portions of the apparatus are composed of durable transparent materials.

The dimensions of first inflated chamber 320 are generally of a size that one to five users can comfortably stand within first inflated chamber 320. The dimensions of first inflated chamber 320 can be any useful geometry including, generally and as a non-limiting example, substantially cylindrical, substantially semi-circular, substantially cubic and the like. In one embodiment, first inflated chamber 320 is generally spherical in shape. In one embodiment, first inflated chamber 320 is designed to represent a giant bubble, being generally and substantially spherical and curved in shape with a flattened bottom portion that is in contact with a support surface, such as a floor. In some embodiments, first inflated chamber 320 can be 4 to 10 feet in diameter, 6 to 12 feet in diameter, or 8 to 15 feet in diameter. In one embodiment, first inflated chamber 320 is generally cuboidal in shape. In some embodiments, first inflated chamber 320 can be 4 to 12 feet in width, 4 to 12 feet in length and 6 to 15 feet in height. First inflated chamber 320 comprises a continuous portion with second inflated chamber 330. Such continuous portion comprises an opening to create a pathway between first inflated chamber 320 and second inflated chamber 330. First inflated chamber 320 can also comprise a partition 322. Partition 322 can be provided with any desired indicia to provide a backdrop (such as a sunset, or tropical-themed background) for photographs/videos taken of the one or more users inside first inflated chamber 320.

Second inflated chamber 330 comprises an entrance 332 enabling a user to enter into second inflated chamber 330 from the outside of inflatable apparatus 310. The dimensions of second inflated chamber 330 are generally of a size that a user can comfortably enter second inflated chamber 330 via entrance 332 from the outside of inflatable apparatus 310 and pass through second inflated chamber 330 and enter first inflated chamber 320 via the opening contained in the continuous portion shared by first inflated chamber 320 and second inflated chamber 330. The dimensions of second inflated chamber 330 can be any useful geometry including, generally and as a non-limiting example, substantially cylindrical, substantially semi-circular, substantially cubic and the like. In one embodiment, second inflated chamber 330 is generally spherical in shape. In some embodiments, second inflated chamber 330 can be 4 to 6 feet in diameter, 6 to 8 feet in diameter, or 8 to 12 feet in diameter. In one embodiment, second inflated chamber 330 is generally cuboidal in shape. In some embodiments, second inflated chamber 330 can be 4 to 8 feet in width, 4 to 12 feet in length and 6 to 15 feet in height. Optionally, second inflated chamber 330 is provided with a plurality of inflatable supporting ribs 316. These ribs 316 may be of any color and can be provided bounding/adjacent transparent sections 326 of wall of second inflated chamber 330. In particular embodiments, it is contemplated that second inflated chamber 330 may not require inflation to maintain its shape and structural integrity.

In operation, user 2 enters second inflated chamber 330 from the outside of apparatus 310 using entrance 332. User 2 then passes through second inflated chamber 330 and enters first inflated chamber 320 via the opening contained in the continuous portion shared by first inflated chamber 320 and second inflated chamber 330. User 2 can stay in first inflated chamber 320 to play, take pictures from the inside, or have someone else take pictures of user 2 from outside first inflated chamber 320. In addition, various other interactive objects 308, such as inflated balloons or balls or the like, can be provided within first inflated chamber 320. Furthermore, additional smaller interactive objects 304 can be provided as ground cover to be waded through, such as smaller transparent balls, and may be provided within first inflated chamber 320 to mimic the bubbles within bubbles made by users at the various other bubble-making stations, thereby providing a bubble within a bubble perspective from the inside looking outward. In addition, or as an alternative, the interactive objects 308 and smaller interactive objects may have similar shapes, shapes that differ within and between themselves and be provided having similar or varied coloration, for example.

This fourth exemplary bubble-making station includes a system 300 providing station-specific media in a setting to facilitate basic educational science and mathematical principles using, e.g., a STEM curriculum. An attendant/guide can conduct a demonstration or lead a user(s) in an activity designed to exemplified various physical phenomena. After the demonstration the attendant/guide can lead a discussion, optionally referring to bubble-making station specific media for visuals to help explain the various scientific phenomena. Non-limiting examples of station specific media include, e.g., a poster, a handout, a monitor, an interactive monitor, a touch-screen monitor, a water-proof monitor or tablet.

Alternatively such information may be provided solely in the form bubble-making station specific media, without the aid of an attendant/guide.

A fifth exemplary bubble-making station includes system 400 that comprises a bubble sheet making apparatus, methods of using and/or interacting with the bubble sheet making apparatus and station-specific media demonstrating basic educational science and mathematical principles using, e.g., a STEM curriculum. The bubble sheet making apparatus comprises a pulley system comprising one or more pulleys to create a large generally rectangular bubble sheet or screen that is manipulatable by at least one user. In use, a user pulls upon a rope to raise a collapsible frame up and from of a reservoir of a bubble solution to create a large bubble sheet. One or more users can subsequently create one or more bubbles from the large bubble sheet by simply blowing onto the large bubble sheet by using air passing over their lips, by using devices that blow air from the device/apparatus or by using bubble-making wands or tubes, for example.

Turning now to FIG. 4, system 400 is shown comprising an exemplary bubble sheet making apparatus 410. Bubble sheet making apparatus 410 comprises a frame system 420, a lift system 430 and a bar system 440. Frame system 420 comprises a bottom trough 422, from which extend one or more vertical support members 424 and a top support structure 426 which is horizontally orientated. Bottom trough 422 generally comprises one or more sides 412, a bottom 414 and a top opening 416 opposite bottom 414, top opening 416 being defined by the perimeter formed by one or more sides 412. Bottom trough 422 may be curved, defining a circle or an oval, or any cuboidal shape with square and rectangular shapes being preferred, the cuboidal shape having sharp (right-angled) or curved corners. In some embodiments, bottom trough 422 is circular or oval and can have a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance. In one embodiment, bottom trough 422 is generally cuboidal in shape. In some embodiments, bottom trough 422 is cuboidal and can have a width of 1 to 4 feet, 2 to 4 feet, 3 to 4 feet, 1 to 3 feet, 2 to 3 feet, or 1 to 2 feet and a length of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet. The height of bottom trough 422 can be 1 to 5 feet, 1 to 4 feet, 1 to 3 feet, 2 to 3 feet or 1 to 2 feet. In addition, the perimeter formed by one or more sides 412 and top opening 416 may be curved, defining a circle or an oval, or any closed polygonal shape with triangle, square, rectangular, and pentagonal shapes. The resulting interior space of bottom trough 422 located below the plain of top opening 416 defines a reservoir 418. The shape of reservoir 418 is defined by the internal surface of each of the one or more sides 412 of bottom trough 422 and bottom 414. Each of the one or more vertical support members 424 span the space between bottom trough 422 and top support structure 426, as exemplified in FIG. 4A as 424a, 424b, 424c and 424d, As shown in FIG. 4, one or more vertical support members 424 and top support structure 426 may be attached to bottom trough 422. Alternatively, one or more vertical support members 424 and top support structure 426 may be free-standing from bottom trough 422. When attached bottom trough 422 one or more vertical support members 424 may be an integral part of bottom trough 422 and be considered one component, or may be a separate component that physically secured to bottom trough 422. For example, a first end of one or more one or more vertical support members 424 of frame system 420 may be attached to attached to bottom trough 422 as an integral part of bottom trough 422 or physically secured using mechanical fasteners, for example, nuts and bolts, screws, rivets or other fasteners known in the art, or through welding, or adhesives, or any combination of the preceding known in the art. One or more vertical support members 424 are generally 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet in height.

As shown in FIG. 4, one or more vertical support members 424 comprise a first end that may be attached to bottom trough 422 and a second end that may be attached to top support structure 426. One or more vertical support members 424 may be attached to the perimeter of bottom trough 422 on the exterior. Alternatively, one or more vertical support members 424 may be placed in openings formed in bottom trough 422. One or more vertical support members 424 may be placed equally spaced apart on bottom trough 422. For example, if bottom trough 422 has a square cross section, one or more vertical support members 424 may be placed at or near each of the corners of the square. Alternatively, if bottom trough 422 were to be provided having an arced or curved perimeter, one or more vertical support members 424 may be placed at equal intervals along the arc or curved perimeter of bottom trough 422. In certain embodiments, there may be four vertical support members 424, or as few as two vertical support members 424, and as many as eight vertical support members 424. On a second end, each of one or more vertical support members 424 may connect to top support structure 426 (for one particular configuration, see FIG. 4). One or more vertical support members 424 are spaced apart to accommodate bar system 440 as discussed below to the interior of a perimeter defined by one or more vertical support members 424.

One or more vertical support members 424 may be of any cross-sectional shape so long as one or more vertical support members 424 have the structural integrity to support the weight of the structure above including top support structure 426, lift system 430 and a bar system 440 in a manner that ensures bubble sheet making apparatus 410 operates correctly. For example, one or more vertical support members 424 may have a polygon transverse cross-sectional shape like a square, rectangle, or pentagonal shape or a curved transverse cross-sectional shape like a circle or oval.

Bubble sheet making apparatus 410 further include a lift system 430. As shown in FIG. 4, lift system 430 comprising one or more pulleys 432 and one or more lifting cords 434 running therethrough. Pulley system 430 is affixed to top support structure 426. Spools may be used in place of either or both of one or more pulleys 432. Spools may offer certain advantages in large systems with one or more lifting cords 434 and bar system 440 which weigh enough to require a user to have some further mechanical advantage to lift bar system 440 and the required portion of the attached one or more lifting cords 434.

One or more lifting cords 434 comprise a first end and a second end. A first end of each of one or more lifting cords 434 may be connected to bar system 440. Each of the one or more lifting cords 434 may be attached at each end of a top bar of bar system 440. Each of one or more lifting cords 434 may then run from the connection with bar system 440 through one or more pulleys 432 and may then be connected at a second end or may hang freely on the other side of the one or more pulleys 432 or drape over arm 415, if so provided. In one embodiment, as exemplified in FIG. 4, lifting cords 434a and 434b are attached to top bar 442 of bar system 440 and are run through pulleys 432a, 432b and 432c.

The second ends of one or more lifting cords 434 may be provide a grasping portion, which may be simply a knot or a sleeve or handle, for example, such grasping portion optionally being weighted to keep tension one or more lifting cords 434 making them taut. This accomplishes several things. First, it makes it easier for a user to grasp one or more lifting cords 434, as will be discussed in further detail below. Second, the connection of one or more lifting cords 434 at their second end prevents one or more lifting cords 434 from being pulled back out through one or more pulleys 432. This routing of one or more lifting cords 434 offers further advantages. In addition, it keeps one or more lifting cords 434 routed up higher, and substantially horizontally, away from bar system 440 when bubble sheet making apparatus 410 is in operation. Furthermore, the routing from one or more pulleys 432 both brings one or more lifting cords 434 into closer proximity for ease of grasping by a user, and moves the second end of one or more lifting cords 434 substantially to the perimeter of bubble sheet making apparatus 410. As will be discussed in further detail below, this routing prevents one or more lifting cords 434 from interfering with the creation of a bubble sheet 448.

Bubble sheet making apparatus 410 further includes a bar system 440. Referring still to FIG. 4, bar system 440 comprises a top bar 442, one or more depending cords 444, and optionally a bottom bar 446. Bar system 440 is collapsible due to the flexible or collapsible nature of one or more depending cords 444. Top bar 442 is wrapped along its length in absorbent material 450 used to retain bubble solution 4. As one example, absorbent material 450 can be made of the same material as lifting cords 434 and/or one or more depending cords 444. For example, absorbent material 450, lifting cords 434 and/or depending cords 444 can be made from fibers, such as hemp, cotton, polyester or blends thereof or of a differing material (such as athletic tape, having cotton fibers with polymer elastic strands woven throughout, for example OTHER MATERIALS?).

One or more depending cords 444 can be a single integral component with absorbent material 450 or can be a separate and distinct component. When a single integral component, absorbent material 450 is secured to top bar 442 by, for example wrapping around top bar 442, in a manner where each end portion of absorbent material 450 becomes one or more depending cords 444 comprising a free end This embodiment is exemplified in FIG. 4, where a material is wrapped around top bar 442 to become absorbent material 450 and each end portion of this material becomes depending cords 444a and 444b. Alternatively, when a separate distinct component, one or more depending cords 444 comprise a first end and a free end, where the first end is secured to top bar 442.

The free end of each of one or more depending cords 444 can simply hang freely down from top bar 442, and in such configuration may be optionally weighted to keep tension on the one or more depending cords 444, making them taut. Alternatively, the free end of one or more depending cords 444 when in a single integral component configuration (shown in dashed lines in FIG. 4) or the free end of one or more depending cords 444 when in a separate distinct component configuration can be secured to bottom bar 446. One or more depending cords 444 is composed of material that can collapse when supported but extend due to the force of gravity. For example, one or more depending cords 444 can be made from fibers, such as hemp, cotton, polyester or blends thereof.

In operation, bubble sheet making apparatus 410 has a rest position and a bubble sheet position. Bubble sheet making apparatus 410 begins in a rest position where bar system 440 is completely submerged in bubble solution 4 contained in reservoir 418 of bottom trough 422 thereby coating bar system 440 in bubble solution 4. As described above, the one or more lifting cords 434 of lift system 430 run from bar system 440 through one or more pulleys 432 and then the free, second end portion hangs down from one or more pulleys 432. The second end portion of one or more lifting cords 434 hangs at a height between one and five feet above the ground with a range of between two and four feet being preferred.

To activate bubble sheet making apparatus 410 from the rest position to a bubble sheet position shown in FIGS. 4 & 10A, a user may then grasp the second ends of one or more lifting cords 434 and pull on one or more lifting cords 434. As the user pulls on one or more lifting cords 434, one or more lifting cords 434 are drawn through one or more pulleys 432, lifting bar system 440 vertically upward from out of bottom trough 422. As top bar 442 of bar system 440 is lifted vertically upward out of bubble solution 4 by lift system 430, gravity causes bar system 440 to expand as one or more depending cords 444 uncoil until extended. When bar system 440 is completely lifted out of bubble solution 4 it is in the bubble sheet position. When bar system 440 is in its expanded or uncollapsed configuration it forms a framework comprising the top bar 442, the one or more depending cords 444 and, if present the bottom bar 446 with bubble solution 4 contained within this framework creating a large bubble sheet 448. In some embodiments, bar system 440 comprises top bar 442, two depending cords 444 and bottom bar 446 and generally forms a rectangular shape causing bubble solution 4 contained within this framework to creating a large rectangular bubble sheet 448. In the bubble sheet position, free end of one or more depending cords 444 when in a single integral component configuration or bottom bar 446 when in a separate distinct component configuration are substantially or completely removed from bubble solution 4 contained in bottom trough 422. At this point bar system 440 is in its uncollapsed, generally rectangular shape. In the bubble sheet position, a user can observe bubble sheet 448 and/or create new bubbles out of bubble sheet 448 by passing air via lungs, a tube or straw, a device that provides an air stream, blower, or smoke-like fog as disclosed in system 1000 (see FIG. 10A). Alternative geometries of bubble sheet 448, such as a triangular, square or circular bubble sheet 448 may be attained by alternatively providing an appropriate/corresponding geometry of bar system 440. In one example, a collapsible ladder-like geometry may be provided.

This fifth exemplary bubble-making station includes a system 400 providing station-specific media in a setting to facilitate basic educational science and mathematical principles using, e.g., a STEM curriculum. An attendant/guide can conduct a demonstration or lead a user(s) in an activity designed to exemplified various physical phenomena. After the demonstration the attendant/guide can lead a discussion, optionally referring to bubble-making station specific media for visuals to help explain the various scientific phenomena. Non-limiting examples of station specific media include, e.g., a poster, a handout, a monitor, an interactive monitor, a touch-screen monitor, a water-proof monitor or tablet.

Alternatively such information may be provided solely in the form bubble-making station specific media, without the aid of an attendant/guide.

For example, an attendant/guide can proceed to have a user or users create a large bubble sheet and have them test its properties. The user(s) will pull up the bubble screen and the attendant/guide can ask user(s) to blow gently and see what happens. The question of "what happens when they blow hard?" can be put to the users. The attendant/guide can explain that a thin bubble film forms from the polar properties of the bubble solution on the top bar of the bar system and then travels down the cords keeping the screen intact. When a user or users blow air through the bubble sheet, they test how strong the soap molecules are to stick together (aka affinity). If the air stream is soft enough then molecules have time to adjust and retain sufficient attraction to each other, maintaining the bubble sheet, but when a user or users blow too hard, the quick force pulls the molecules apart, popping the film/sheet and/or forming a bubble or bubbles therefrom.

Further, an attendant/guide can ask questions relating to the colors and light interplay with the flat bubble solution sheet. For example, an attendant/guide can ask what happens to light that comes in and goes through the bubble sheet? The attendant/guide can then explain that bubble solution will absorb and change some of the light (aka refractive index) based on what is in bubble solution, to different colors of lights (aka wavelengths) so they bend a bit different after they leave the bubble sheet. That's why if the user(s) look really hard, the user(s) can almost see a rainbow on this film.

A sixth exemplary bubble-making station includes system 500 that comprises a bubble making apparatus, methods of using and/or interacting with the bubble making apparatus and station-specific media demonstrating basic educational science and mathematical principles using, e.g., a STEM curriculum. The bubble making apparatus creates bubbles of the same or of various sizes that are projected out from and in front of the apparatus and float at varying heights and an activity area. The projecting stream of bubbles allows one or more users to pop the bubbles with various objects, for example, projectiles such as a ball, beanbag, a disc, an arrow from a bow, water from a water-projecting gun; a slingshot, or any other a gliding toy or sporting item that can be propelled or provide an airborne object/projectile to hit a bubble may be used. The apparatus can create bubbles at varying heights to allow users of different heights to pop the bubbles at different levels from the ground.

The object utilized to pop the resultant bubbles from the apparatus can be anything from a ball to water from a water gun. Any object that can be used to pop a bubble can be utilized. Various games may be designed having various goals of the game. One possibility is to pop as many bubbles as possible using whatever object is available for popping within a specific amount of time. Another goal can be to place targets, such as a bullseye along a wall a user 2 can try to pop a bubble while at the same time aiming to hit the wall mounted target. In particular examples and where the target is a bullseye, the user may endeavor to utilize the projectile to pop a bubble or bubbles and also hit the bullseye closest to its center to score points, the points corresponding to the rings of the bullseye (e.g. the closer the ring to the bullseye the higher the points). One possibility is to score baskets along the wall, where the participant can try to pop both a bubble and make a basket utilizing the same projectile in the same throw/shot.

Figure 5A:
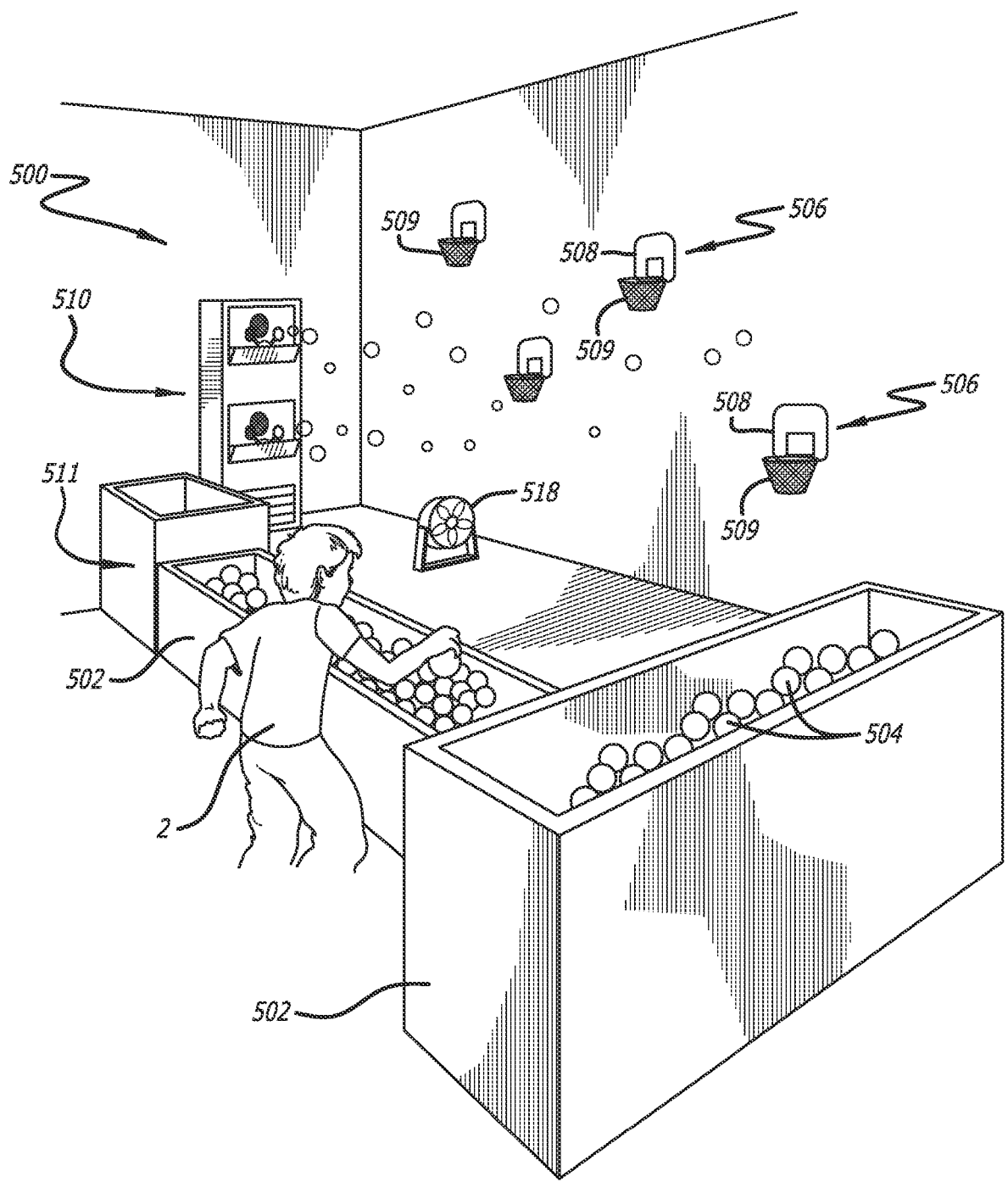

Referring to FIG. 5A, system 500 comprises a bubble making apparatus 510 to produce a stream of bubbles and an activity area 511. As part of system 500, an air blower 512, such as, e.g., a fan, may be provided to augment an air stream producing system 540 and/or to push air to ventilation unit 560. Activity area 511 comprises comprising at least one receptacle and/or one or more targets. The dimensions of activity area 511 are generally of a size of a room and provide enough space for so that a user can comfortably through projectiles at one or more targets or at the stream of bubbles being produced by bubble making apparatus 510. In particular embodiments, activity area 511 can be 4×15 feet area, 4×20 feet area, 4×25 feet area, 4×30 feet area, 6×15 feet area, 6×20 feet area, 6×25 feet area, 6×30 feet area, 8×15 feet area, 8×20 feet area, 8×25 feet area, 8×30 feet area, 10×15 feet area, 10×20 feet area, 10×25 feet area, or 10×30 feet area.

User 2 is placed in activity area 511 and positioned at a distance from bubble making apparatus 510 but within proximity of at least one receptacle 502 which may hold projectiles/toys that provide projectiles 504. Projectiles 504 include, without limitation a bean bag, a ball, a spear and an arrow or any combination thereof. One or more targets 506 can be practically anything that can be targeted by user 2, such as a bullseye or a balloon, for example. In this example, target 506 is shown having a basketball theme, here comprising a basket 509 and a backboard 508. In particular configurations, target 506 or plurality thereof can be provided as a suspended target to be hit with a projectile, alone or in addition to wall mounted target(s). Apparatus 510 is activated and produces a stream of bubbles, which may or may not be directed by an air stream provided by blower 512, here in this example shown as a fan positioned at floor level. User 2 then proceeds to endeavor to hit the bubbles and target 506, reaching into receptacle 502 for projectiles. Various time limits, limited number of projectiles/chances to throw etc. . . . , scores can be noted and recorded to provide for some method of scoring/ranking.

Figure 5D:
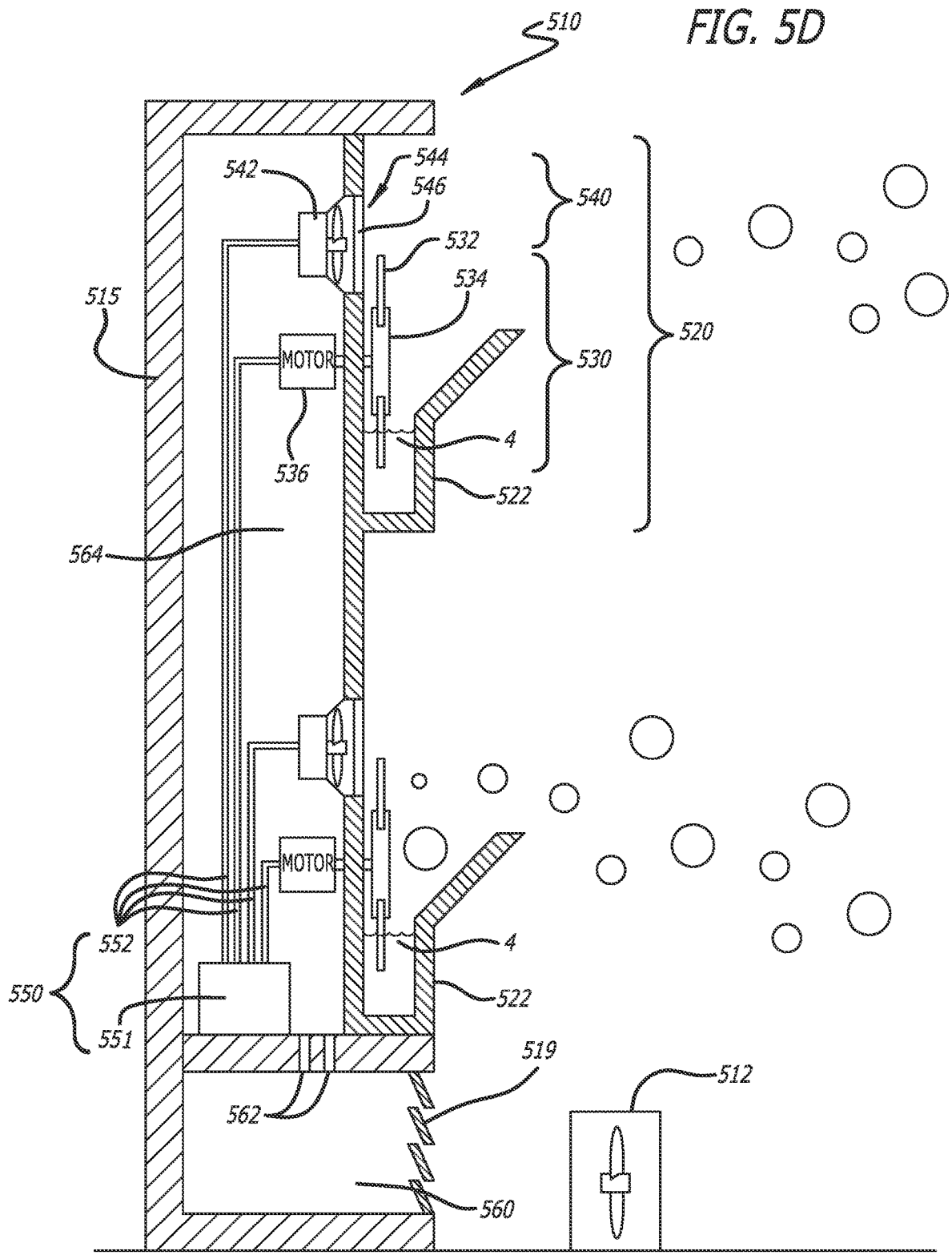

Turning to FIGS. 5B-5D, bubble making apparatus 510 comprises a support structure 515 and one or more bubble producing systems 520. Support structure 515 generally comprises one or more sides 516, a bottom 517, and a top 518, with one of the one or more sides optionally including a front 516f. Support structure 515 may be curved, defining a circle or an oval, or any cuboidal shape with square and rectangular shapes being preferred, the cuboidal shape having sharp (right-angled) or curved corners. In some embodiments, support structure 515 is circular or oval in shape and have a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance. In one embodiment, support structure 515 is generally cuboidal in shape. In some embodiments, support structure 515 is cuboidal in shape and can have a width of 1 to 6 feet, 2 to 6 feet, 3 to 6 feet, 4 to 6 feet, 5 to 6 feet, 1 to 5 feet, 2 to 5 feet, 3 to 5 feet, 4 to 5 feet, 1 to 4 feet, 2 to 4 feet, 3 to 4 feet, 1 to 3 feet, 2 to 3 feet, or 1 to 2 feet and a length of 1 to 6 feet, 2 to 6 feet, 3 to 6 feet, 4 to 6 feet, 5 to 6 feet, 1 to 5 feet, 2 to 5 feet, 3 to 5 feet, 4 to 5 feet, 1 to 4 feet, 2 to 4 feet, 3 to 4 feet, 1 to 3 feet, 2 to 3 feet, or 1 to 2 feet, and a height of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet.

As best seen in FIG. 5D, a cutaway view of FIG. 5B at line 5D, support structure 515 also comprises a power system 550, and a ventilation unit 560. Power system 550 comprises a power supply 551 that provides electricity and one or more electrical wires 552. One or more electrical wires 552 connect power supply 551 to one or more motors 536 of a motorized bubble producing tool system 530 and one or more fans 542 of an air stream producing system 540.

Ventilation unit 560 comprising bottom vent 519 and a flow area 562 by which air may flow to an internal portion 564 of support structure 515 of bubble making apparatus 510. Such ventilation helps keep bubble making apparatus 510 cool from the heat generated from one or more motors 536 of a motorized bubble producing tool system 530 and one or more fans 542 of an air stream producing system 540. In addition, this ventilation supplies air to one or more fans 542 of an air stream producing system 540, thereby facilitating the expulsion of air in a generally horizontal direction through one or more vents 544 and outward from the front of bubble making apparatus 510. In an alternative embodiment, conduit can be used instead of internal portion 564 of support structure 515 to provide more directed air flow to one or more motors 536 of a motorized bubble producing tool system 530 and one or more fans 542 of an air stream producing system 540.

As best seen in FIG. 5D, a cutaway view of FIG. 5B at line 5D, one or more bubble producing systems 520 each comprise a motorized bubble producing tool system 530 and an air stream producing system 540. Turning to the upper portion of FIG. 5D, each motorized bubble producing tool system 530 comprises a reservoir 522 containing bubble solution 4, one or more bubble producing tools 532 attached to a central hub 534 with central hub 534 operably linked to a motor 536. Power is provided to motor 536 from power supply 550. In one embodiment, motor 536 can vary in speed to adjust the rotational velocity of central hub 534 and how fast bubbles can be created by bubble making apparatus 510. Still referring to FIG. 5D, air stream producing system 540 comprises a motorized blower 542, such as a fan and a vent 544. Vent 544 may be an open or porous aperture. Power is provided to motorized blower 542 from power supply 550. In one embodiment, motorized blower 542 can vary in speed to adjust the distance bubbles can be pushed away from bubble making apparatus 510.

In operation, motorized blower 542 continuously expels air in a generally horizontal direction through vent 544 and outward from the front of bubble making apparatus 510. At the same time, motor 536 continuously spins central hub 534 causing each of the one or more bubble producing tools 532 to become submerged into bubble solution 4 contained in reservoir 522. This continuous spinning of central hub 534 then lifts each of the one or more bubble producing tools 532 from bubble solution 4 and then causes each of the one or more bubble producing tools 532 to pass by vent 544. More particularly, air being expelled from vent 544 by air stream producing system 540 causes bubbles to be formed from bubble solution 4 contained in each of the one or more bubble producing tools 532 and propelling such formed bubbles away from bubble making apparatus 510. Each of the one or more bubble producing tools 532 continues to rotate past air stream being expelled through vent 544 by air stream producing system 540 and become submerged again into bubble solution 4 contained in reservoir 522, where the rotational cycle repeats to thereby provide a continuous stream of bubbles.

This sixth exemplary bubble-making station includes a system 500 providing station-specific media in a setting to facilitate basic educational science and mathematical principles using, e.g., a STEM curriculum. An attendant/guide can conduct a demonstration or lead a user(s) in an activity designed to exemplified various physical phenomena. After the demonstration the attendant/guide can lead a discussion, optionally referring to bubble-making station specific media for visuals to help explain the various scientific phenomena. Non-limiting examples of station specific media include, e.g., a poster, a handout, a monitor, an interactive monitor, a touch-screen monitor, a water-proof monitor or tablet. Alternatively such information may be provided solely in the form bubble-making station specific media, without the aid of an attendant/guide.

A seventh exemplary bubble-making station includes system 600 that comprises a bubble tower making apparatus, methods of using and/or interacting with the bubble tower making apparatus and station-specific media demonstrating basic educational science and mathematical principles using, e.g., a STEM curriculum. The bubble tower making apparatus surround a person on all sides with an open-ended bubble tube or tower made of a bubble solution.

Referring to FIGS. 6A-6H, exemplary embodiments of various aspects of system 600 and bubble tower making apparatus are shown. Generally, a bubble wall apparatus comprises a base system, a support frame system, and a lift system. A base system disclosed herein comprises a platform on which a participant stands, and a fluid trough surrounding the platform and designed to contain a bubble solution. A support frame system comprises a one or more vertical support members connected to a base system, a top frame connected to the vertical support members and including one or more cross members. A lift system is mounted onto a support frame system, a lift system comprising one or more lifting pulleys, one or more control pulleys and one or more cables, each of the one or more cables capable of being connected on a first end portion to a bubble hoop, individually passing through one or more lifting pulleys and one or more control pulleys, and capable of being connected on a second end portion to others of the one or more cables or be or may hang freely. In operation, a bubble hoop may be moved from a rest position in which a bubble hoop is located in a fluid trough to a bubble wall position in which a bubble hoop is raised some height above a fluid trough with a bubble wall formed between a fluid trough and a bubble hoop.

Figure 6A:
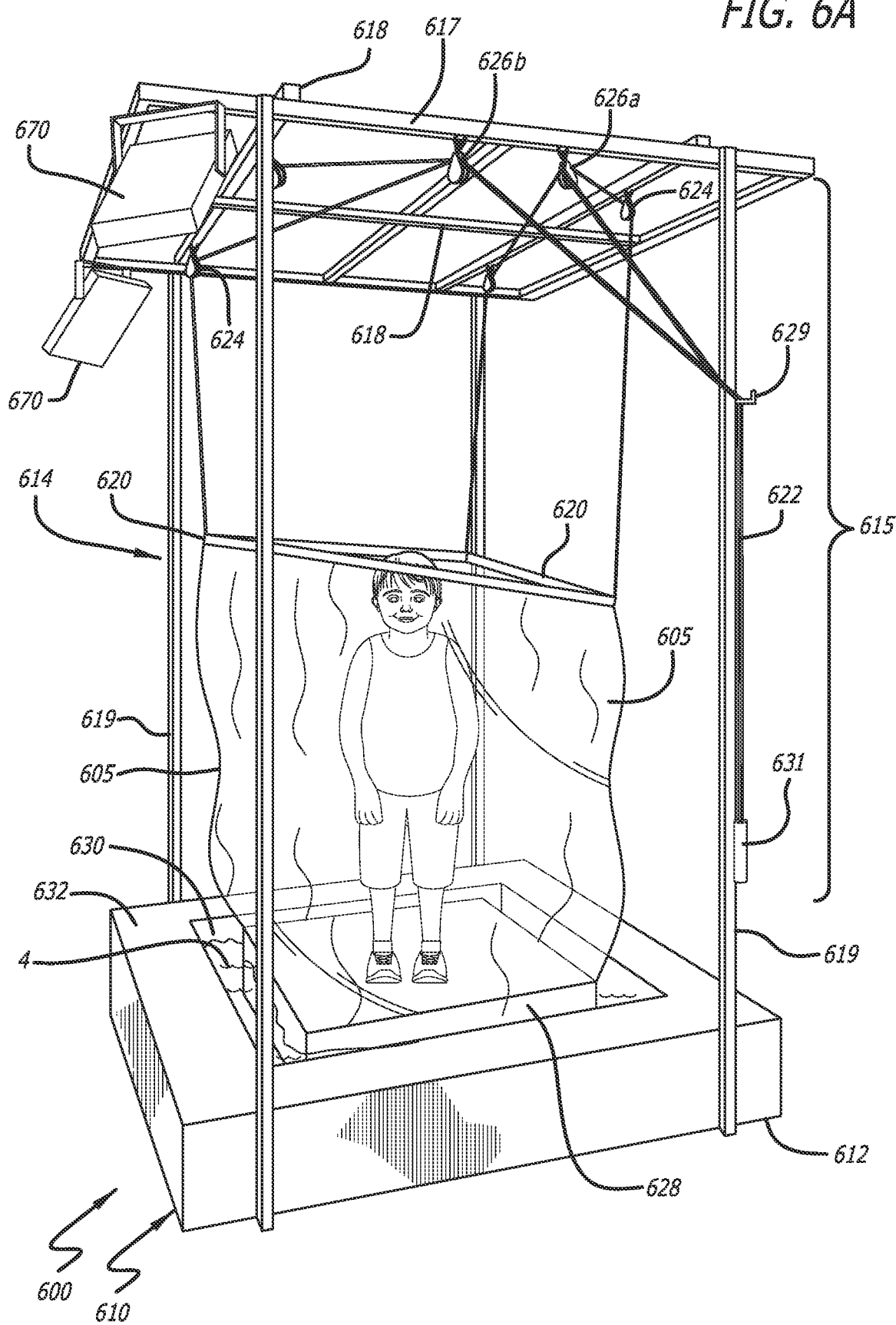
FIGS. 6A-6H illustrate an exemplary system 600 comprising bubble tower making apparatus 610 disclosed herein to provide a large bubble wall designed to encase an individual with FIG. 6A showing a front perspective view of the apparatus and system in use by a user.

In one particular configuration and as shown in FIG. 6A, a bubble tower making apparatus 610 includes a base system 612 that is connected to a support frame system 614 that supports a lift system 615. While base system 612 is shown here to be connected to support frame system 614, alternative configurations may have base system 612 and support frame system 614 not connected, e.g., support frame system 614 being free standing and a separate from base system 612.

Figure 6B:
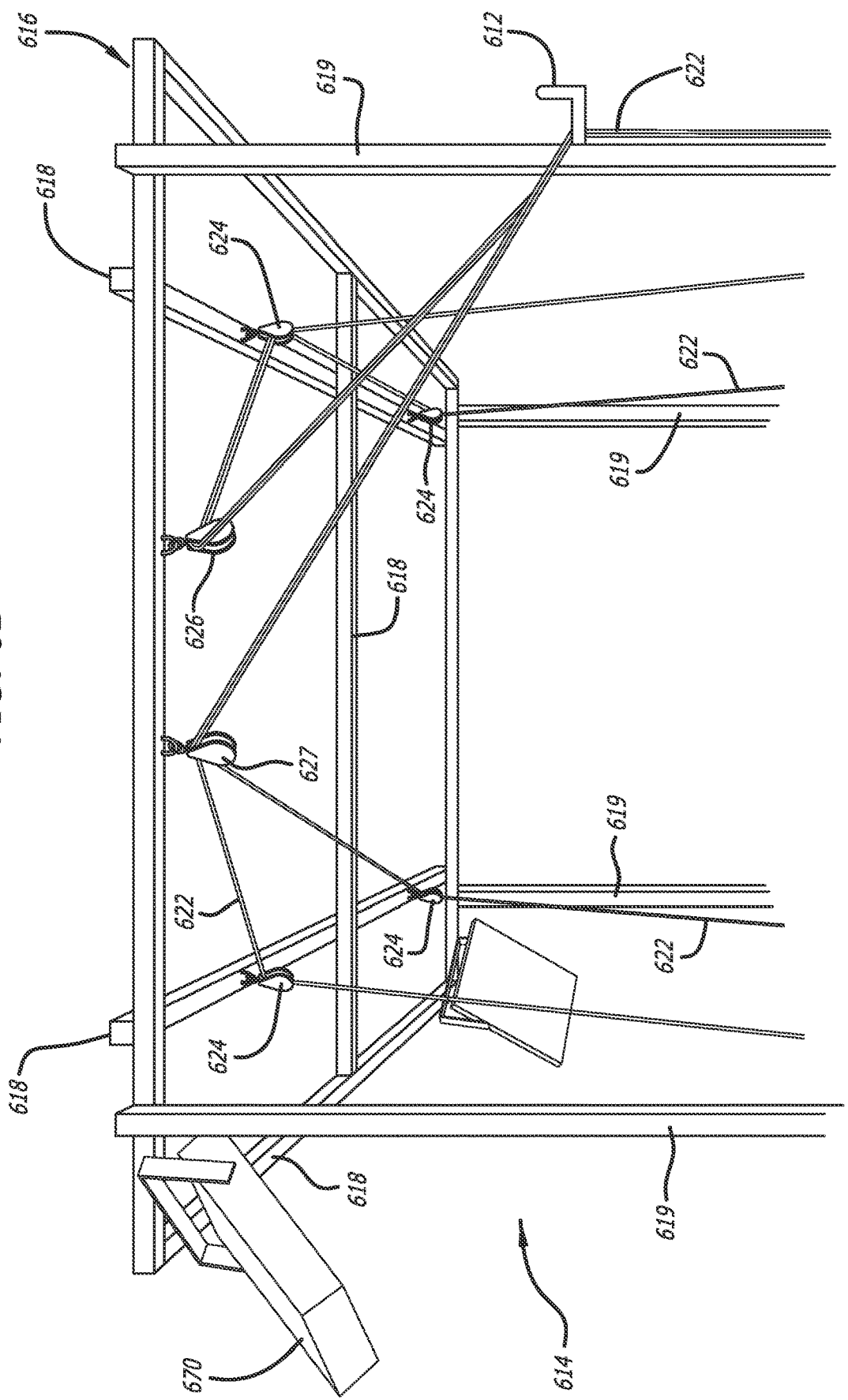
Figure 6C:
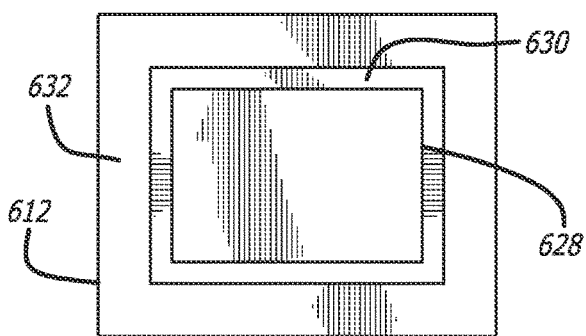
Figure 6D:
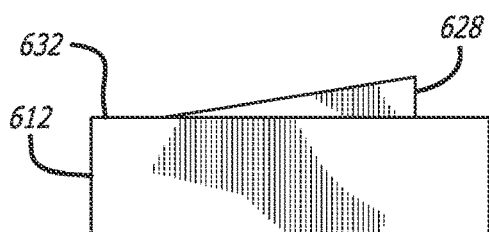

Referring to FIG. 6A, base system 612 comprises a platform 628 and a fluid trough 630. Fluid trough 630 surrounds platform 628 and in turn may be surrounded by a base surround 632. Platform 628 is the innermost component of base system 612 and may include a single planar surface. Platform 628 may be large enough for substantially any person to stand on, with a perimeter of platform 628 spaced apart from any portion of the person. The planar surface may include a non-skid material which prevents the planar surface from becoming slippery if some bubble solution 4 spills onto the planar surface. Alternatively, platform 628 may include more than a single planar surface. For example, as shown in FIGS. 6G & 6H, platform 628 may include a first surface, which may be planar and a second planar surface, one or both of which may be non-horizontal and come together at a central portion and define an angle and slope to cause any bubble solution 4 that falls thereon to run off of platform 628 and into fluid trough 630. The slope/angle of inclination of one or both planar surfaces of platform 628 from horizontal can be an amount that does not hinder standing of a user on platform 628, yet sufficient enough to bias flow of any bubble solution 4 that falls thereon back towards fluid trough 630. An exemplary useful angle can be from one to ten degrees, from two to five degrees being preferred.

Figure 6E:
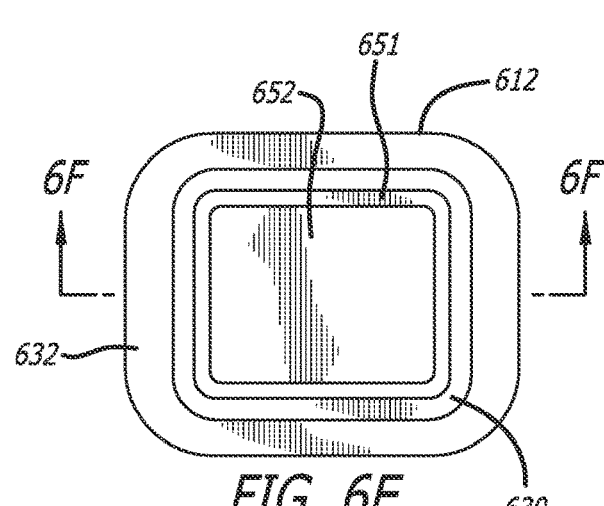
Figure 6G:
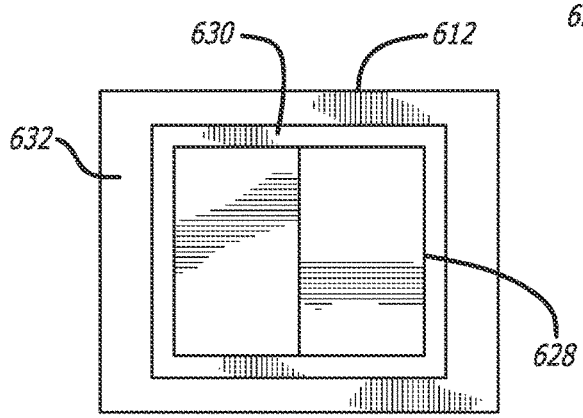
Figure 6F:
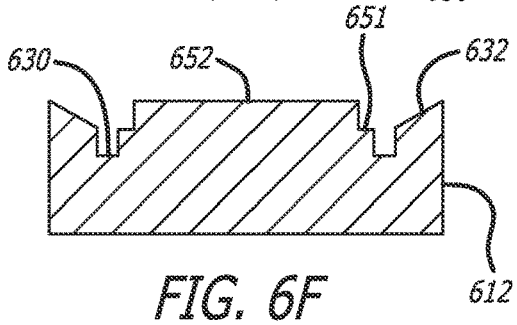
Figure 6H:
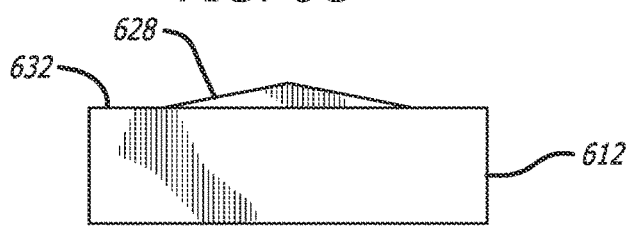

Referring to FIG. 6A, and also FIGS. 6E-6G fluid trough 630 of base system 612 surrounds platform 628 and defines its outer perimeter. Fluid trough 630 may include a first substantially vertical wall, and a second substantially vertical wall spaced apart from the first, with a bottom surface extending between the first wall and the second wall. The bottom surface may be substantially horizontal and therefor substantially perpendicular to the first wall and the second wall. Alternatively, the bottom surface may be curved. The curve may be convex, that is, the curve may extend downwardly from opposite edges. The opposite edges being where the bottom surface connects to a bottom edge of the first wall and to a bottom edge of the second wall, respectively. Fluid trough 630 may be filled manually by pouring bubble solution 4 into fluid trough 630. Alternatively, fluid trough 630 may be filled through an opening in fluid trough 630 which is fluidly connected to a pump, which may in turn be connected to a bubble fluid reservoir (not shown). The reservoir may be located in base system 612 or external to base system 612. Base system 612 may further include a valve which opens automatically when the pump is running and closes automatically when the pump stops running. Alternatively, the valve may be manually operated. The valve, pump, and reservoir may be connected to each other and fluid trough 630 by tubing, piping or other means known in the art. A top edge of the first wall may connect to platform 628.

Still referring to FIGS. 6A & 6E-6G, base surround 632 is exterior to fluid trough 630 and the outermost edge of base surround 632 may define a perimeter of base system 612. Base surround 632 may include a top surface which extends outwardly from the top edge of the second wall of fluid trough 630. The top surface of base surround 632 may be substantially horizontal. Alternatively, as shown in FIGS. 6E & 6F, the top surface base surround 632 may taper from an outermost edge to innermost edge, so that bubble solution 4 present on the top surface will flow into fluid trough 630. Base surround 632 may further include a perimeter wall. The perimeter wall may be substantially vertical. Alternatively, the perimeter wall base surround 632 may have a taper so that a bottom edge is exterior of a top edge. This gives base system 612 a larger footprint and greater stability. The perimeter wall may define a perimeter of base system 612.

As shown in FIGS. 6A, 6C & 6G, base system 612 and its component platform 628, fluid trough 630, and base surround 632 may all be in a square or rectangular shape and proportionate in size to one another. As shown in FIG. 6E, the outer perimeter of platform 628, the outside edge of fluid trough 630 and the outermost edge of base surround 632 of base system 612 are rectangular is shape with curved corners and are proportionate in size to each other. However, the outer perimeter of platform 628, fluid trough 630 and base surround 632 may vary in shape. For example, the outer perimeter of platform 628 may be curved, defining a circle or an oval, or any closed polygonal shape, with triangle, square, rectangular, and pentagonal shapes being preferred. Similarly, the outside edge of fluid trough 630 may be curved, defining a circle or an oval, or any closed polygonal shape and may have the same shape as the outer perimeter of platform 628, or may have a different shape. Likewise, the outermost edge of base surround 632 may be curved, defining a circle or an oval, or any closed polygonal shape and may have the same shape as the outer perimeter of platform 628, and/or the outside edge of fluid trough 630, or the outermost edge of base surround 632 may have a different shape from either or both the outer perimeter of platform 628, and/or the outside edge of fluid trough 630. For example, the perimeter of base 612 may define a rectangle, the outside edge of fluid trough 630 a circle, and the outer perimeter of platform 628 a square. So long as the structural integrity and functionality of the bubble tower making apparatus are sound, any shape of the outer perimeter of platform 628, the outside edge of fluid trough 630 and the outermost edge of base surround 632 of base system 612 are contemplated.

In some embodiments, the perimeter of base 612 can be 2 to 10 feet in width, 2 to 10 feet in length and 2 inches to 12 inches in height. In some embodiments, the perimeter of base 612 can be 3 to 9 feet in width, 3 to 9 feet in length and 3 inches to 10 inches in height. In some embodiments, the perimeter of base 612 can be 4 to 8 feet in width, 4 to 8 feet in length and 4 inches to 8 inches in height.

In some embodiments, the perimeter of base 612 can be 1 to 6 feet in radius and 2 inches to 12 inches in height. In some embodiments, the perimeter of base 612 can be 2 to 5 in radius and 3 inches to 10 inches in height. In some embodiments, the perimeter of base 612 can be 2 to 4 feet in in radius and 4 inches to 8 inches in height.

In some embodiments, the perimeter of platform 628 can be 2 to 10 feet in width, 2 to 10 feet in length and 2 inches to 12 inches in height. In some embodiments, the perimeter of platform 628 can be 3 to 9 feet in width, 3 to 9 feet in length and 3 inches to 10 inches in height. In some embodiments, the perimeter of platform 628 can be 4 to 8 feet in width, 4 to 8 feet in length and 4 inches to 8 inches in height.

In some embodiments, the perimeter of platform 628 can be 1 to 6 feet in radius and 2 inches to 12 inches in height. In some embodiments, the perimeter of platform 628 can be 2 to 5 in radius and 3 inches to 10 inches in height. In some embodiments, the perimeter of platform 628 can be 2 to 4 feet in in radius and 4 inches to 8 inches in height.

In some embodiments, the perimeter of fluid trough 630 can be 2 to 10 feet in width, 2 to 10 feet in length and 2 inches to 12 inches in height. In some embodiments, the perimeter of fluid trough 630 can be 3 to 9 feet in width, 3 to 9 feet in length and 3 inches to 10 inches in height. In some embodiments, the perimeter of fluid trough 630 can be 4 to 8 feet in width, 4 to 8 feet in length and 4 inches to 8 inches in height.

In some embodiments, the perimeter of fluid trough 630 can be 1 to 6 feet in radius and 2 inches to 12 inches in height. In some embodiments, the perimeter of fluid trough 630 can be 2 to 5 in radius and 3 inches to 10 inches in height. In some embodiments, the perimeter of fluid trough 630 can be 2 to 4 feet in in radius and 4 inches to 8 inches in height.

Base system 612 may be made of a material which is resistant to breakdown by fluid, specifically bubble solution 4, and has the rigidity to support the weight of a person up to 600 pounds and the weight of the additional structure of bubble tower making apparatus 610 which is placed thereon. Different polymers, fiberglass, and rigid plastics are contemplated, as are lightweight metals, for example, aluminum. The base may be formed from a single piece of material, or pieces of the same or different materials integrated to form base system 612. The base may be formed by stamping or molding, for example, or painted wood.

Bubble tower making apparatus 610 further includes a support frame system 614. As shown in FIGS. 6A & 6B, support frame system 614 comprises one or more vertical support members 619, and a top frame 616 comprising of one or more perimeter frame members 617 and one or more cross members 618. Each of the one or more vertical support members 619 span the space between base system 612 and top frame 616. Support frame system 614 may be attached to base system 612 or free-standing from base system 612. When attached to base system 612 support frame system 614 may be an integral part of base system 612 and be considered one component, or may be a separate component that physically secured to base system 612. For example, a first end of one or more vertical support members 619 of support frame system 614 may be attached to attached to base system 612 as an integral part of base system 612 or physically secured using mechanical fasteners, for example, nuts and bolts, screws, rivets or other fasteners known in the art, or through welding, or adhesives, or any combination of the preceding known in the art.

As shown in FIGS. 6A & 6B, one or more vertical support members 619 comprise a first end that may be attached to base system 612 and a second end that may be attached to top frame 616. One or more vertical support members 619 may be attached to the perimeter of base system 612 on the exterior. Alternatively, one or more vertical support members 619 may be placed in openings formed in base system 612. One or more vertical support members 619 may be placed equally spaced apart on base system 612. For example, if base 612 has a square cross section, one or more vertical support members 619 may be placed at or near each of the corners of the square. Alternatively, if base 612 were to be provided having a circular perimeter, one or more vertical support members 619 may be placed at equal interval arcs. For example, if there are four vertical support members 619, each vertical member 619 may be placed at each 90-degree arc along a 360-degree perimeter. In certain embodiments, there may be four vertical support members 619, or as few as two vertical support members 619, and as many as eight vertical support members 619. On a second end, each of one or more vertical support members 619 may connect to a top frame 616 (for one particular configuration, see FIG. 6B). One or more vertical support members 619 are spaced apart to accommodate a bubble forming device 620 to the interior of a perimeter defined by one or more vertical support members 619.

One or more vertical support members 619 may be of any cross-sectional shape so long as one or more vertical support members 619 have the structural integrity to support the weight of the structure above including top frame 616 and lift system 615 in a manner that ensures bubble tower making apparatus 610 operates correctly. For example, one or more vertical support members 619 may have a polygon transverse cross-sectional shape like a square, rectangle, or pentagonal shape or a curved transverse cross-sectional shape like a circle or oval. One or more vertical support members 619 are generally 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet in height.

Referring to FIGS. 6A & 6B, top frame 616 comprises one or more perimeter frame members 617 and one or more cross members 618. As discussed above, one or more vertical support members 619 connect to top frame 616. Top frame 616 may connect to one or more vertical support members 619 directly either as an integral part of top frame 616 or via mechanical fasteners, for example, nuts and bolts, screws or rivets, or other mechanical fasteners known in the art. Alternatively, top frame 616 may connect to one or more vertical support members 619 by welding or adhesives or other methods known in the art. Top frame 616 and one or more vertical support members 619 may also connect indirectly through the use of hangers or adapters fitted to the second end of each of one or more vertical support members 619. The hangers or adapters may include mechanical fasteners to hold one or more vertical support members 619 and one or more perimeter frame members 617 in place within the hangar or adapter.

Referring to FIGS. 6A & 6B, top frame 616 supports lift system 615. For example, one or more perimeter frame members 617 and/or one or more cross members 618 may support one or more lifting pulleys 624. One or more lifting pulleys 624 may be connected to one or more perimeter frame members 617 and/or one or more cross members 618 via mechanical fasteners, for example, nuts and bolts, screws or rivets, or other mechanical fasteners known in the art. Alternatively, one or more lifting pulleys 624 may connect to one or more perimeter frame members 617 and/or one or more cross members 618 by welding or adhesives or other methods known in the art. One or more perimeter frame members 617 and/or one or more cross members 618 may further support one or more control pulleys 626. As shown in FIG. 6A, one or more control pulleys 626, and may be connected to one or more perimeter frame members 617 and/or one or more cross members 618 via mechanical fasteners, for example, nuts and bolts, screws or rivets, or other mechanical fasteners known in the art. Alternatively, one or more control pulleys 626 may connect to one or more perimeter frame members 617 and/or one or more cross members 618 by welding or adhesives or other methods known in the art.

Bubble tower making apparatus 610 further include a lift system 615. Lift system 615 comprises one or more lifting pulleys 624, one or more control pulleys 626, one or more cables 622 running therethrough and bubble forming device 620. One or more cables 622 comprise a first end and a second end. A first end of each of one or more cables 622 may be connected to bubble forming device 620. Each of one or more cables 622 may run from the connection with bubble forming device 620 through one or more lifting pulleys 624. One or more cables 622 may then run through one or more control pulleys 626. One or more cables 622 may then be connected at a second end or may hang freely or draped over an arm 629, if so provided. One or more cables 622 may be attached to bubble forming device 620 at each of the corners of bubble forming device 620. Each of one or more cables 622 may run through one or more lifting pulleys 624, a total of four cables 622 and four lifting pulleys 624 as shown in an exemplary embodiment of FIG. 6A Two cables 622 may then run through a common first control pulley 626a. The remaining two cables 622 may run through a common second control pulley 626b. One or more cables 622 may hang freely on the other side of the first control pulley 626a and second control pulley 626b or drape over arm 629, if so provided.

Referring still to FIG. 6A, bubble forming device 620 may have any suitable geometry that generally comports with the geometry of fluid trough 630 to fit therein. For example, as shown in FIG. 6A bubble tower making apparatus 610 comprises a square bubble forming device 620 that comports with the substantially square shape of fluid trough 630 to fit therein. Bubble forming device 620 can be wrapped along its length in absorbent material, which is used to retain bubble solution 4. As one example, absorbent material can be made of the same material as one or more cables 622 (for example fibers, such as hemp, cotton, polyester or blends thereof) or of a differing material (such as athletic tape, having cotton fibers with polymer elastic strands woven throughout, for example OTHER MATERIALS?).

The second ends of one or more cables 622 may be provide a grasping portion 631, which may be simply a knot or a sleeve or handle, for example, such grasping portion 631 optionally being weighted to keep tension one or more cables 622 making them taut. This accomplishes several things. First, it makes it easier for a user to grasp one or more cables 622, as will be discussed in further detail below. Second, the connection of one or more cables 622 at their second end prevents one or more cables 622 from being pulled back out through one or more control pulleys 626 or one or more lifting pulleys 624. This routing of one or more cables 622 offers further advantages. In addition, it keeps one or more cables 622 routed up higher, and substantially horizontally, away from bubble forming device 620 when bubble tower making apparatus 610 is in operation. Furthermore, the routing from one or more lifting pulleys 624 to one or more control pulleys 626 both brings one or more cables 622 into closer proximity for ease of grasping by a user, and moves the second end of one or more cables 622 substantially to the perimeter of bubble tower making apparatus 610. As will be discussed in further detail below, this routing prevents one or more cables 622 from interfering with the creation of a bubble tower 605.

Spools may be used in place of either or both of one or more lifting pulleys 624 and one or more control pulleys 626. Spools may offer certain advantages in large systems with one or more cables 622 and bubble forming device 620 which weigh enough to require a user to have some further mechanical advantage to lift bubble forming device 620 and the required portion of the attached one or more cables 622.

Referring to FIGS. 6A & 6B, lighting or other effects may also be mounted to support frame system 614, e.g., to one or more vertical support members 619 and/or one or more perimeter members 617 and/or one or more cross members 618. The lighting may create an effect either through refraction or diffusion of the light on or though bubble tower 605, the formation of which is discussed in detail below, when bubble tower making apparatus 610 is in operation. Thus, lights 670 may be mounted in order that the emitted light intersects bubble tower 605, either directly or indirectly. Lights 670 may be mounted to support frame system 614 via mechanical fasteners, for example, nuts and bolts, screws or rivets, or other mechanical fasteners known in the art. Alternatively, lights 670 may connect to support frame system 614 by welding or adhesives or other methods known in the art.

In operation, bubble tower making apparatus 610 has a rest position and a bubble wall position. Bubble tower making apparatus 610 begins in a rest position where bubble forming device 620 is immersed in bubble solution 4 contained in fluid trough 630 thereby coating bubble forming device 620 in bubble solution 4. As described above, the one or more cables 622 run from bubble forming device 620 through one or more lifting pulleys 624 and then through one or more control pulleys 626 and then the free, second end portion hangs down from one or more control pulleys 626. The second end portion of one or more cables 622 hangs at a height between one and five feet above the ground with a range of between two and four feet being preferred. When bubble tower making apparatus 610 is at rest, a person may stand on platform 628.

To activate bubble tower making apparatus 610 from the rest position to a bubble wall position shown in FIG. 6A, a user may then grasp the second ends of one or more cables 622. The user may then pull on one or more cables 622. As the user pulls on one or more cables 622, one or more cables 622 are drawn through one or more control pulleys 626 and one or more lifting pulleys 624, lifting bubble forming device 620 vertically upward from out of fluid trough 630. As bubble forming device 620 moves vertically upward, bubble solution 4 is drawn between bubble forming device 620 and bubble trough 630. Bubble solution 4 drawn between bubble forming device 620 and bubble trough 630 creates a bubble tower 605 that encases the person standing on platform 628. The vertical shape of bubble tower 605 is a tube with a single continuous wall, and a first end anchored on bubble forming device 620 and a second end anchored in fluid trough 630. The horizontal shape of bubble tower 605 is one that conforms to the shape of bubble forming device 620. The height to which bubble tower 605 may be drawn is at the discretion of user. The height of bubble tower 605 may be in the range of a fraction of an inch to the height of one or more lifting pulleys 624. From the bubble wall position, user may return bubble tower making apparatus 610 to the rest position by releasing tension on one or more cables 622, allowing the force of gravity to act against the pulling of the user, and returning bubble forming device 620 to fluid trough 630. As bubble forming device 620 returns vertically downwardly to fluid trough 630, one or more cables 622 are drawn back through one or more control pulleys 626 and one or more lifting pulleys 624 in the opposite direction in which they were withdrawn, until bubble tower making apparatus 610 returns to the rest position.

This seventh exemplary bubble-making station includes a system 600 providing station-specific media in a setting to facilitate basic educational science and mathematical principles using, e.g., a STEM curriculum. An attendant/guide can conduct a demonstration or lead a user(s) in an activity designed to exemplified various physical phenomena. After the demonstration the attendant/guide can lead a discussion, optionally referring to bubble-making station specific media for visuals to help explain the various scientific phenomena. Non-limiting examples of station specific media include, e.g., a poster, a handout, a monitor, an interactive monitor, a touch-screen monitor, a water-proof monitor or tablet. Alternatively such information may be provided solely in the form bubble-making station specific media, without the aid of an attendant/guide.

For example, after enclosing/surrounding a user(s) in bubble tower, an attendant/guide can ask "What happens right after the bubble pops? Can the user(s) see some particles of 'broken' bubble falling to the floor? What do they think that is?" The attendant/guide can go over what makes a bubble (It's usually air trapped inside soap and water molecules). Here, these sides are not a typical spherical bubble so how do user(s) think it works? The attendant/guide can explain to the user(s) that as long as the bubble solution has clearly defined surfaces to attach to, the same polar properties apply. There is still a water, soap, water layer, but instead of attracting to each other like in a standard spherical bubble, the bubble solution adheres to the wet surfaces of the bubble hoop and bubble solution (the square shape bubble hoop at the top and the surface layer of bubble solution at the bottom.

An eighth exemplary bubble-making station includes system 700 that comprises a bubble light apparatus, methods of using and/or interacting with the bubble light apparatus and station-specific media demonstrating basic educational science and mathematical principles using, e.g., a STEM curriculum. The bubble light apparatus allows a user to create individual bubbles and/or a pile/cluster/tower of bubbles (for example, a "bubble brain" or "bubble tower") in a predefined defined spot and shines light through the bubbles to create different lighting and colored effects.

A bubble light apparatus 710 comprises a station having a plurality of defined or delineated spaced-apart locations for multiple user. Each location comprises a basin having a transparent or translucent bottom that allows the transmission of light and a light source underneath the bottom of the basin.

Figure 7A:
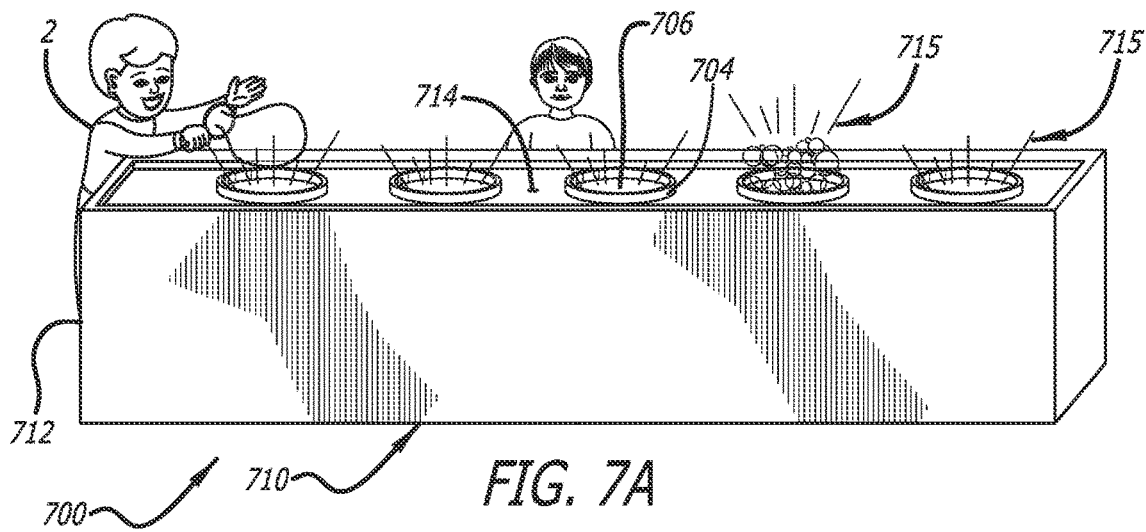
FIGS. 7A-7C illustrate an exemplary system 700 comprising bubble light apparatus 710 disclosed herein at a bubble-making station incorporating lights with FIG. 7A showing a front perspective view of the apparatus in use by a plurality of users.
Figure 7B:
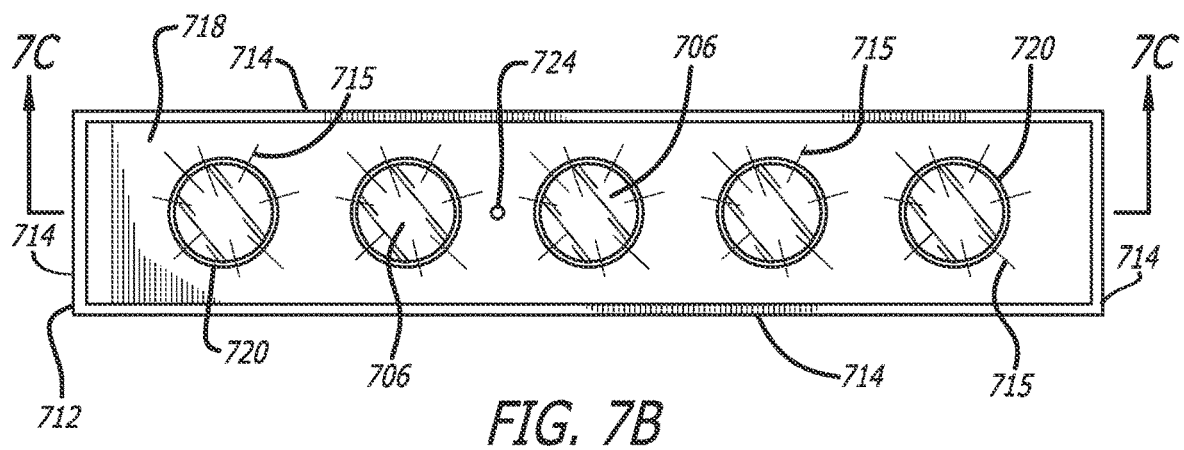
Figure 7C:
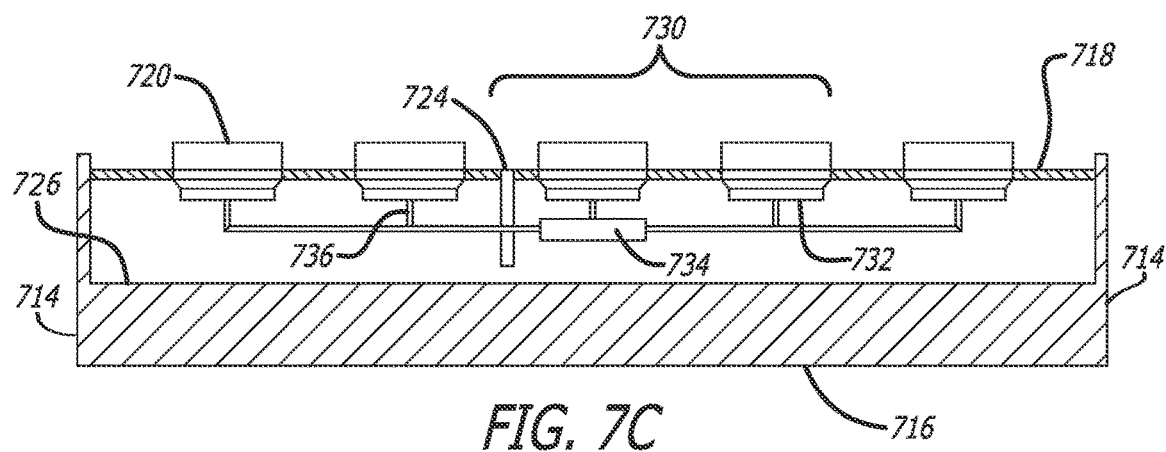

Referring generally to FIGS. 7A, 7B, & 7C, bubble light apparatus 710 comprises a support structure 712 and a lighting system 730. Support structure 712 comprises one or more sides 714, a bottom 716 and a top surface 718, with top surface 718 having one or more basins 720. Support structure 712 is used to stably support one or more basins 720 for proper use by a user and has with an internal space to house lighting system 730. As shown in FIGS. 7B & 7C, support structure 712 may optionally comprise one or more drains 724 and catch basin 726. Bubble light apparatus 710 can further include controls regulating the intensity and/or color of the light being generated by lighting system 730.

One or more sides 714 of support structure 712 may be curved, defining a circle or an oval, or any cuboidal shape with square and rectangular shapes being preferred, the cuboidal shape having sharp (right-angled) or curved corners. In some embodiments, support structure 712 is circular or oval and can have a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance. In one embodiment, support structure 712 is generally cuboidal in shape. In some embodiments, support structure 712 is cuboidal and can have a width of 1 to 4 feet, 2 to 4 feet, 3 to 4 feet, 1 to 3 feet, 2 to 3 feet, or 1 to 2 feet and a length of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet. The height of support structure 712 can be 1 to 5 feet, 1 to 4 feet, 1 to 3 feet, 2 to 3 feet or 1 to 2 feet.

Top surface 718 can further, and optionally, include a lip around a perimeter of top surface 718, thereby forming a reservoir designed to contain bubble solution 4. In a preferred embodiment, the lip of top surface 718 has a height of, for example, about 0.25 inches to 0.5 inches, about 1 inch to 5 inches, about 2 to 4 inches to about 3 inches. This top surface reservoir of top surface 718 is independent to the one or one basins 720 which also contain bubble solution 4. The shape defining top surface reservoir of top surface 718 may be curved, defining a circle or an oval, or any closed polygonal shape with triangle, square, rectangular, and pentagonal shapes being preferred, the polygonal shape having sharp or curved corners. In some embodiments, top surface reservoir of top surface 718 is circular or oval and can have a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance. In one embodiment, top surface reservoir of top surface 718 is generally polygonal in shape. In some embodiments, top surface reservoir of top surface 718 is polygonal in shape and each length of the polygon can be 1 to 4 feet, 2 to 4 feet, 3 to 4 feet, 1 to 3 feet, 2 to 3 feet, 1 to 2 feet, 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet. In some embodiments, top surface 718 can further, and optionally, be composed of a material, such as, e.g., glass, plexiglass, or plastic, that is partially or fully transparent and/or partially or fully translucent in a manner that allows light to transmit therethrough.

As shown in FIG. 7A, one or more basins 720 comprise one or more sides 704 and a bottom 706. Bottom 706 of one or more basins 720 is composed of a material, such as, e.g., glass, plexiglass, or plastic, that is partially or fully transparent and/or partially or fully translucent in a manner allows light to transmit therethrough. Top edge of each of the one or more sides 704 may be rounded off or be provided having a substantially right angle. In particular configurations, support structure 712 can comprise 2 to 10 basins, 3 to 9 basins, 4 to 8 basins, 3 to 7 basins, 4 to 7 basins, 5 to 7 basins, 4 to 6 basins, or 5 or 6 basins. Each of the one or more basins 720 can serve as a reservoir for bubble solution 4. Each of the one or more basins 720 are filled to a sufficient depth that may be manually delivered into basins 720. Each of the one or more basins 720 can be of any suitable geometry, perimeter, and/or shape and any depth that provides for a sufficient area and volume to hold bubble solution 4. In a preferred embodiment, the basins are circular and have a flat bottom 704 and a surrounding side 706 that rises from, for example, about 0.25 inches to 0.5 inches, about 1 inch to 5 inches, about 2 to 4 inches to about 3 inches from the bottom of the basins. Each of the one or more basins 720 can have a depth of bubble solution 4 of, for example, about 0.25 inches to 0.5 inches, about 0.25 inches to about 0.75 inches, about 0.5 inch to about 1 inch, about 1 inch to about 2 inches or about 0.5 inch to about 3 inches contained therein. Each of the one or more basins 720 may be made of any material which may retain a bubble solution, with materials that withstand corrosion from a bubble solution being preferred, such as, e.g., plastic, fiberglass, treated wood, glass, metal or any suitable material that can hold a bubble solution. One or more bubble producing tools, such as bubble wands, which may have multiple shapes with one or more hoops may be provided.

As best seen in FIG. 7C, lighting system 730 is located internal to support structure 712. Lighting system 730 comprises one or more light sources 732 connected to a power supply 734 using one or more electrical wires 736. One or more light sources 732 can include a LED-based light source. One or more light sources 732 can emit white light and/or colored light, using, for example, one or more light sources 732 integrally designed to emit colored light or one or more light sources 732 employing colored filters to produce colored light. Examples of colored light include purple, blue, green, orange, yellow and red. Power supply 734 powers the one or more light sources 732. In some embodiments, lighting system 730 further includes a controller for controlling timing, color and/or fading of one or more light sources 732. In one example, light source 732 provides lights of different colors to provide shine or illumination 715 (light) of the bubbles from beneath one or more basins 720.

In some embodiments, each of one or more light sources 732 is located underneath transparent or translucent bottom 706 of each of one or more basins 720 in a manner that directs light upward from one or more light sources 732 through transparent or translucent bottom 706 of each of one or more basins 720. In some embodiments, each of one or more light sources 732 is located underneath transparent or translucent top surface 718 of support structure 712 in a manner that directs light upward from one or more light sources 732 through transparent or translucent top surface 718.

In use, as shown in FIG. 7A, a user 2 dips the wand(s) into bubble solution 4 and lightly blows so as to create bubbles, which may be set on top surface of bubble solution 4 present in basin 720 and/or on top surface 718. When a sufficient number of bubbles are sitting together in a tower or pile, the pile of bubbles form and take on a configuration having, for example, the appearance of a brain, an animal, a face, a mountain or any other creative shape. The interfacing surfaces of adjacent individual bubbles create polygonal, for example, diamond shapes, three-dimensional polygonal shapes where the various individual bubbles interface with each other in the pile of bubbles. Light 715 from one or more light sources 732 shines from beneath one or more basins 720 thereby illuminating the bubbles.

This eighth exemplary bubble-making station includes a system 700 providing station-specific media in a setting to facilitate basic educational science and mathematical principles using, e.g., a STEM curriculum. An attendant/guide can conduct a demonstration or lead a user(s) in an activity designed to exemplified various physical phenomena. After the demonstration the attendant/guide can lead a discussion, optionally referring to bubble-making station specific media for visuals to help explain the various scientific phenomena. Non-limiting examples of station specific media include, e.g., a poster, a handout, a monitor, an interactive monitor, a touch-screen monitor, a water-proof monitor or tablet. Alternatively such information may be provided solely in the form bubble-making station specific media, without the aid of an attendant/guide.

For example, after formation of a bubble tower, an attendant/guide can ask a user(s) "What color do you think a bubble is?". Then the attendant/guide and/or a user(s) proceed to pop the bubble tower and wait until the solution settles and ask "Can you see any different colors in the bubbles? Why are there different lines across the bubble solution and what do the colors mean?" The attendant/guide can them proceed to disclose that one of the most common things people miss about bubbles is the color. Color gives us an extremely accurate tool for measuring the thickness of the soap film of the bubble. Light waves, like ocean waves, have peaks and valleys (aka crests and troughs). Red light has the longest wavelength and violet the shortest in the visible light spectrum. All waves, including light, have a unique property: if two waves combine, the waves can meet each other crest-to-crest, adding up and reinforcing the effect of each other, or they can meet crest-to-trough, cancelling each other out so that they have no effect. This combination of equal ups and downs causes complete cancellation (aka interference). This is why you see the pearly luster of an abalone shell, the beautiful colors in some bird feathers and insect wings, and the flowing patches of color in an oil slick on the street after a rain shower (iridescence)—and for the color of bubbles.

White light, most of the light that is in rooms and outdoors, is made up of all colors, all wavelengths. If one of these colors is subtracted from white light (by interference, for instance) we see the complementary color. For example, if blue light is subtracted from white light, we see orange. The bubble solution surface glistens with the complementary colors produced by interference. If we were to look at a highly magnified portion of a soap bubble membrane, we would notice that light reflects off both the front (outside) and rear (inside) surfaces of the bubble, but the ray of light that reflects off the inside surface travels a longer distance than the ray which reflects from the outside surface. When the rays recombine, they can get "out of step" or phase with each other and interfere. Given a certain thickness of the bubble wall, a certain wavelength will be cancelled, and its complementary color will be seen.

Thin film interference allows us to sometimes see a 'rainbow' in the bubble. When you see the reflection of the bubble getting darker, close to black in color, that means that it will likely pop at that specific point. Our eyes can't catch it fast enough, but when we use a slow-motion camera, we'll be able to see at what specific point the bubble pops.

After such an explanation/discussion the attendant/guide can lead the users in making and popping bubble towers on different colored light stations and ask user(s) what color is missing from the rainbow because of the light underneath shining through the bubbles. The attendant/guide can go over what colors are complementary colors: Yellow and Purple; Red and Green; and Blue and Orange. Since there is a substantial amount of educational points regarding reflective lights, bubble properties, and geometry at this station, the curriculum can be modified based on the age-range of the station user or users. The curriculum presented at any of the bubble-making stations of the facility can be modified based on the age-range of the station user or users.

A ninth exemplary bubble-making station includes system 800 that comprises a bubble jet apparatus, methods of using and/or interacting with the bubble jet apparatus and station-specific media demonstrating basic educational science and mathematical principles using, e.g., a STEM curriculum. The bubble jet apparatus provides a stream or jet of air that allows a user to quickly generate many bubbles in an immediate area, for example, hundreds of bubbles a minute, thereby providing an atmosphere in one area where users feel surrounded by bubbles floating all around them. The area can be enhanced with lights and music to create a fun and lively area where participants can dance and or simply stand still and be surrounded in bubbles.

A bubble jet apparatus comprises a station having a plurality of defined or delineated spaced-apart locations for multiple user. Each location comprises a basin containing a bubble solution and next to the basin an air vent that blows air in an upwardly vertical direction. A user or users are able to create and manipulate bubbles created by using various bubble producing tool or tools in conjunction with the air provided by the one or more air vents. Bubble wands, other bubble producing tools with various sized openings, grates with numerous small openings, large wands, and/or an apparatus that creates smoke-filled bubbles, such as that of FIG. 10B discussed above, can be used in conjunction with the upward air flow to create and keep bubbles suspended in the air.

Figure 8A:
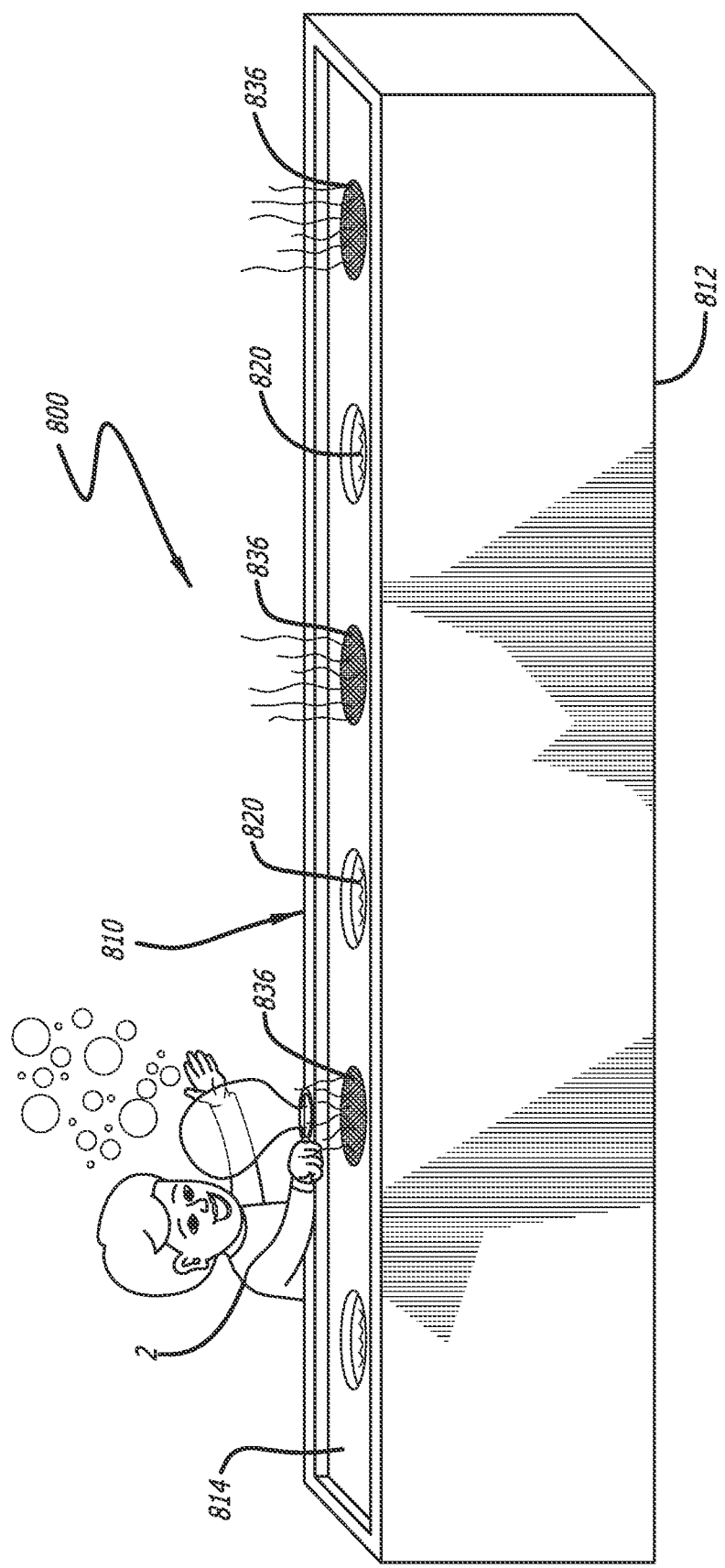
FIGS. 8A-8D illustrate an exemplary system 800 comprising bubble jet apparatus 810 disclosed herein utilizing streams of forced air to create bubbles with FIG. 8A showing a front perspective view of the bubble jet apparatus in use by a user.
Figure 8B:
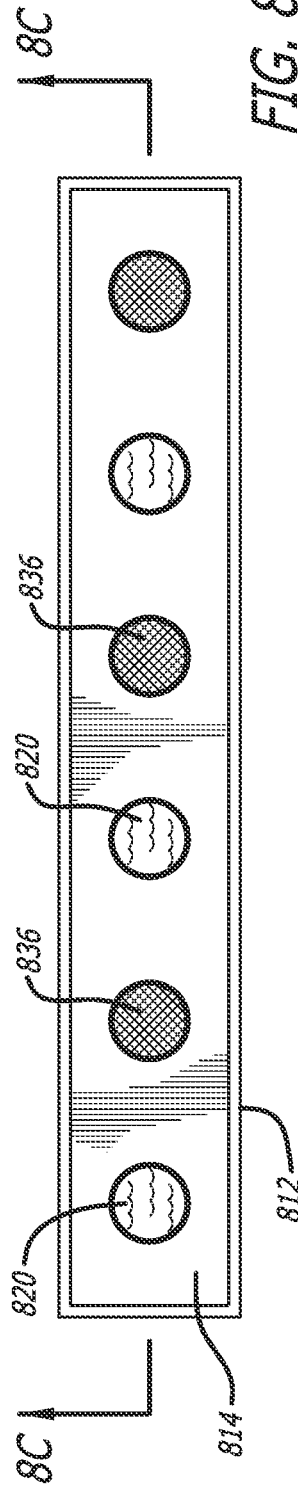

An exemplary bubble jet apparatus 810 is shown in FIGS. 8A-8D. Referring to FIG. 8A, bubble jet apparatus 810 comprises a support structure 812 and an air stream system 830. Support structure 812 comprises one or more sides 814, a bottom 816, and a top surface 818, with top surface 818 having one or more basins 820 and one or more vents 836. Support structure 812 is used to stably support one or more basins 820 and one or more vents 836 for proper use by a user and has with an internal space to house air stream system 830. Bubble jet apparatus 810 can further include controls regulating the intensity and/or direction of the air being generated by air stream system 830.

One or more sides 814 of support structure 812 may be curved, defining a circle or an oval, or any cuboidal shape with square and rectangular shapes being preferred, the cuboidal shape having sharp (right-angled) or curved corners. In some embodiments, support structure 812 is circular or oval and can have a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance. In one embodiment, support structure 812 is generally cuboidal in shape. In some embodiments, support structure 812 is cuboidal and can have a width of 1 to 4 feet, 2 to 4 feet, 3 to 4 feet, 1 to 3 feet, 2 to 3 feet, or 1 to 2 feet and a length of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet. The height of support structure 812 can be 1 to 5 feet, 1 to 4 feet, 1 to 3 feet, 2 to 3 feet or 1 to 2 feet.

The shape of top surface 818 of support structure 812 may be curved, defining a circle or an oval, or any closed polygonal shape with triangle, square, rectangular, and pentagonal shapes being preferred. In some embodiments, top surface is circular or oval and can have a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance. In one embodiment, top surface is generally polygonal in shape. In some embodiments, top surface is polygonal in shape and each length of the polygon can be 1 to 4 feet, 2 to 4 feet, 3 to 4 feet, 1 to 3 feet, 2 to 3 feet, 1 to 2 feet, 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet.

Figure 8C:
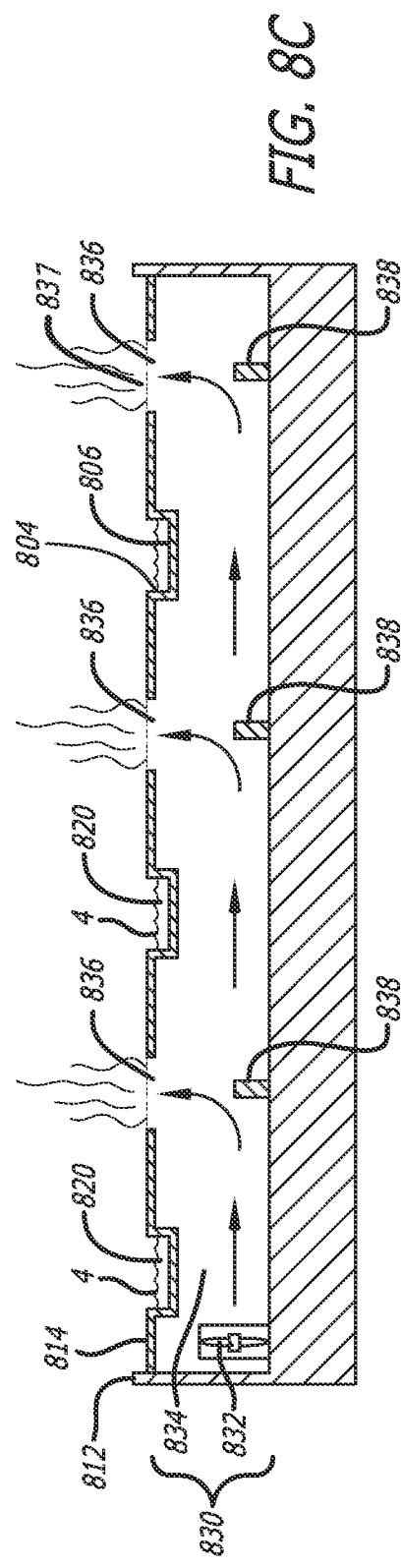
Figure 8D:
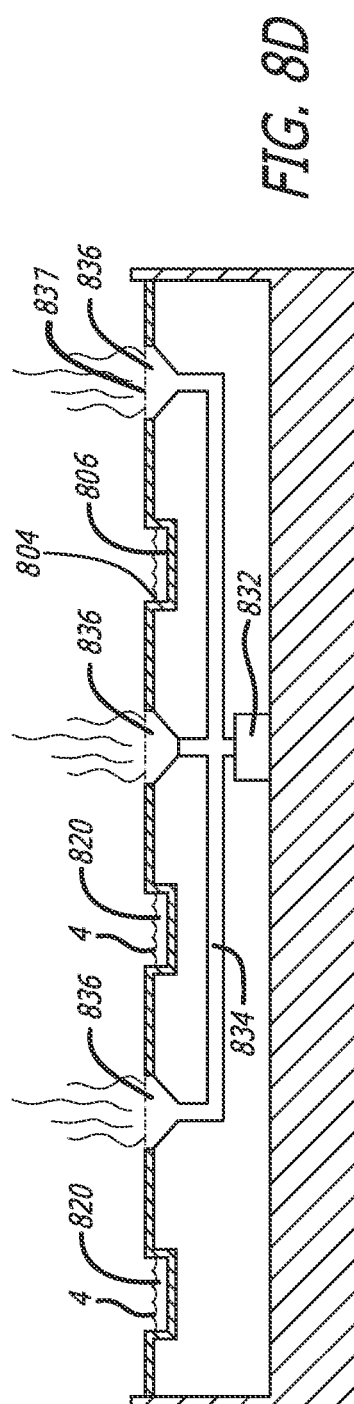

As best shown in FIGS. 8C & 8D, one or more basins 820 comprise one or more sides 804 and a bottom 806 and a top edge of one or more sides 804 may be rounded off or be provided having a substantially right angle. In particular configurations, support structure 812 can comprise 2 to 10 basins, 3 to 9 basins, 4 to 8 basins, 3 to 7 basins, 4 to 7 basins, 5 to 7 basins, 4 to 6 basins, or 5 or 6 basins. Each of the one or more basins 820 can serve as a reservoir for bubble solution 4. Each of the one or more basins 820 are filled to a sufficient depth that may be manually delivered into basins 820. Each of the one or more basins 820 can be of any suitable geometry that provides for an area to hold bubble solution 4. In a preferred embodiment, the basins are circular and have a flat bottom 804 and a surrounding side 806 that rises from, for example, about 0.25 inches to 0.5 inches, about 1 inch to 5 inches, about 2 to 4 inches to about 3 inches from the bottom of the basins. Each of the one or more basins 820 can have a depth of bubble solution 4 of, for example, about 0.25 inches to 0.5 inches, about 0.25 inches to about 0.75 inches, about 0.5 inch to about 1 inch, about 1 inch to about 2 inches or about 0.5 inch to about 3 inches contained therein. Each of the one or more basins 820 may be made of any material which may retain a bubble solution, with materials that withstand corrosion from a bubble solution being preferred, such as, e.g., plastic, fiberglass, treated wood, glass, metal or any suitable material that can hold a bubble solution. One or more bubble producing tools, such as bubble wands, which may have multiple shapes with one or more hoops may be provided.

One or more vents 836 can be provided as simple open apertures in top surface 818, or, and as best shown in FIGS. 8C & 8D, one or more vents 836 may be preferentially provided with a porous covering 837, the covering having pores that avow air to pass therethrough. Such a covered configuration of one or more vents 836 provides a safe way to provide air coming out of the internal space of support structure 812. Providing porous covering 837 also advantageously prevents objects from falling into the internal space of support structure 812.

As best seen in FIGS. 8C & 8D, air stream system 830 is provided in the internal space of support structure 812. In one embodiment and as shown in FIG. 8C taken along line 8C of FIG. 8B, air stream system 830 can comprise at least one motorized blower 832, such as one or more fans, one or more ducts 834, and one or more vents 836 and, optionally with one or more baffles 838. One or more baffles 838 can be provided across the internal space of support structure 812 and arranged substantially underneath one more vent 836 to deflect air blown by at least one motorized 832 up and out of one or more vents 836. One or more baffles 838 are placed inside not to prevent air flow altogether, but to upwardly direct air, as shown by arrows in FIG. 8C. At least one motorized 832 is preferentially provided at one end of the internal space of support structure 812 (as shown) or can be located, in an alternative configuration, directly under one or more vents 836 to blow air up and outwardly. As shown the exemplary embodiment of FIG. 8C, air duct 834 can simply be the internal space of support structure 812. Bubble jet apparatus 810 can further comprise a power supply and electrical wires to power at least one motorized 832 as known in the art. In one alternative configuration, bubble jet apparatus 810 can optionally include one or more drains at top surface 818 fluidly connected to one or more catch basins provided within internal space of support structure 812 to catch any bubble solution 4 that spills onto top surface 818.

In an alternative embodiment and as shown in FIG. 8D, at least one motorized 832 can blow air through air duct 834, where air duct 834 is a dedicated ventilation duct for directing air directly to and through one or more vents 836. In this embodiment, air duct 834 can be made from sheet metal, aluminum plastic and the like in composition, can be ridged or flexible in nature, and can be cylindrical or cuboidal in shape. Air duct 834 can also be tube-shaped and made of a wire coil and covered with a bendable, durable plastic, for example.

In use, as shown in FIG. 8A, a user 2 dips a bubble making tool into bubble solution 4 and places the bubble making tool over a vent in a manner that allows the air being blown upward from the vent to create bubbles. Controls regulating the intensity and/or direction of the air being blown upward from the vent can be adjusted by user 2 to create different size and number of bubbles as basin as illustrate educational principles.

This ninth exemplary bubble-making station includes a system 800 providing station-specific media in a setting to facilitate basic educational science and mathematical principles using, e.g., a STEM curriculum. An attendant/guide can conduct a demonstration or lead a user(s) in an activity designed to exemplified various physical phenomena. After the demonstration the attendant/guide can lead a discussion, optionally referring to bubble-making station specific media for visuals to help explain the various scientific phenomena. Non-limiting examples of station specific media include, e.g., a poster, a handout, a monitor, an interactive monitor, a touch-screen monitor, a water-proof monitor or tablet. Alternatively such information may be provided solely in the form bubble-making station specific media, without the aid of an attendant/guide.

For example, bubble jet system 800 provides an interactive bubble creating experience without using a user's pulmonary or motor skills allowing all individuals (impaired/handicapped or not) to enjoy and engage in bubble play. For example, educational points can revolve around the intensity of the air and the shape of the bubble producing tool being used. A blower, such as a fan within the apparatus, can have varying intensities and can be adjusted (by turning up or down the fan strength) to promote different educational principles. If a bubble producing tool, such as a bubble wand having a large diameter is used, the rate of wind must be slow enough in order to create a stable soapy membrane. If the rate of wind is too fast, there will be no resulting large bubble. Conversely, if using a smaller diameter wand, a faster rate of wind would still result in a smaller bubble due to the physics of soap film stability. Additionally, another activity may utilize a lightweight object (for example a balloon, a plastic ball) and the air blowing through the vent to teach principles of gravity, mass, and other physics-related properties.

An exemplary tenth bubble-making station includes system 900 that comprises one or more bubble pedestal apparatus, methods of using and/or interacting with the bubble pedestal apparatus and station-specific media demonstrating basic educational science and mathematical principles using, e.g., a STEM curriculum. The bubble pedestal apparatus comprises a basin containing a bubble solution and giant bubble wands to make large bubbles. A user or users can complete bubble tricks, including attempts to make bubbles large enough to enclose a person, or make a multitude of bubbles of varying sizes.

Figure 9A:
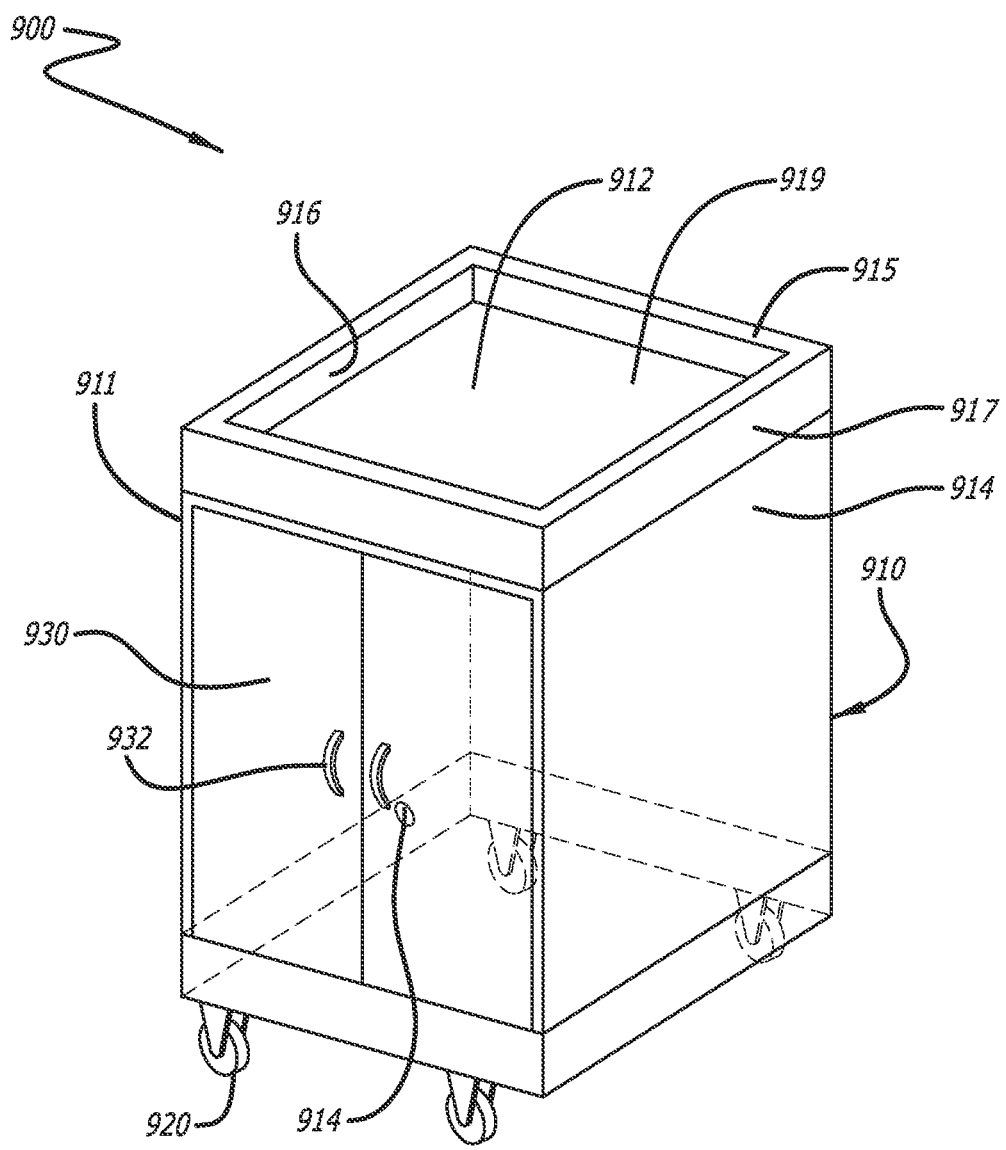
FIGS. 9A-9B illustrate an exemplary system 900 comprising bubble pedestal apparatus 910 as disclosed herein providing at least one pedestal having an enclosed and depressed top surface that serves as a reservoir for bubble solution with FIG. 9A a front perspective view of a bubble pedestal apparatus having a substantially square geometry.

Turning to FIG. 9A, an exemplary bubble pedestal apparatus 910 comprises a support structure 911 including a top surface 912 and one or more sides 914. The perimeter of top surface 912 has one or more lips 915, each having an internal surface 916 and an external surface 917, the internal space defined by internal surface 916 of each of one or more lips 915 defines a basin 919. Basin 919 can serve as a container for bubble solution 4. Bubble pedestal apparatus 910 can optionally, be provided with casters 920 to impart mobility to the system. Exemplary casters can be four-inch casters or any useful size, depending on the desired configuration. As shown in FIG. 9A, support structure 911 can optionally have a door 930 or plurality of doors to provide access to an internal portion of bubble pedestal apparatus 910. Door 930 or plurality of doors can optionally have a handle 932 and, optionally a lock 914. The internal portion of bubble pedestal apparatus 910 may be utilized as a storage space for containers holding bubble solution 4 and bubble producing tools, such as giant wands utilized at this exemplary tenth bubble-making station, for example.

In particular configurations, one or more lips 915 can have internal surface 916 that has a length that is larger, smaller or equal to an external surface of one or more lips 915. In one example, one or more lips 915 can have an external surface of about one to five inches tall, with a height of four inches being preferred and have a thickness of about ¾ inch. One or more lips 915 can be mounted onto top surface 912 of bubble pedestal apparatus 910 such that resulting basin 919 is at about two inches from the top of one or more lips 915, thus providing a bubble solution reservoir having a particular depth. In various embodiments, basin 919 can be from about 1 inch to 5 inches from top of one or more lips 915, a preferred distance being two inches, that is, internal surface 916 has a height of two inches and the resultant bubble reservoir can be filled with bubble solution 4 to a depth of two inches. In this particular embodiment, exemplary bubble pedestal apparatus 910 has one or more lips 915 that is square and has four lips of equal length, each thirty-six inches in length, as one example. The height of bubble pedestal apparatus 910 can be twenty-four inches to 48 inches.

Figure 9B:
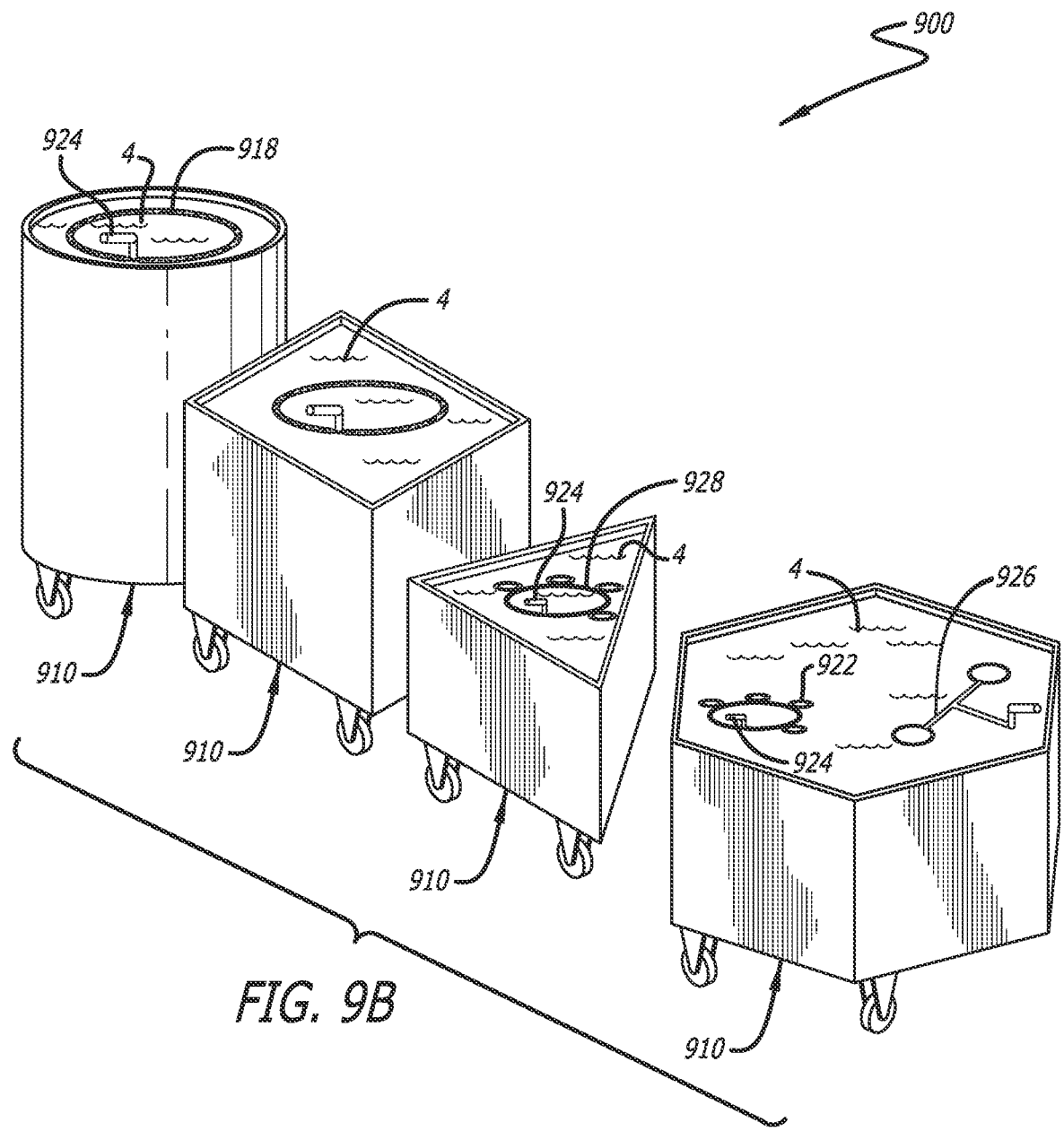

Turning to FIG. 9B, in one aspect, multiple raised pedestals of varying heights and/or shapes are provided at this an exemplary tenth bubble-making station. Pedestal apparatus 910 may be curved, defining a circle or an oval, or any cuboidal shape with square and rectangular shapes being preferred, the cuboidal shape having sharp (right-angled) or curved corners. In some embodiments, pedestal apparatus 910 is circular or oval and can have a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance. In one embodiment, pedestal apparatus 910 is generally cuboidal in shape. In some pedestal apparatus 910 is cuboidal and can have a width of 1 to 4 feet, 2 to 4 feet, 3 to 4 feet, 1 to 3 feet, 2 to 3 feet, or 1 to 2 feet and a length of 1 to 4 feet, 2 to 4 feet, 3 to 4 feet, 1 to 3 feet, 2 to 3 feet, or 1 to 2 feet. The height of support structure 12 can be 1 to 5 feet, 1 to 4 feet, 1 to 3 feet, 2 to 3 feet or 1 to 2 feet.

In addition, basin 919 may be curved, defining a circle or an oval, or any closed polygonal shape, such as, e.g., a triangular shape, a square shape, a rectangular shape, or a pentagonal shape. In some embodiments, basin 919 is circular or oval and can have a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance. In one embodiment, basin 919 is generally polygonal in shape. In some embodiments, basin 919 is polygonal in shape and each length of the polygon can be 1 to 4 feet, 2 to 4 feet, 3 to 4 feet, 1 to 3 feet, 2 to 3 feet, or 1 to 2 feet.

The user or users can then use various custom-made bubble producing tools, here giant bubble wands of various shapes and sizes, by dipping them in and withdrawing them from the bubble solution 4 to make various bubbles.

Exemplary bubble wands that can be utilized at this station include a giant hoop 918. This wand is shaped like a lollipop and can have a handle 924 from two feet to four feet in length, (or any length as desired), with a giant hoop at its distal end of from 18 inches to 36 inches in diameter. Giant hoop 918 makes giant bubbles from two feet to eight feet or more in diameter and can be used by either slowly waving it around, running with it held up or an combination of both. Giant hoop 918 can also be used to surround and substantially enclose a second participant in a bubble resulting therefrom. Giant hoop 918 can be made from flexible PVC pipe bent and wrapped in tape, such as electrical tape (of any desired color, for example, black). In particular configurations, giant hoop includes handle 924 which may also be wrapped in a material, one example being electrical tape. Further, the circle portion of giant hoop 918 can be provided with an absorbent material. In one example athletic tape can be wrapped around circle portion of giant hoop 918 to provide the circular bubble forming portion of giant hoop 918 increased capacity to hold bubble solution 4 as compared to when not being wrapped with absorbent material.

Another exemplary wand utilized at this station is called a Flower Wand 926 and is shaped like the letter "T". It can have a handle from 2 feet to 4 feet in length with two flower hoops on either distal portion of the two top end portions of the "T", as shown in the hexagonal bubble pedestal in FIG. 9B. The head of the wand (top "T" end having the two flower loops) is dipped into the solution. Waving the wand slowly creates larger bubbles, waving the wand quickly crates many smaller bubbles. An additional exemplary wand that can be provided and utilized at this station is a Broom Bubble Wand. This wand is shaped like a sweeper broom, having a long handle from two feet to 4 four feet in length. At one end, there is a terminal hoop that serves as a frame that holds a plurality of small hoops 922 (here in FIG. 9B shown as four smaller hoops, although any number of hoops, such as 8-10 smaller hoops are envisioned). Smaller hoops may be mounted within or around (or a combination thereof)

the larger terminal hoop. Such bubble wands are then dipped into the bubble/soap solution and many medium sized bubbles about 5-6" in length are created simultaneously as the wand is waved through the air or blown upon a plurality of users.

This tenth exemplary bubble-making station includes a system 900 providing station-specific media in a setting to facilitate basic educational science and mathematical principles using, e.g., a STEM curriculum. An attendant/guide can conduct a demonstration or lead a user(s) in an activity designed to exemplified various physical phenomena. After the demonstration the attendant/guide can lead a discussion, optionally referring to bubble-making station specific media for visuals to help explain the various scientific phenomena. Non-limiting examples of station specific media include, e.g., a poster, a handout, a monitor, an interactive monitor, a touch-screen monitor, a water-proof monitor or tablet. Alternatively such information may be provided solely in the form bubble-making station specific media, without the aid of an attendant/guide.

Some general information that may incorporated into any curriculum, e.g., a STEM curriculum, and any station comprising systems 100 through 1000 and may be discussed at any of the plurality of bubble-making stations herein disclosed. General discussions about bubbles that disclose to user(s) that a bubble is just air wrapped in soap film. Soap film is generally made from soap and water (or other liquid). The outside and inside surfaces of a bubble consist of soap molecules. A thin layer of water lies between the two layers of soap molecules, sort of like a water sandwich with soap molecules for bread. They work together to hold air inside. Water molecules are attracted to other water molecules (aka cohesion) and try to stick together as much as they can. Water molecule are attracted to each other so much that they will work really hard to stay together (aka surface tension). To illustrate this point, a penny experiment can be demonstrated. In this experiment, a small pipette is used to slowly and continuously put droplets of water onto the top of a penny. As water drops are added, the water forming on top of the penny will get larger and larger and will eventually form a 'bulb' on top of the penny. This bulb of water stored on the penny will continue to extend out past the penny's circumference because of the surface tension, cohesion, and polar properties of water. The polarity of water molecules can also be discussed in regard to characteristics such as, but not limited to, surface tension, solubility, melting and boiling points.

The floor of the entertainment facility can entirely, or at the particular stations described herein, have an absorbent floor in order to absorb liquid, particularly bubble fluid, to prevent and/or minimize persons from slipping thereon) and composed of transparent material.

Aspects of the present specification can also be described as follows:

1. An entertainment/educational facility comprising one or more bubble-making stations, each of the one or more stations comprising a system, wherein the system present in each of the one or more stations is different than the system present in any of the other of the one or more stations, and wherein the system comprising any one of the following systems, a first system comprising a bubble making apparatus and educational information regarding the scientific principles of bubbles, the bubble making apparatus comprising:

a) a support structure, the support structure including one or more sides, a bottom, a top opening, one or more basins, a trough and a reservoir, wherein the one or more basins each have one or more sides, a bottom and a port, the port positioned at the bottom of the one or more basins, and the one or more basins configured to contain a bubble solution, wherein the trough comprises a trough bottom biased toward the reservoir in a manner that directs the bubble solution falling onto the trough bottom is directed toward the reservoir, and wherein the reservoir is configured to contain a bubble solution, and b) a pumping system, the pumping system including one or more pumps and one or more conduits, wherein the one or more conduits connect at least one pump to the port of each of the one or more basins, and wherein in operation the at least one pump continuously transports the bubble solution contained in the reservoir through the one or more conduits to the port of each of the one or more basins, thereby filling each of the one or more basins with the bubble solution; or a second system comprising a gas producing apparatus and educational information regarding the scientific principles of bubbles, the gas producing apparatus comprising:

a) a base, the base comprising one or more sides, a bottom and a top surface, the top surface having one or more basins, the one or more basins each comprising one or more sides and a bottom, wherein each of the one or more basins is configured to contain a bubble solution, and b) a smoke-like fog generating apparatus, the smoke-like fog generating apparatus comprising i) a body having one or more sides, a bottom, a top opening opposite the bottom, the resulting interior space defining an internal reservoir, ii) a heating element, the heating element abutting the bottom or the one or more sides of the body, and iii) a lid, the lid including one or more ports and one or more hoses, the one or more hoses each comprising a first end and a second end, wherein the first end of each of the one or more hoses is attached to each of the one or more ports, wherein when the lid is closed over the top opening of the body, the internal reservoir, one or more ports and one or more hoses form a continuous fluid paths until reaching the second end of each of the one or more hoses, and wherein each of the one or more basins is configured to receive the second end of each of the one or more hoses, and wherein in operation dry ice and water placed inside internal reservoir sublimates to produce gas that flows from the internal reservoir through the each one or more ports and each of the one or more hoses, thereby expelling the gas from the second end of each of the one or more hoses; or a third system comprising a mobile gas producing apparatus and educational information regarding the scientific principles of bubbles, the mobile gas producing apparatus comprising:

a) a carrier, and b) a mobile smoke-like fog generating apparatus, the mobile smoke-like fog generating apparatus comprising i) a body having one or more sides, a bottom, a top opening opposite the bottom, the resulting interior space defining an internal reservoir, ii) a heating element, the heating element abutting the bottom or the one or more sides of the body, and iii) a lid, the lid including one or more ports and one or more hoses, the one or more hoses each comprising a first end and a second end, wherein the first end of each of the one or more hoses is attached to each of the one or more ports, wherein when the lid is closed over the top opening of the body, the internal reservoir, one or more ports and one or more hoses form a continuous fluid paths until reaching the second end of each of the one or more hoses, wherein in operation dry ice and water placed inside the internal reservoir sublimates to produce gas that flows from the internal reservoir through the each one or more ports and each of the one or more hoses, thereby expelling the gas from the second end of each of the one or more hoses; or a fourth system comprising an inflatable apparatus and educational information regarding the scientific principles of bubbles, the inflatable apparatus comprising:
  a) a first inflated chamber, the first inflated chamber being substantially spherical and curved in shape with a flat bottom,
  b) a second inflated chamber being substantially cuboidal in shape, the second inflated chamber comprising an entrance enabling a user access from outside the apparatus into the second inflated chamber, and
  c) an inflation system, the inflation system including an inflation device and one or more air conduits, wherein the one or more air conduits connect the inflation device to at least the first inflated chamber,
  wherein the first inflated chamber has a contiguous portion with the second inflated chamber, wherein an opening is present in the contiguous portion to create a pathway between the first inflated chamber to the second inflated chamber, and wherein in operation the inflation device expels air through the one or more conduits and into at least the first inflated chamber, thereby inflating the first inflated chamber; or a fifth system comprising a bubble sheet making apparatus and educational information regarding the scientific principles of bubbles, the bubble sheet making apparatus comprising:
  a) a frame system, the frame system including a bottom trough, one or more vertical support members and a top support structure, the bottom trough including one or more sides, a bottom and a top opening opposite the bottom, the resulting interior space defining a reservoir, wherein the bottom trough is configured to contain a bubble solution, wherein the one or more vertical support members span the space between the bottom trough and the top support structure,
  b) a lift system, the lift system including one or more pulleys and one or more lifting cords, each of the one or more lifting cords comprising a first end and a second end, wherein the one or more pulleys are secured to the top support structure of the frame system, and
  c) a bar system, the bar system comprising a top bar, one or more depending cords, and a bottom bar, and each of the one or more depending cords comprising at least a free end and composited of a collapsible material, wherein the top bar comprises a first end, a second end and an absorbent material, and wherein the one or more depending cords is secured to the top bar and the at least a free end of the one or more depending cords is secured to the bottom bar, and
  wherein the first end of each of the one or more lifting cords of the lift system is secured to the top bar, the one or more lifting cords then passed through the one or more pulleys, thereby having the second end of each of the one or more lifting cords on the side of the one or more pulleys opposite the side of the first end of each of the one or more lifting cords, and
  wherein in operation, the bar system submerged in the bubble solution contained in the bottom trough is lifted vertically upward out of the bottom trough using the lift system, thereby forming a bubble sheet using the bubble solution contained within a framework created by the top bar, one or more depending cords and the bottom bar; or a sixth system comprising:
  a) a bubble making apparatus, the bubble making apparatus comprising:
    i) a support structure, the support structure having one or more sides, a bottom and a top, and comprising a power system and a ventilation system, the power system including a power supply to generate electricity and one or more electrical wires, and
    ii) one or more bubble producing systems, each of the one or more bubble producing systems comprising: 1) a motorized bubble producing tool system, the motorized bubble producing tool system including a reservoir, one or more bubble producing tools attached to a central hub and a motor, wherein the central hub is operably linked to the motor, and wherein the reservoir is configured to contain a bubble solution, and 2) an air stream producing system, the air stream producing system comprising a motorized blower and a vent,
    wherein the one or more electrical wires connect the power supply to the motor of the motorized bubble producing tool system and the motorized blower the air stream producing system, and
    wherein in operation the motorized blower continuously expels air in a generally horizontal direction through vent and outward from the front of the bubble making apparatus and the motor of the motorized bubble producing tool system continuously spins the central hub causing each of the one or more bubble producing tools to undergo a rotational cycle through the bubble solution contained in the reservoir and past air stream being expelled through the vent, thereby causing formation of a stream of bubbles,
  b) an activity area, the activity area comprising at least one receptacle including projectiles, and
  c) educational information regarding the scientific principles of bubbles; or a seventh system comprising a bubble tower making apparatus and educational information regarding the scientific principles of bubbles, the bubble tower making apparatus comprising:
  a) a base system, the base system including a platform, a fluid trough and a base surround, the fluid trough configured to contain a bubble solution, wherein the base surround is located along the outside perimeter of the fluid trough and the fluid trough is located along the outside perimeter of the platform,
  b) a support frame system, the support frame system including one or more vertical support members and a top frame, wherein the one or more vertical support members span the space between the base system and the top frame, and c) a lift system, the lift system including one or more lifting pulleys, one or more control pulleys, one or more cables, and a bubble forming device, each of the one or more cables comprising a first end and a second end, wherein the one or more lifting pulleys and one or more control pulleys are secured to the top frame of the support frame system, wherein the bubble forming device conforms to the shape of the fluid trough, and wherein the one or more cables are each secured to the bubble forming device, and wherein the first end of each of the one or more cables of the lift system is secured to the bubble forming device, the one or more cables then passed through the one or more lifting pulleys and one or more controlling pulleys, thereby having the second end of each of the one or more cables on the side of the one or more lifting pulleys and one or more controlling pulleys opposite the side of the first end of each of the one or more cables, and wherein in operation, the bubble forming device submerged in the bubble solution contained in the fluid trough is lifted vertically upward out of the fluid trough using the lift system, thereby forming a bubble tower using the bubble solution contained between the bubble forming device and the bubble solution contained in the fluid trough; or an eighth system comprising a bubble light apparatus and educational information regarding the scientific principles of bubbles, the bubble light apparatus comprising:

a) a support structure, the support structure including one or more sides, a bottom and a top surface, the top surface having one or more basins, the one or more basins including one or more sides and a bottom, the bottom being partially or fully transparent and/or partially or fully translucent, thereby enabling light to transmit therethrough, wherein each of the one or more basins is configured to contain a bubble solution, and b) a lighting system, the lighting system including one or more light sources, at least one power supply to generate electricity, and one or more electrical wires, wherein each of the one or more light sources is located underneath the bottom of each of one or more basins, and wherein the one or more electrical wires connect the at least one power supply to each of the one or more light sources, and wherein in operation, one or more users create one or more bubbles using the bubble solution contained in the one or more basins and light being emitted from the one or more light sources shine through the one or more bubbles; or a ninth system comprising a bubble jet apparatus and educational information regarding the scientific principles of bubbles, the bubble jet apparatus comprising:

a) a support structure, the support structure including one or more sides, a bottom and a top surface, the top surface having one or more basins and one or more vents, the one or more basins including one or more sides and a bottom, wherein each of the one or more basins is configured to contain a bubble solution, and b) an air stream system, the air stream system including at least one motorized blower, one or more ducts, at least one power supply to generate electricity, and one or more electrical wires, wherein the one or more electrical wires connect the at least one power supply to the at least one motorized blower, and wherein the bubble jet apparatus further comprises one or more bubble making tools, and wherein in operation, one or more bubbles are formed when a user positions a bubble making tool containing the bubble solution over one of the one or more vents, thereby causing air being expelled through the one of the one or more vents to pass through the bubble making tool thereby creating the one or more bubbles from the bubble solution contained in the bubble making tool; or a tenth system comprising a bubble pedestal apparatus and educational information regarding the scientific principles of bubbles, the bubble pedestal apparatus comprising:

a) a support structure, the support structure including one or more sides and a top surface, the top surface having one or more lips positioned around the perimeter of the top surface thereby defining a basin, wherein the basin is configured to contain a bubble solution, and b) one or more casters.

wherein the bubble pedestal apparatus further comprises one or more bubble making tools.

2. A system comprising a bubble making apparatus and educational information regarding the scientific principles of bubbles, the bubble making apparatus comprising:

a) a support structure, the support structure including one or more sides, a bottom, a top opening, one or more basins, a trough and a reservoir, wherein the one or more basins each have one or more sides, a bottom and a port, the port positioned at the bottom of the one or more basins, and the one or more basins configured to contain a bubble solution, wherein the trough comprises a trough bottom biased toward the reservoir in a manner that directs the bubble solution falling onto the trough bottom is directed toward the reservoir, and wherein the reservoir is configured to contain a bubble solution, and b) a pumping system, the pumping system including one or more pumps and one or more conduits, wherein the one or more conduits connect at least one pump to the port of each of the one or more basins, and wherein in operation the at least one pump continuously transports the bubble solution contained in the reservoir through the one or more conduits to the port of each of the one or more basins, thereby filling each of the one or more basins with the bubble solution.

3. A system comprising a gas producing apparatus and educational information regarding the scientific principles of bubbles, the gas producing apparatus comprising:

a) a base, the base comprising one or more sides, a bottom and a top surface, the top surface having one or more basins, the one or more basins each comprising one or more sides and a bottom, wherein each of the one or more basins is configured to contain a bubble solution, and b) a smoke-like fog generating apparatus, the smoke-like fog generating apparatus comprising i) a body having one or more sides, a bottom, a top opening opposite the bottom, the resulting interior space defining an internal reservoir, ii) a heating element, the heating element abutting the bottom or the one or more sides of the body, and iii) a lid, the lid including one or more ports and one or more hoses, the one or more hoses each comprising a first end and a second end, wherein the first end of each of the one or more hoses is attached to each of the one or more ports, wherein when the lid is closed over the top opening of the body, the internal reservoir, one or more ports and one or more hoses form a continuous fluid paths until reaching the second end of each of the one or more hoses, and wherein each of the one or more basins is configured to receive the second end of each of the one or more hoses, and wherein in operation dry ice and water placed inside internal reservoir sublimates to produce gas that flows from the internal reservoir through the each one or more ports and each of the one or more hoses, thereby expelling the gas from the second end of each of the one or more hoses.

4. A system comprising a mobile gas producing apparatus and educational information regarding the scientific principles of bubbles, the mobile gas producing apparatus comprising:
   a) a carrier, and
   b) a mobile smoke-like fog generating apparatus, the mobile smoke-like fog generating apparatus comprising i) a body having one or more sides, a bottom, a top opening opposite the bottom, the resulting interior space defining an internal reservoir, ii) a heating element, the heating element abutting the bottom or the one or more sides of the body, and iii) a lid, the lid including one or more ports and one or more hoses, the one or more hoses each comprising a first end and a second end, wherein the first end of each of the one or more hoses is attached to each of the one or more ports, wherein when the lid is closed over the top opening of the body, the internal reservoir, one or more ports and one or more hoses form a continuous fluid paths until reaching the second end of each of the one or more hoses, and wherein in operation dry ice and water placed inside the internal reservoir sublimates to produce gas that flows from the internal reservoir through the each one or more ports and each of the one or more hoses, thereby expelling the gas from the second end of each of the one or more hoses.

5. A system comprising an inflatable apparatus and educational information regarding the scientific principles of bubbles, the inflatable apparatus comprising:
   a) a first inflated chamber, the first inflated chamber being substantially spherical and curved in shape with a flat bottom,
   b) a second inflated chamber being substantially cuboidal in shape, the second inflated chamber comprising an entrance enabling a user access from outside the apparatus into the second inflated chamber, and
   c) an inflation system, the inflation system including an inflation device and one or more air conduits, wherein the one or more air conduits connect the inflation device to at least the first inflated chamber, and
   wherein the first inflated chamber has a contiguous portion with the second inflated chamber, and
   wherein an opening is present in the contiguous portion to create a pathway between the first inflated chamber to the second inflated chamber, and
   wherein in operation the inflation device expels air through the one or more conduits and into at least the first inflated chamber, thereby inflating the first inflated chamber.

6. A system comprising a bubble sheet making apparatus and educational information regarding the scientific principles of bubbles, the bubble sheet making apparatus comprising:
   a) a frame system, the frame system including a bottom trough, one or more vertical support members and a top support structure, the bottom trough including one or more sides, a bottom and a top opening opposite the bottom, the resulting interior space defining a reservoir, wherein the bottom trough is configured to contain a bubble solution, wherein the one or more vertical support members span the space between the bottom trough and the top support structure,
   b) a lift system, the lift system including one or more pulleys and one or more lifting cords, each of the one or more lifting cords comprising a first end and a second end, wherein the one or more pulleys are secured to the top support structure of the frame system, and
   c) a bar system, the bar system comprising a top bar, one or more depending cords, and a bottom bar, and each of the one or more depending cords comprising at least a free end and composited of a collapsible material, wherein the top bar comprises a first end, a second end and an absorbent material, and wherein the one or more depending cords is secured to the top bar and the at least a free end of the one or more depending cords is secured to the bottom bar, and
   wherein the first end of each of the one or more lifting cords of the lift system is secured to the top bar, the one or more lifting cords then passed through the one or more pulleys, thereby having the second end of each of the one or more lifting cords on the side of the one or more pulleys opposite the side of the first end of each of the one or more lifting cords, and
   wherein in operation, the bar system submerged in the bubble solution contained in the bottom trough is lifted vertically upward out of the bottom trough using the lift system, thereby forming a bubble sheet using the bubble solution contained within a framework created by the top bar, one or more depending cords and the bottom bar.

7. A system comprising:
   a) a bubble making apparatus, the bubble making apparatus comprising:
      i) a support structure, the support structure having one or more sides, a bottom and a top, and comprising a power system and a ventilation system, the power system including a power supply to generate electricity and one or more electrical wires, and
      ii) one or more bubble producing systems, each of the one or more bubble producing systems comprising: 1) a motorized bubble producing tool system, the motorized bubble producing tool system including a reservoir, one or more bubble producing tools attached to a central hub and a motor, wherein the central hub is operably linked to the motor, and wherein the reservoir is configured to contain a bubble solution, and 2) an air stream producing system, the air stream producing system comprising a motorized blower and a vent, wherein the one or more electrical wires connect the power supply to the motor of the motorized bubble producing tool system and the motorized blower the air stream producing system, and
   wherein in operation the motorized blower continuously expels air in a generally horizontal direction through vent and outward from the front of the bubble making apparatus and the motor of the motorized bubble producing tool system continuously spins the central hub causing each of the one or more bubble producing tools to undergo a rotational cycle through the bubble solution contained in the reservoir and past air stream being expelled through the vent, thereby causing formation of a stream of bubbles, b) an activity area, the activity area comprising at least one receptacle including projectiles, and c) educational information regarding the scientific principles of bubbles.

8. A system comprising a bubble tower making apparatus and educational information regarding the scientific principles of bubbles, the bubble tower making apparatus comprising:

a) a base system, the base system including a platform, a fluid trough and a base surround, the fluid trough configured to contain a bubble solution, wherein the base surround is located along the outside perimeter of the fluid trough and the fluid trough is located along the outside perimeter of the platform, b) a support frame system, the support frame system including one or more vertical support members and a top frame, wherein the one or more vertical support members span the space between the base system and the top frame, and c) a lift system, the lift system including one or more lifting pulleys, one or more control pulleys, one or more cables, and a bubble forming device, each of the one or more cables comprising a first end and a second end, wherein the one or more lifting pulleys and one or more control pulleys are secured to the top frame of the support frame system, wherein the bubble forming device conforms to the shape of the fluid trough, and wherein the one or more cables are each secured to the bubble forming device, and wherein the first end of each of the one or more cables of the lift system is secured to the bubble forming device, the one or more cables then passed through the one or more lifting pulleys and one or more controlling pulleys, thereby having the second end of each of the one or more cables on the side of the one or more lifting pulleys and one or more controlling pulleys opposite the side of the first end of each of the one or more cables, and wherein in operation, the bubble forming device submerged in the bubble solution contained in the fluid trough is lifted vertically upward out of the fluid trough using the lift system, thereby forming a bubble tower using the bubble solution contained between the bubble forming device and the bubble solution contained in the fluid trough.

9. A system comprising a bubble light apparatus and educational information regarding the scientific principles of bubbles, the bubble light apparatus comprising:

a) a support structure, the support structure including one or more sides, a bottom and a top surface, the top surface having one or more basins, the one or more basins including one or more sides and a bottom, the bottom being partially or fully transparent and/or partially or fully translucent, thereby enabling light to transmit therethrough, wherein each of the one or more basins is configured to contain a bubble solution, and b) a lighting system, the lighting system including one or more light sources, at least one power supply to generate electricity, and one or more electrical wires, wherein each of the one or more light sources is located underneath the bottom of each of one or more basins, wherein the one or more electrical wires connect the at least one power supply to each of the one or more light sources, and wherein in operation, one or more users create one or more bubbles using the bubble solution contained in the one or more basins and light being emitted from the one or more light sources shine through the one or more bubbles.

10. A system comprising a bubble jet apparatus and educational information regarding the scientific principles of bubbles, the bubble jet apparatus comprising:

a) a support structure, the support structure including one or more sides, a bottom and a top surface, the top surface having one or more basins and one or more vents, the one or more basins including one or more sides and a bottom, wherein each of the one or more basins is configured to contain a bubble solution, and b) an air stream system, the air stream system including at least one motorized blower, one or more ducts, at least one power supply to generate electricity, and one or more electrical wires, wherein the one or more electrical wires connect the at least one power supply to the at least one motorized blower, wherein the bubble jet apparatus further comprises one or more bubble making tools, and wherein in operation, one or more bubbles are formed when a user positions a bubble making tool containing the bubble solution over one of the one or more vents, thereby causing air being expelled through the one of the one or more vents to pass through the bubble making tool thereby creating the one or more bubbles from the bubble solution contained in the bubble making tool.

11. A system comprising a bubble pedestal apparatus and educational information regarding the scientific principles of bubbles, the bubble pedestal apparatus comprising:

a) a support structure, the support structure including one or more sides and a top surface, the top surface having one or more lips positioned around the perimeter of the top surface thereby defining a basin, wherein the basin is configured to contain a bubble solution, and b) one or more casters.

wherein the bubble pedestal apparatus further comprises one or more bubble making tools.

12. A bubble making apparatus comprising:

a) a support structure, the support structure including one or more sides, a bottom, a top opening, one or more basins, a trough and a reservoir, wherein the one or more basins each have one or more sides, a bottom and a port, the port positioned at the bottom of the one or more basins, and the one or more basins configured to contain a bubble solution, wherein the trough comprises a trough bottom biased toward the reservoir in a manner that directs the bubble solution falling onto the trough bottom is directed toward the reservoir, and wherein the reservoir is configured to contain a bubble solution, and b) a pumping system, the pumping system including one or more pumps and one or more conduits, wherein the one or more conduits connect at least one pump to the port of each of the one or more basins, and wherein in operation the at least one pump continuously transports the bubble solution contained in the reservoir through the one or more conduits to the port of each of the one or more basins, thereby filling each of the one or more basins with the bubble solution.

13. The bubble making apparatus of embodiment 12, wherein the one or more sides of the support structure define a circular or oval shape.

14. The bubble making apparatus of embodiment 13, wherein the support structure is circular or oval in shape with a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance.

15. The bubble making apparatus of any one of embodiments 12-14, wherein the one or more sides of the support structure define a cuboidal shape with sharp and/or curved corners.

16. The bubble making apparatus of embodiment 15, wherein the support structure is cuboidal in shape with a width of 1 to 4 feet, 2 to 4 feet, 3 to 4 feet, 1 to 3 feet, 2 to 3 feet, or 1 to 2 feet and a length of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet.

17. The bubble making apparatus of any one of embodiments 12-16, wherein the support structure 2 to 5 feet, 2 to 4 feet or 2 to 3 feet in height.

18. The bubble making apparatus of any one of embodiments 12-17, wherein the one or more basins includes 2 to 10 basins, 3 to 9 basins, 4 to 8 basins, 3 to 7 basins, 4 to 7 basins, 5 to 7 basins, 4 to 6 basins, or 5 or 6 basins.

19. The bubble making apparatus of any one of embodiments 12-18, wherein the one or more sides of each of the one or more basins define a circular or oval shape.

20. The bubble making apparatus of any one of embodiments 12-19, wherein the at least one pump of the one or more pumps is located in the reservoir.

21. The bubble making apparatus of any one of embodiments 12-20, wherein the at least one pump of the one or more pumps is located in the trough, the at least one pump further comprising one or more conduits connecting the at least one pump to the reservoir.

22. The bubble making apparatus of any one of embodiments 12-21, further comprising one or more bubble making tools.

23. The bubble making apparatus of any one of embodiments 12-22, wherein in operation, spillage of the bubble solution into the trough directs the bubble solution toward the reservoir where the at least one pump then transports the bubble solution through the one or more conduits to the port of each of the one or more basins, thereby filling each of the one or more basins with the bubble solution.

24. A gas producing apparatus comprising:
a) a base, the base comprising one or more sides, a bottom and a top surface, the top surface having one or more basins, the one or more basins each comprising one or more sides and a bottom, wherein each of the one or more basins is configured to contain a bubble solution, and
b) a smoke-like fog generating apparatus, the smoke-like fog generating apparatus comprising i) a body having one or more sides, a bottom, a top opening opposite the bottom, the resulting interior space defining an internal reservoir, ii) a heating element, the heating element abutting the bottom or the one or more sides of the body, and iii) a lid, the lid including one or more ports and one or more hoses, the one or more hoses each comprising a first end and a second end, wherein the first end of each of the one or more hoses is attached to each of the one or more ports, wherein when the lid is closed over the top opening of the body, the internal reservoir, one or more ports and one or more hoses form a continuous fluid paths until reaching the second end of each of the one or more hoses, and
wherein each of the one or more basins is configured to receive the second end of each of the one or more hoses.

25. The gas producing apparatus of embodiment 24, wherein the one or more sides of the base define a circular or oval shape.

26. The gas producing apparatus of embodiment 25, wherein the base is circular or oval in shape with a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance.

27. The gas producing apparatus of any one of embodiments 24-26, wherein the one or more sides of the base define a cuboidal shape with sharp and/or curved corners.

28. The gas producing apparatus of embodiment 27, wherein the base is cuboidal in shape with a width of 1 to 4 feet, 2 to 4 feet, 3 to 4 feet, 1 to 3 feet, 2 to 3 feet, or 1 to 2 feet and a length of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet.

29. The gas producing apparatus of any one of embodiments 24-28, wherein the base 2 to 5 feet, 2 to 4 feet or 2 to 3 feet in height.

30. The bubble making apparatus of any one of embodiments 24-29, wherein the one or more sides of each of the one or more basins define a circular or oval shape.

31. The gas producing apparatus of any one of embodiments 24-30, wherein the one or more basins includes 2 to 10 basins, 3 to 9 basins, 4 to 8 basins, 3 to 7 basins, 4 to 7 basins, 5 to 7 basins, 4 to 6 basins, or 5 or 6 basins.

32. The gas producing apparatus of any one of embodiments 24-31, wherein the body and/or the lid of the smoke-like fog generating apparatus further comprise an insulating material.

33. The gas producing apparatus of any one of embodiments 24-32, wherein the smoke-like fog generating apparatus further comprises an insulating material.

34. The gas producing apparatus of any one of embodiments 24-33, wherein the one or more sides of the body define a circular or oval shape.

35. The gas producing apparatus of any one of embodiments 24-34, wherein the one or more sides of the body define a cuboidal shape with sharp and/or curved corners.

36. The gas producing apparatus of any one of embodiments 24-35, wherein the number of the one or more ports and the number of the one or more hoses present on the lid corresponds to the number of one of more basins present on top surface of the base.

37. The gas producing apparatus of any one of embodiments 24-36, wherein the one or more ports of the lid include 2 to 10 poets, 3 to 9 ports, 4 to 8 ports, 3 to 7 ports, 4 to 7 ports, 5 to 7 ports, 4 to 6 ports, or 5 or 6 ports.

38. The gas producing apparatus of any one of embodiments 24-37, wherein in operation dry ice and water placed inside internal reservoir sublimates to produce gas that flows from the internal reservoir through the each one or more ports and each of the one or more hoses, thereby expelling the gas from the second end of each of the one or more hoses.

39. A mobile gas producing apparatus comprising:
a) a carrier, and b) a mobile smoke-like fog generating apparatus, the mobile smoke-like fog generating apparatus comprising i) a body having one or more sides, a bottom, a top opening opposite the bottom, the resulting interior space defining an internal reservoir, ii) a heating element, the heating element abutting the bottom or the one or more sides of the body, and iii) a lid, the lid including one or more ports and one or more hoses, the one or more hoses each comprising a first end and a second end, wherein the first end of each of the one or more hoses is attached to each of the one or more ports, wherein when the lid is closed over the top opening of the body, the internal reservoir, one or more ports and one or more hoses form a continuous fluid paths until reaching the second end of each of the one or more hoses, and 40. The mobile gas producing apparatus of embodiment 39, wherein the carrier is a backpack.

41. The mobile gas producing apparatus of embodiment 39 or 40, wherein the body and/or the lid of the mobile smoke-like fog generating apparatus further comprise an insulating material.

42. The mobile gas producing apparatus of any one of embodiments 39-41, wherein the mobile smoke-like fog generating apparatus further comprises an insulating material.

43. The mobile gas producing apparatus of any one of embodiments 39-42, wherein the one or more sides of the body define a circular or oval shape.

44. The mobile gas producing apparatus of any one of embodiments 39-43, wherein the one or more sides of the body define a cuboidal shape with sharp and/or curved corners.

45. The mobile gas producing apparatus of any one of embodiments 39-44, wherein the one or more ports of the mobile smoke-like fog generating apparatus include 2 to 10 ports, 3 to 9 ports, 4 to 8 ports, 3 to 7 ports, 4 to 7 ports, 5 to 7 ports, 4 to 6 ports, or 5 or 6 ports.

46. The mobile gas producing apparatus of any one of embodiments 39-45, wherein in operation dry ice and water placed inside the internal reservoir sublimates to produce gas that flows from the internal reservoir through the each one or more ports and each of the one or more hoses, thereby expelling the gas from the second end of each of the one or more hoses.

47. An inflatable apparatus comprising:
a) a first inflated chamber, the first inflated chamber being substantially spherical and curved in shape with a flat bottom,
b) a second inflated chamber being substantially cuboidal in shape, the second inflated chamber comprising an entrance enabling a user access from outside the apparatus into the second inflated chamber, and
c) an inflation system, the inflation system including an inflation device and one or more air conduits, wherein the one or more air conduits connect the inflation device to at least the first inflated chamber, and
wherein the first inflated chamber has a contiguous portion with the second inflated chamber, and
wherein an opening is present in the contiguous portion to create a pathway between the first inflated chamber to the second inflated chamber.

48. The inflatable apparatus of embodiment 47, wherein the first inflated chamber is 4 to 10 feet in diameter, 6 to 12 feet in diameter, or 8 to 15 feet in diameter.

49. The inflatable apparatus of embodiment 47 or 48, wherein the first inflated chamber further comprises a partition.

50. The inflatable apparatus of any one of embodiments 47-49, wherein the second inflated chamber is 4 to 8 feet in width, 4 to 12 feet in length and 6 to 15 feet in height.

51. The inflatable apparatus of any one of embodiments 47-50, wherein the one or more air conduits further connect the inflation device to the second inflated chamber.

52. The inflatable apparatus of any one of embodiments 47-51, wherein in operation the inflation device expels air through the one or more conduits and into at least the first inflated chamber, thereby inflating the first inflated chamber.

53. The inflatable apparatus of any one of embodiments 47-52, wherein in operation one or more users enter the inflatable apparatus using the entrance of the second inflatable chamber, move through the second inflatable chamber and enter the first inflatable chamber using the opening present in the contiguous portion.

54. A bubble sheet making apparatus comprising:
a) a frame system, the frame system including a bottom trough, one or more vertical support members and a top support structure, the bottom trough including one or more sides, a bottom and a top opening opposite the bottom, the resulting interior space defining a reservoir, wherein the bottom trough is configured to contain a bubble solution, wherein the one or more vertical support members span the space between the bottom trough and the top support structure,
b) a lift system, the lift system including one or more pulleys and one or more lifting cords, each of the one or more lifting cords comprising a first end and a second end, wherein the one or more pulleys are secured to the top support structure of the frame system, and
c) a bar system, the bar system comprising a top bar, one or more depending cords, and a bottom bar, and each of the one or more depending cords comprising at least a free end and composited of a collapsible material, wherein the top bar comprises a first end, a second end and an absorbent material, and wherein the one or more depending cords is secured to the top bar and the at least a free end of the one or more depending cords is secured to the bottom bar, and
wherein the first end of each of the one or more lifting cords of the lift system is secured to the top bar, the one or more lifting cords then passed through the one or more pulleys, thereby having the second end of each of the one or more lifting cords on the side of the one or more pulleys opposite the side of the first end of each of the one or more lifting cords.

55. The bubble sheet making apparatus of embodiment 54, wherein the one or more sides of the bottom trough define a circular or oval shape.

56. The bubble sheet apparatus of embodiment 55, wherein the bottom trough is circular or oval in shape with a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance.

57. The bubble sheet making apparatus of any one of embodiments 54-56, wherein the one or more sides of the bottom trough define a cuboidal shape with sharp and/or curved corners.

58. The bubble sheet apparatus of embodiment 57, wherein the bottom trough is cuboidal in shape with a width of 1 to 4 feet, 2 to 4 feet, 3 to 4 feet, 1 to 3 feet, 2 to 3 feet, or 1 to 2 feet and a length of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet.

59. The bubble sheet making apparatus of any one of embodiments 54-58, wherein the one or more vertical support members are each 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet in height.

60. The bubble sheet making apparatus of any one of embodiments 54-59, wherein the absorbent material and the one or more depending cords are separate and distinct components.

61. The bubble sheet making apparatus of embodiment 60, wherein the one or more depending cords include a first depending cord and a second depending cord, the first and second depending cords each comprising a first end and a second end, wherein the first end of each of the first and second depending cords is secured to the top bar and the second end of each of the first and second depending cords is secured to the bottom bar.

62. The bubble sheet making apparatus of any one of embodiments 54-59, wherein the absorbent material and the one or more depending cords are the same integral component.

63. The bubble sheet making apparatus of embodiment 62, wherein the one or more depending cords include a first depending cord and a second depending cord, the first and second depending cords each comprising a free end, wherein the first free end and the second free end are each secured to the bottom bar.

64. The bubble sheet making apparatus of any one of embodiments 54-63, wherein in operation, the bar system submerged in the bubble solution contained in the bottom trough is lifted vertically upward out of the bottom trough using the lift system, thereby forming a bubble sheet using the bubble solution contained within a framework created by the top bar, one or more depending cords and the bottom bar.

65. A bubble making apparatus comprising
   a) a support structure, the support structure having one or more sides, a bottom and a top, and comprising a power system and a ventilation system, the power system including a power supply to generate electricity and one or more electrical wires, and
   b) one or more bubble producing systems, each of the one or more bubble producing systems comprising:
      i) a motorized bubble producing tool system, the motorized bubble producing tool system including a reservoir, one or more bubble producing tools attached to a central hub and a motor, wherein the central hub is operably linked to the motor, and wherein the reservoir is configured to contain a bubble solution, and
      ii) an air stream producing system, the air stream producing system comprising a motorized blower and a vent,
   wherein the one or more electrical wires connect the power supply to the motor of the motorized bubble producing tool system and the motorized blower the air stream producing system, and
   wherein in operation the motorized blower continuously expels air in a generally horizontal direction through vent and outward from the front of the bubble making apparatus and the motor of the motorized bubble producing tool system continuously spins the central hub causing each of the one or more bubble producing tools to undergo a rotational cycle through the bubble solution contained in the reservoir and past air stream being expelled through the vent, thereby causing formation of a stream of bubbles.

66. The bubble making apparatus of embodiment 65, wherein the one or more sides of the support structure define a circular or oval shape.

67. The bubble making apparatus of embodiment 66, wherein the support structure is circular or oval in shape with a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance.

68. The bubble making apparatus of any one of embodiments 65-67, wherein the one or more sides of the support structure define a cuboidal shape with sharp and/or curved corners.

69. The bubble making apparatus of embodiment 68, wherein the support structure has a width of 1 to 6 feet, 2 to 6 feet, 3 to 6 feet, 4 to 6 feet, 5 to 6 feet, 1 to 5 feet, 2 to 5 feet, 3 to 5 feet, 4 to 5 feet, 1 to 4 feet, 2 to 4 feet, 3 to 4 feet, 1 to 3 feet, 2 to 3 feet, or 1 to 2 feet and a length of 1 to 6 feet, 2 to 6 feet, 3 to 6 feet, 4 to 6 feet, 5 to 6 feet, 1 to 5 feet, 2 to 5 feet, 3 to 5 feet, 4 to 5 feet, 1 to 4 feet, 2 to 4 feet, 3 to 4 feet, 1 to 3 feet, 2 to 3 feet, or 1 to 2 feet, and a height of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet.

70. A bubble tower making apparatus comprising:
   a) a base system, the base system including a platform, a fluid trough and a base surround, the fluid trough configured to contain a bubble solution, wherein the base surround is located along the outside perimeter of the fluid trough and the fluid trough is located along the outside perimeter of the platform,
   b) a support frame system, the support frame system including one or more vertical support members and a top frame, wherein the one or more vertical support members span the space between the base system and the top frame, and
   c) a lift system, the lift system including one or more lifting pulleys, one or more control pulleys, one or more cables, and a bubble forming device, each of the one or more cables comprising a first end and a second end, wherein the one or more lifting pulleys and one or more control pulleys are secured to the top frame of the support frame system, wherein the bubble forming device conforms to the shape of the fluid trough, and wherein the one or more cables are each secured to the bubble forming device, and
   wherein the first end of each of the one or more cables of the lift system is secured to the bubble forming device, the one or more cables then passed through the one or more lifting pulleys and one or more controlling pulleys, thereby having the second end of each of the one or more cables on the side of the one or more lifting pulleys and one or more controlling pulleys opposite the side of the first end of each of the one or more cables.

71. The bubble tower making apparatus of embodiment 70, wherein the base system is a circular or oval shape.

72. The bubble tower making apparatus of embodiment 71, wherein the base system is 1 to 6 feet in diameter and 2 inches to 12 inches in height, 2 to 5 in diameter and 3 inches to 10 inches in height, or 2 to 4 feet in in diameter and 4 inches to 8 inches in height.

73. The bubble tower making apparatus of any one of embodiments 70-72, wherein the platform is a circular or oval shape.

74. The bubble tower making apparatus of embodiment 73, wherein the platform is 1 to 6 feet in diameter and 2 inches to 12 inches in height, 2 to 5 in diameter and 3 inches to 10 inches in height, or 2 to 4 feet in in diameter and 4 inches to 8 inches in height.

75. The bubble tower making apparatus of any one of embodiments 70-74, wherein the fluid trough is a circular or oval shape.

76. The bubble tower making apparatus of embodiment 75, wherein the fluid trough is 1 to 6 feet in diameter and 2 inches to 12 inches in height, 2 to 5 in diameter and 3 inches to 10 inches in height, or 2 to 4 feet in in diameter and 4 inches to 8 inches in height.

77. The bubble tower making apparatus of any one of embodiments 70-76, wherein the base system is a cuboidal shape with sharp and/or curved corners.

78. The bubble tower making apparatus of embodiment 77, wherein the base system is 2 to 10 feet in width, 2 to 10 feet in length and 2 inches to 12 inches in height, 3 to 9 feet in width, 3 to 9 feet in length and 3 inches to 10 inches in height, or 4 to 8 feet in width, 4 to 8 feet in length and 4 inches to 8 inches in height.

79. The bubble tower making apparatus of any one of embodiments 70-78, wherein the platform is a cuboidal shape with sharp and/or curved corners.

80. The bubble tower making apparatus of embodiment 79, wherein the platform is 2 to 10 feet in width, 2 to 10 feet in length and 2 inches to 12 inches in height, 3 to 9 feet in width, 3 to 9 feet in length and 3 inches to 10 inches in height, or 4 to 8 feet in width, 4 to 8 feet in length and 4 inches to 8 inches in height.

81. The bubble tower making apparatus of any one of embodiments 70-80, wherein the fluid trough is a cuboidal shape with sharp and/or curved corners.

82. The bubble tower making apparatus of embodiment 81, wherein the fluid trough is 2 to 10 feet in width, 2 to 10 feet in length and 2 inches to 12 inches in height, 3 to 9 feet in width, 3 to 9 feet in length and 3 inches to 10 inches in height, or 4 to 8 feet in width, 4 to 8 feet in length and 4 inches to 8 inches in height.

83. The bubble tower making apparatus of any one of embodiments 70-82, wherein the one or more vertical support members are each 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet in height.

84. The bubble tower making apparatus of any one of embodiments 70-83, wherein the bubble forming device is a circular or oval shape.

85. The bubble tower making apparatus of any one of embodiments 70-83, wherein the bubble forming device is a cuboidal shape with sharp and/or curved corners.

86. The bubble tower making apparatus of any one of embodiments 70-85, further comprising a lighting system including lights.

87. The bubble tower making apparatus of any one of embodiments 70-86, wherein in operation, the bubble forming device submerged in the bubble solution contained in the fluid trough is lifted vertically upward out of the fluid trough using the lift system, thereby forming a bubble tower using the bubble solution contained between the bubble forming device and the bubble solution contained in the fluid trough.

88. A bubble light apparatus comprising:
   a) a support structure, the support structure including one or more sides, a bottom and a top surface, the top surface having one or more basins, the one or more basins including one or more sides and a bottom, the bottom being partially or fully transparent and/or partially or fully translucent, thereby enabling light to transmit therethrough, wherein each of the one or more basins is configured to contain a bubble solution, and
   b) a lighting system, the lighting system including one or more light sources, at least one power supply to generate electricity, and one or more electrical wires, wherein each of the one or more light sources is located underneath the bottom of each of one or more basins, and wherein the one or more electrical wires connect the at least one power supply to each of the one or more light sources.

89. The bubble light apparatus of embodiment 88, wherein the one or more sides of the support structure define a circular or oval shape.

90. The bubble light apparatus of embodiment 89, wherein the support structure is circular or oval in shape with a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance.

91. The bubble light apparatus of any one of embodiments 88-90, wherein the one or more sides of the support structure define a cuboidal shape with sharp and/or curved corners.

92. The bubble light apparatus of embodiment 91, wherein the support structure is cuboidal in shape with a width of 1 to 4 feet, 2 to 4 feet, 3 to 4 feet, 1 to 3 feet, 2 to 3 feet, or 1 to 2 feet and a length of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet.

93. The bubble making apparatus of any one of embodiments 88-92, wherein the one or more basins includes 2 to 10 basins, 3 to 9 basins, 4 to 8 basins, 3 to 7 basins, 4 to 7 basins, 5 to 7 basins, 4 to 6 basins, or 5 or 6 basins.

94. The bubble light apparatus of any one of embodiments 88-93, wherein the one or more sides of each of the one or more basins define a circular or oval shape.

95. The bubble light apparatus of any one of embodiments 88-94, wherein the one or more light sources emit white light.

96. The bubble light apparatus of any one of embodiments 88-95, wherein the one or more light sources emit colored light.

97. The bubble light apparatus of any one of embodiments 88-96, wherein the top surface further comprises a lip, the lip located around the perimeter of the top surface thereby forming a top surface reservoir configured to contain a bubble solution.

98. The bubble light apparatus of any one of embodiments 88-97, further comprising one or more bubble making tools.

99. The bubble light apparatus of any one of embodiments 88-98, wherein in operation, one or more users create one or more bubbles using the bubble solution contained in the one or more basins and light being emitted from the one or more light sources shine through the one or more bubbles.

100. A bubble jet apparatus comprising:
   a) a support structure, the support structure including one or more sides, a bottom and a top surface, the top surface having one or more basins and one or more vents, the one or more basins including one or more sides and a bottom, wherein each of the one or more basins is configured to contain a bubble solution, and
   b) an air stream system, the air stream system including at least one motorized blower, one or more ducts, at least one power supply to generate electricity, and one or more electrical wires, wherein the one or more electrical wires connect the at least one power supply to the at least one motorized blower, wherein the bubble jet apparatus further comprises one or more bubble making tools.

101. The bubble jet apparatus of embodiment 100, wherein the one or more sides of the support structure define a circular or oval shape.

102. The bubble jet apparatus of embodiment 101, wherein the support structure is circular or oval in shape with a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance.

103. The bubble jet apparatus of any one of embodiments 100-102, wherein the one or more sides of the support structure define a cuboidal shape with sharp and/or curved corners.

104. The bubble jet apparatus of embodiment 103, wherein the support structure is cuboidal in shape with a width of 1 to 4 feet, 2 to 4 feet, 3 to 4 feet, 1 to 3 feet, 2 to 3 feet, or 1 to 2 feet and a length of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet.

105. The bubble jet apparatus of any one of embodiments 100-104, wherein the support structure 2 to 5 feet, 2 to 4 feet or 2 to 3 feet in height.

106. The bubble jet apparatus of any one of embodiments 100-105, wherein the one or more basins includes 2 to 10 basins, 3 to 9 basins, 4 to 8 basins, 3 to 7 basins, 4 to 7 basins, 5 to 7 basins, 4 to 6 basins, or 5 or 6 basins.

107. The bubble jet apparatus of any one of embodiments 100-106, wherein the one or more sides of each of the one or more basins define a circular or oval shape.

108. The bubble jet apparatus of any one of embodiments 100-107, wherein the support structure further includes an internal space, and each of the one or more ducts is formed from the internal space.

109. The bubble jet apparatus of embodiment any one of embodiments 100-108, wherein the internal space further comprises one or more baffles, the one or more baffles positioned in a manner to direct air flow upward through each of the one or more vents.

110. The bubble jet apparatus of any one of embodiments 100-107, wherein the one or more ducts is formed from one or more dedicated ventilation conduits, the one or more dedicated ventilation conduits connecting at least one motorized blower to each of the one or more vents.

111. The bubble jet apparatus of any one of embodiments 100-110, wherein in operation, one or more bubbles are formed when a user positions a bubble making tool containing the bubble solution over one of the one or more vents, thereby causing air being expelled through the one of the one or more vents to pass through the bubble making tool thereby creating the one or more bubbles from the bubble solution contained in the bubble making tool.

112. A bubble pedestal apparatus comprising:
a) a support structure, the support structure including one or more sides and a top surface, the top surface having one or more lips positioned around the perimeter of the top surface thereby defining a basin, wherein the basin is configured to contain a bubble solution, and
b) one or more casters.

wherein the bubble pedestal apparatus further comprises one or more bubble making tools.

113. The bubble pedestal apparatus of embodiment 112, wherein the one or more sides of the support structure define a circular or oval shape.

114. The bubble pedestal apparatus of embodiment 113, wherein the support structure is circular or oval in shape with a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance.

115. The bubble pedestal apparatus of any one of embodiments 112-114, wherein the one or more sides of the support structure define a cuboidal shape with sharp and/or curved corners.

116. The bubble pedestal apparatus of embodiment 115, wherein the support structure is cuboidal in shape with a width of 1 to 4 feet, 2 to 4 feet, 3 to 4 feet, 1 to 3 feet, 2 to 3 feet, or 1 to 2 feet and a length of 1 to 4 feet, 2 to 4 feet, 3 to 4 feet, 1 to 3 feet, 2 to 3 feet, or 1 to 2 feet.

117. The bubble pedestal apparatus of any one of embodiments 112-116, wherein the basin is triangular shape, a square shape, a rectangular shape or a pentagonal shape.

118. The bubble pedestal apparatus of any one of embodiments 112-117, wherein the support structure has a height of 1 to 5 feet, 1 to 4 feet, 1 to 3 feet, 2 to 3 feet or 1 to 2 feet.

119. An entertainment/educational facility comprising one or more bubble-making stations, each of the one or more stations comprising a system, the system comprising any one of embodiments 2-11, wherein the system present in each of the one or more stations is different than the system present in any of the other of the one or more stations comprising the entertainment/educational facility.

120. The entertainment/educational facility of embodiment 119, wherein the one or more stations include a first station comprising a first system and a second station comprising a second system, the first and second systems comprising any one of embodiments 2-11.

121. The entertainment/educational facility of embodiment 120, wherein the one or more stations further includes a third station comprising a third system, the third system comprising any one of embodiments 2-11.

122. The entertainment/educational facility of embodiment 121, wherein the one or more stations further includes a fourth station comprising a fourth system, the fourth system comprising any one of embodiments 2-11.

123. The entertainment/educational facility of embodiment 122, wherein the one or more stations further includes a fifth station comprising a fifth system, the fifth system comprising any one of embodiments 2-11.

124. The entertainment/educational facility of embodiment 123, wherein the one or more stations further includes a sixth station comprising a sixth system, the sixth system comprising any one of embodiments 2-11.

125. The entertainment/educational facility of embodiment 124, wherein the one or more stations further includes a seventh station comprising a seventh system, the seventh system comprising any one of embodiments 2-11.

126. The entertainment/educational facility of embodiment 125, wherein the one or more stations further includes an eighth station comprising a eighth system, the eighth system comprising any one of embodiments 2-11.

127. The entertainment/educational facility of embodiment 126, wherein the one or more stations further includes a ninth station comprising a ninth system, the ninth system comprising any one of embodiments 2-11.

128. The entertainment/educational facility of embodiment 127, wherein the one or more stations further includes a tenth station comprising a tenth system, the tenth system comprising any one of embodiments 2-11.

129. An entertainment/educational facility comprising one or more bubble-making stations, each of the one or more stations comprising a system, wherein the system present in each of the one or more stations is different than the system present in any of the other of the one or more stations comprising the entertainment/educational facility, and wherein the system comprises any one of the following systems,
- a first system comprising educational information regarding the scientific principles of bubbles and a bubble making apparatus according to any one of embodiments 12-23,
- a second system comprising educational information regarding the scientific principles of bubbles and a gas producing apparatus according to any one of embodiments 24-38,
- a third system comprising educational information regarding the scientific principles of bubbles and a mobile gas producing apparatus according to any one of embodiments 39-46,
- a fourth system comprising educational information regarding the scientific principles of bubbles and an inflatable apparatus according to any one of embodiments 47-53,
- a fifth system comprising educational information regarding the scientific principles of bubbles and a bubble sheet making apparatus according to any one of embodiments 54-64,
- a sixth system comprising educational information regarding the scientific principles of bubbles, an activity area comprising at least one receptacle including projectiles, and a bubble making apparatus according to any one of embodiments 65-69,
- a seventh system comprising educational information regarding the scientific principles of bubbles and a bubble tower making apparatus according to any one of embodiments 70-87,
- an eighth system comprising educational information regarding the scientific principles of bubbles and a bubble light apparatus according to any one of embodiments 88-99,
- a ninth system comprising educational information regarding the scientific principles of bubbles and a bubble jet apparatus according to any one of embodiments 100-111, or
- a tenth system comprising educational information regarding the scientific principles of bubbles and a bubble pedestal apparatus according to any one of embodiments 112-118.

129. The entertainment/educational facility of embodiment 128, wherein the one or more stations include a first station comprising a system selected from any one of the first system, the second system, the third system, the fourth system, the fifth system, the sixth system, the seventh system, the eighth system, the ninth system or the tenth system, and a second station comprising a system selected from any one of the first system, the second system, the third system, the fourth system, the fifth system, the sixth system, the seventh system, the eighth system, the ninth system or the tenth system, wherein the system of the first station is different from the system of the second station.

130. The entertainment/educational facility of embodiment 129, wherein the one or more stations include a third station comprising a system selected from any one of the first system, the second system, the third system, the fourth system, the fifth system, the sixth system, the seventh system, the eighth system, the ninth system or the tenth system, wherein the system of the third station is different from the system of the first and second stations.

131. The entertainment/educational facility of embodiment 130, wherein the one or more stations include a fourth station comprising a system selected from any one of the first system, the second system, the third system, the fourth system, the fifth system, the sixth system, the seventh system, the eighth system, the ninth system or the tenth system, wherein the system of the fourth station is different from the system of the first, second and third stations.

132. The entertainment/educational facility of embodiment 131, wherein the one or more stations include a fifth station comprising a system selected from any one of the first system, the second system, the third system, the fourth system, the fifth system, the sixth system, the seventh system, the eighth system, the ninth system or the tenth system, wherein the system of the fifth station is different from the system of the first, second, third and fourth stations.

133. The entertainment/educational facility of embodiment 132, wherein the one or more stations include a sixth station comprising a system selected from any one of the first system, the second system, the third system, the fourth system, the fifth system, the sixth system, the seventh system, the eighth system, the ninth system or the tenth system, wherein the system of the sixth station is different from the system of the first, second, third, fourth and fifth stations.

134. The entertainment/educational facility of embodiment 133, wherein the one or more stations include a seventh station comprising a system selected from any one of the first system, the second system, the third system, the fourth system, the fifth system, the sixth system, the seventh system, the eighth system, the ninth system or the tenth system, wherein the system of the seventh station is different from the system of the first, second, third, fourth, fifth and sixth stations.

135. The entertainment/educational facility of embodiment 134, wherein the one or more stations include an eighth station comprising a system selected from any one of the first system, the second system, the third system, the fourth system, the fifth system, the sixth system, the seventh system, the eighth system, the ninth system or the tenth system, wherein the system of the eighth station is different from the system of the first, second, third, fourth, fifth, sixth and seventh stations.

136. The entertainment/educational facility of embodiment 135, wherein the one or more stations include a ninth station comprising a system selected from any one of the first system, the second system, the third system, the fourth system, the fifth system, the sixth system, the ninth system, the eighth system, the ninth system or the tenth system, wherein the system of the eighth station is different from the system of the first, second, third, fourth, fifth, sixth, seventh and eighth stations.

137. The entertainment/educational facility of embodiment 136, wherein the one or more stations include a tenth station comprising a system selected from any one of the first system, the second system, the third system, the fourth system, the fifth system, the sixth system, the ninth system, the eighth system, the ninth system or the tenth system, wherein the system of the tenth station is different from the system of the first, second, third, fourth, fifth, sixth, seventh, eighth and ninth stations.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular, article, apparatus, methodology, or materials or methods described herein, unless expressly stated as such. In addition, those of ordinary skill in the art will recognize that certain changes, modifications, permutations, alterations, additions, subtractions and sub-combinations thereof can be made in accordance with the teachings herein disclosed without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein. Of course, variations on these described embodiments will become apparent to those of ordinary skill in the art upon reading the foregoing disclosures and teachings. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (and equivalent open-ended transitional phrases thereof like including, containing and having) encompasses all the expressly recited elements, limitations, steps and/or features alone or in combination with unrecited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amended for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as basin as any optional, additional unspecified ones. The meaning of the closed-ended transitional phrase "consisting of" is being defined as only including those elements, limitations, steps and/or features specifically recited in the claim whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present disclosure.

Lastly, the terminology used herein is for the purpose of describing particular embodiments only and is not intended to limit the scope of the present invention, which is defined solely by the claims. Accordingly, the present invention is not limited to that precisely as shown and described.

The invention claimed is:

1. An entertainment/educational facility comprising one or more bubble-making stations, each of the one or more stations comprising a system, wherein the system present in each of the one or more stations is different than the system present in any of the other of the one or more stations, and wherein the one or more stations comprise
   a first system comprising a bubble making apparatus and educational information regarding the scientific principles of bubbles, the bubble making apparatus comprising:
     a) a support structure, the support structure including one or more sides, a bottom, a top opening, one or more basins, a trough and a reservoir,
       wherein the one or more basins each have one or more sides, a bottom and a port, the port positioned at the bottom of the one or more basins, and the one or more basins configured to contain a bubble solution,
       wherein the trough comprises a trough bottom biased toward the reservoir in a manner that directs the bubble solution falling onto the trough bottom towards the reservoir, and
     wherein the reservoir is configured to contain a bubble solution, and
     b) a pumping system, the pumping system including one or more pumps and one or more conduits,
       wherein the one or more conduits connect at least one pump to the port of each of the one or more basins, and
       wherein in operation the at least one pump continuously transports the bubble solution contained in the reservoir through the one or more conduits to the port of each of the one or more basins, thereby filling each of the one or more basins with the bubble solution; and
   any one or more of the following systems,
   a second system comprising a gas producing apparatus and educational information regarding the scientific principles of bubbles, the gas producing apparatus comprising:
     a) a base, the base comprising one or more sides, a bottom and a top surface, the top surface having one or more basins, the one or more basins each comprising one or more sides and a bottom, wherein each of the one or more basins is configured to contain a bubble solution, and
     b) a smoke-like fog generating apparatus, the smoke-like fog generating apparatus comprising
       i) a body having one or more sides, a bottom, a top opening opposite the bottom, the resulting interior space defining an internal reservoir,
       ii) a heating element, the heating element abutting the bottom or the one or more sides of the body, and
       iii) a lid, the lid including one or more ports and one or more hoses, the one or more hoses each comprising a first end and a second end, wherein the first end of each of the one or more hoses is attached to each of the one or more ports,
         wherein when the lid is closed over the top opening of the body, the internal reservoir, one or more ports and one or more hoses form a continuous fluid path until reaching the second end of each of the one or more hoses, and
     wherein each of the one or more basins is configured to receive the second end of each of the one or more hoses, and
     wherein in operation dry ice and water placed inside internal reservoir sublimates to produce gas that flows from the internal reservoir through the each one or more ports and each of the one or more hoses, thereby expelling the gas from the second end of each of the one or more hoses; or
   a third system comprising a mobile gas producing apparatus and educational information regarding the scientific principles of bubbles, the mobile gas producing apparatus comprising:
     a) a carrier, and
     b) a mobile smoke-like fog generating apparatus, the mobile smoke-like fog generating apparatus comprising
       i) a body having one or more sides, a bottom, a top opening opposite the bottom, the resulting interior space defining an internal reservoir,
       ii) a heating element, the heating element abutting the bottom or the one or more sides of the body, and
       iii) a lid, the lid including one or more ports and one or more hoses, the one or more hoses each comprising a first end and a second end, wherein the first end of each of the one or more hoses is attached to each of the one or more ports,
         wherein when the lid is closed over the top opening of the body, the internal reservoir, one or more ports and one or more hoses form a continuous fluid path until reaching the second end of each of the one or more hoses,
       wherein each of the one or more basins is configured to receive the second end of each of the one or more hoses, and
       wherein in operation dry ice and water placed inside the internal reservoir sublimates to produce gas that flows from the internal reservoir through the each one or more ports and each of the one or more hoses, thereby expelling the gas from the second end of each of the one or more hoses; or a fourth system comprising an inflatable apparatus and educational information regarding the scientific principles of bubbles, the inflatable apparatus comprising:
a) a first inflated chamber, the first inflated chamber being substantially spherical and curved in shape with a flat bottom,
b) a second inflated chamber being substantially cuboidal in shape, the second inflated chamber comprising an entrance enabling a user access from outside the apparatus into the second inflated chamber, and
c) an inflation system, the inflation system including an inflation device and one or more air conduits,
wherein the first inflated chamber has a contiguous portion with the second inflated chamber, and
wherein an opening is present in the contiguous portion to create a pathway between the first inflated chamber to the second inflated chamber,
wherein the one or more air conduits connect the inflation device to at least the first inflated chamber, and
wherein in operation the inflation device expels air through the one or more conduits and into at least the first inflated chamber, thereby inflating the first inflated chamber; or a fifth system comprising a bubble sheet making apparatus and educational information regarding the scientific principles of bubbles, the bubble sheet making apparatus comprising:
a) a frame system, the frame system including a bottom trough, one or more vertical support members and a top support structure, the bottom trough including one or more sides, a bottom and a top opening opposite the bottom, the resulting interior space defining a reservoir, wherein the bottom trough is configured to contain a bubble solution,
wherein the one or more vertical support members span the space between the bottom trough and the top support structure,
b) a lift system, the lift system including one or more pulleys and one or more lifting cords, each of the one or more lifting cords comprising a first end and a second end,
wherein the one or more pulleys are secured to the top support structure of the frame system, and
c) a bar system, the bar system comprising a top bar, one or more depending cords, and a bottom bar, and each of the one or more depending cords comprising at least a free end and composited of a collapsible material,
wherein the top bar comprises a first end, a second end and an absorbent material, and
wherein the one or more depending cords is secured to the top bar and the at least a free end of the one or more depending cords is secured to the bottom bar, and
wherein the first end of each of the one or more lifting cords of the lift system is secured to the top bar, the one or more lifting cords then passed through the one or more pulleys, thereby having the second end of each of the one or more lifting cords on the side of the one or more pulleys opposite the side of the first end of each of the one or more lifting cords, and
wherein in operation, the bar system submerged in the bubble solution contained in the bottom trough is lifted vertically upward out of the bottom trough using the lift system, thereby forming a bubble sheet using the bubble solution contained within a framework created by the top bar, one or more depending cords and the bottom bar; or a sixth system comprising:
a) a bubble making apparatus, the bubble making apparatus comprising
i) a support structure, the support structure having one or more sides, a bottom and a top, and comprising a power system and a ventilation system, the power system including a power supply to generate electricity and one or more electrical wires, and
ii) one or more bubble producing systems, each of the one or more bubble producing systems comprising:
1) A motorized bubble producing tool system, the motorized bubble producing tool system including a reservoir, one or more bubble producing tools attached to a central hub and a motor,
wherein the central hub is operably linked to the motor, and
wherein the reservoir is configured to contain a bubble solution, and
2) an air stream producing system, the air stream producing system comprising a motorized blower and a vent,
wherein the one or more electrical wires connect the power supply to the motor of the motorized bubble producing tool system and the motorized blower the air stream producing system, and
wherein in operation the motorized blower continuously expels air in a generally horizontal direction through vent and outward from the front of the bubble making apparatus and the motor of the motorized bubble producing tool system continuously spins the central hub causing each of the one or more bubble producing tools to undergo a rotational cycle through the bubble solution contained in the reservoir and past air stream being expelled through the vent, thereby causing formation of a stream of bubbles, and
b) an activity area, the activity area comprising at least one receptacle including projectiles, and
c) educational information regarding the scientific principles of bubbles; or a seventh system comprising a bubble tower making apparatus and educational information regarding the scientific principles of bubbles, the bubble tower making apparatus comprising:
a) a base system, the base system including a platform, a fluid trough and a base surround, the fluid trough configured to contain a bubble solution,
wherein the base surround is located along the outside perimeter of the fluid trough and the fluid trough is located along the outside perimeter of the platform,
b) a support frame system, the support frame system including one or more vertical support members and a top frame,
wherein the one or more vertical support members span the space between the base system and the top frame, and c) a lift system, the lift system including one or more lifting pulleys, one or more control pulleys, one or more cables, and a bubble forming device, each of the one or more cables comprising a first end and a second end, wherein the one or more lifting pulleys and one or more control pulleys are secured to the top frame of the support frame system, wherein the bubble forming device conforms to the shape of the fluid trough, and wherein the one or more cables are each secured to the bubble forming device, and wherein the first end of each of the one or more cables of the lift system is secured to the bubble forming device, the one or more cables then passed through the one or more lifting pulleys and one or more controlling pulleys, thereby having the second end of each of the one or more cables on the side of the one or more lifting pulleys and one or more controlling pulleys opposite the side of the first end of each of the one or more cables, and wherein in operation, the bubble forming device submerged in the bubble solution contained in the fluid trough is lifted vertically upward out of the fluid trough using the lift system, thereby forming a bubble tower using the bubble solution contained between the bubble forming device and the bubble solution contained in the fluid trough; or an eighth system comprising a bubble light apparatus and educational information regarding the scientific principles of bubbles, the bubble light apparatus comprising:

a) a support structure, the support structure including one or more sides, a bottom and a top surface, the top surface having one or more basins, the one or more basins including one or more sides and a bottom, the bottom being partially or fully transparent and/or partially or fully translucent, thereby enabling light to transmit therethrough, wherein each of the one or more basins is configured to contain a bubble solution, and b) a lighting system, the lighting system including one or more light sources, at least one power supply to generate electricity, and one or more electrical wires, wherein each of the one or more light sources is located underneath the bottom of each of one or more basins, and wherein the one or more electrical wires connect the at least one power supply to each of the one or more light sources, and wherein in operation, one or more users create one or more bubbles using the bubble solution contained in the one or more basins and light being emitted from the one or more light sources shine through the one or more bubbles; or a ninth system comprising a bubble jet apparatus and educational information regarding the scientific principles of bubbles, the bubble jet apparatus comprising:

a) a support structure, the support structure including one or more sides, a bottom and a top surface, the top surface having one or more basins and one or more vents, the one or more basins including one or more sides and a bottom, wherein each of the one or more basins is configured to contain a bubble solution, and b) an air stream system, the air stream system including at least one motorized blower, one or more ducts, at least one power supply to generate electricity, and one or more electrical wires, wherein the one or more electrical wires connect the at least one power supply to the at least one motorized blower, and wherein the bubble jet apparatus further comprises one or more bubble making tools, and wherein in operation, one or more bubbles are formed when a user positions a bubble making tool containing the bubble solution over one of the one or more vents, thereby causing air being expelled through the one of the one or more vents to pass through the bubble making tool thereby creating the one or more bubbles from the bubble solution contained in the bubble making tool; or a tenth system comprising a bubble pedestal apparatus and educational information regarding the scientific principles of bubbles, the bubble pedestal apparatus comprising:

a) a support structure, the support structure including one or more sides and a top surface, the top surface having one or more lips positioned around the perimeter of the top surface thereby defining a basin, wherein the basin is configured to contain a bubble solution, and b) one or more casters, wherein the bubble pedestal apparatus further comprises one or more bubble making tools.

2. A system comprising a bubble making apparatus and educational information regarding the scientific principles of bubbles, the bubble making apparatus comprising:

a) a support structure, the support structure including one or more sides, a bottom, a top opening, one or more basins, a trough and a reservoir, wherein the one or more basins each have one or more sides, a bottom and a port, the port positioned at the bottom of the one or more basins, and the one or more basins configured to contain a bubble solution, wherein the trough comprises a trough bottom biased toward the reservoir in a manner that directs the bubble solution falling onto the trough bottom towards the reservoir, and wherein the reservoir is configured to contain a bubble solution, and b) a pumping system, the pumping system including one or more pumps and one or more conduits, wherein the one or more conduits connect at least one pump to the port of each of the one or more basins, and wherein in operation the at least one pump continuously transports the bubble solution contained in the reservoir through the one or more conduits to the port of each of the one or more basins, thereby filling each of the one or more basins with the bubble solution.

3. A bubble making apparatus comprising:

a) a support structure, the support structure including one or more sides, a bottom, a top opening, one or more basins, a trough and a reservoir, wherein the one or more basins each have one or more sides, a bottom and a port, the port positioned at the bottom of the one or more basins, and the one or more basins configured to contain a bubble solution, wherein the trough comprises a trough bottom biased toward the reservoir in a manner that directs the bubble solution falling onto the trough bottom towards the reservoir, and wherein the reservoir is configured to contain a bubble solution, and b) a pumping system, the pumping system including one or more pumps and one or more conduits, wherein the one or more conduits connect at least one pump to the port of each of the one or more basins, and wherein in operation the at least one pump continuously transports the bubble solution contained in the reservoir through the one or more conduits to the port of each of the one or more basins, thereby filling each of the one or more basins with the bubble solution.

4. The bubble making apparatus of claim 3, wherein the one or more sides of the support structure define a circular or oval shape.

5. The bubble making apparatus of claim 4, wherein the support structure is circular or oval in shape with a cross-sectional radius of 1 to 6 feet, 1 to 5 feet, 1 to 4 feet, 1 to 3 feet, 2 to 6 feet, 2 to 5 feet, 2 to 4 feet, 2 to 3 feet, 3 to 6 feet, 3 to 5 feet, or 3 to 4 feet at its shortest distance.

6. The bubble making apparatus of claim 3, wherein the one or more sides of the support structure define a cuboidal shape with sharp and/or curved corners.

7. The bubble making apparatus of claim 6, wherein the support structure is cuboidal in shape with a width of 1 to 4 feet, 2 to 4 feet, 3 to 4 feet, 1 to 3 feet, 2 to 3 feet, or 1 to 2 feet and a length of 4 to 15 feet, 4 to 12 feet, 4 to 10 feet, 4 to 8 feet, 4 to 6 feet, 6 to 15 feet, 6 to 12 feet, 6 to 10 feet, 6 to 8 feet, 8 to 15 feet, 8 to 12 feet or 8 to 10 feet.

8. The bubble making apparatus of claim 3, wherein the support structure is 1 to 5 feet, 1 to 4 feet, 1 to 3 feet, 2 to 3 feet or 1 to 2 feet in height.

9. The bubble making apparatus of claim 3, wherein the one or more sides of the support structure define a closed polygonal shape.

10. The bubble making apparatus of claim 3, wherein the closed polygonal shape is a triangle or pentagon.

11. The bubble making apparatus of claim 3, wherein the one or more sides of each of the one or more basins define a circular or oval shape.

12. The bubble making apparatus of claim 3, wherein the one or more basins is one basin.

13. The bubble making apparatus of claim 3, wherein the one or more basins includes 2 to 10 basins, 3 to 9 basins, 4 to 8 basins, 3 to 7 basins, 4 to 7 basins, 5 to 7 basins, 4 to 6 basins, or 5 or 6 basins.

14. The bubble making apparatus of claim 3, wherein the one or more sides of each of the one or more basins is about 1 inch to 5 inches, about 2 to 4 inches, or about 3 inches in height.

15. The bubble making apparatus of claim 3, wherein the one or more basins is supported over a top opening of the trough by support arms spanning the top opening.

16. The bubble making apparatus of claim 3, wherein the one or more basins is positioned over a top opening of the trough by support posts arising from the bottom of the trough.

17. The bubble making apparatus of claim 3, further comprising one or more bubble producing tools.

18. The bubble making apparatus of claim 3, wherein the bubble making apparatus is portable.

19. An entertainment/educational facility comprising one or more bubble-making stations, each of the one or more stations comprising a system, wherein the system present in each of the one or more stations is different than the system present in any of the other of the one or more stations, and wherein the system comprises, a first system comprising a bubble making apparatus and educational information regarding the scientific principles of bubbles, the bubble making apparatus comprising:

a) a support structure, the support structure including one or more sides, a bottom, a top opening, one or more basins, a trough and a reservoir, wherein the one or more basins each have one or more sides, a bottom and a port, the port positioned at the bottom of the one or more basins, and the one or more basins configured to contain a bubble solution, wherein the trough comprises a trough bottom biased toward the reservoir in a manner that directs the bubble solution falling onto the trough bottoms toward the reservoir, and wherein the reservoir is configured to contain a bubble solution, and b) a pumping system, the pumping system including one or more pumps and one or more conduits, wherein the one or more conduits connect at least one pump to the port of each of the one or more basins, and wherein in operation the at least one pump continuously transports the bubble solution contained in the reservoir through the one or more conduits to the port of each of the one or more basins, thereby filling each of the one or more basins with the bubble solution.

* * * * *